United States Patent [19]

Blanco et al.

[11] 4,279,199

[45] Jul. 21, 1981

[54] PRINT HEAD IMAGE GENERATOR FOR PRINTER SUBSYSTEM

[75] Inventors: Abelardo D. Blanco, Miami; William W. Boynton, Bronson; Charles J. Weber, Boca Raton, all of Fla.

[73] Assignee: International Business Machines Corporation, Armonk, N.Y.

[21] Appl. No.: 86,492

[22] Filed: Oct. 19, 1979

[51] Int. Cl.³ .............................................. B41J 3/12
[52] U.S. Cl. .................................. 101/93.05; 364/900; 400/124
[58] Field of Search ............................ 400/124, 121; 101/93.04, 93.05; 364/200 MS File, 900 MS File

[56] References Cited

U.S. PATENT DOCUMENTS

| | | | |
|---|---|---|---|
| 2,863,549 | 12/1958 | Kelly | 400/583.1 |
| 3,596,594 | 8/1971 | Ukitsu et al. | 400/161.1 X |
| 3,814,227 | 6/1974 | Hurd et al. | 400/121 |
| 4,024,506 | 5/1977 | Spaargaren | 400/124 X |
| 4,059,183 | 11/1977 | Hoskins | 197/1 R |
| 4,146,922 | 3/1979 | Brown et al. | 400/320 X |
| 4,169,684 | 10/1979 | Blom | 400/124 X |

OTHER PUBLICATIONS

*IBM Tech. Disc. Bulletin*, by D. K. Rex, vol. 21, No. 1, Jun. 1978, pp. 13-14, 400-124.
IBM Tech. Disc. Bulletin, by J. E. Lisinski, vol. 21, No. 5, Oct. 1978, p. 1772.

*Primary Examiner*—Paul T. Sewell
*Attorney, Agent, or Firm*—D. Kendall Cooper

[57] ABSTRACT

A printer has print wires arranged in a plurality of print head groups, each group comprising a predetermined number of print wires, the individual print wire groups being arranged according to a slanted serrated wire pattern. A print head image generator is provided and is operable under control of a microprocessor to convert conventional character wire images from a data source such as a host system to the slanted wire images required for printing by the printer.

9 Claims, 81 Drawing Figures

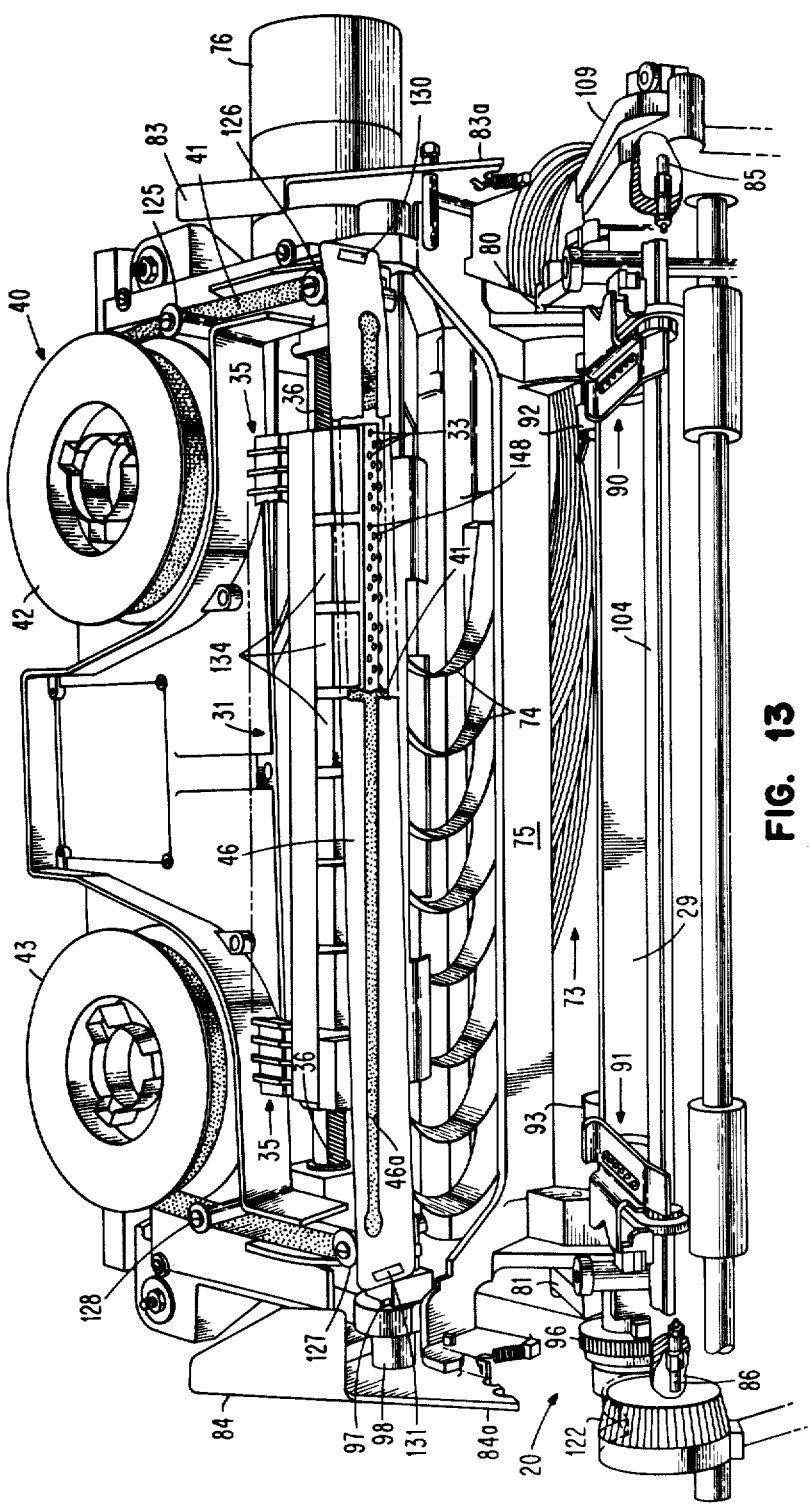

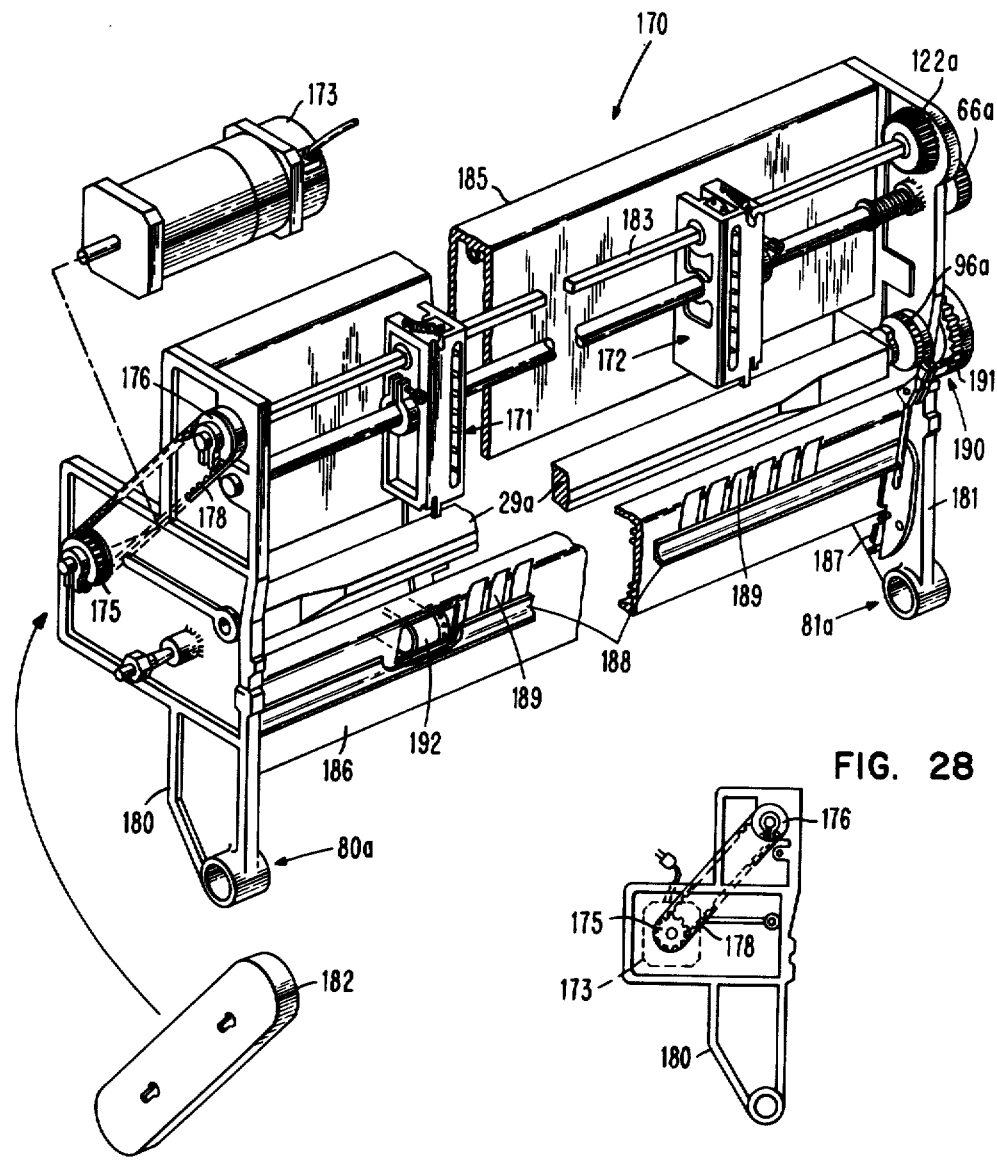

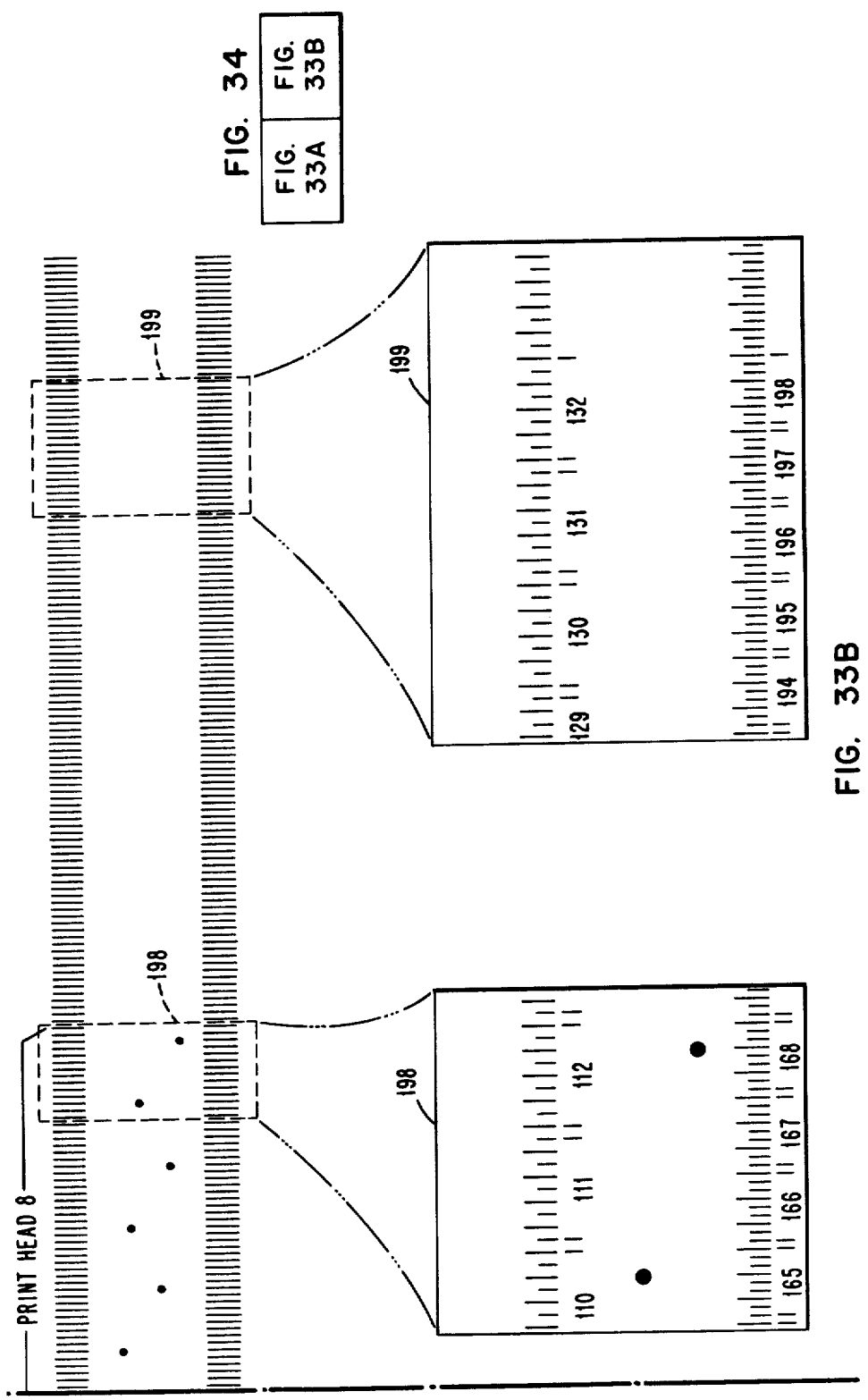

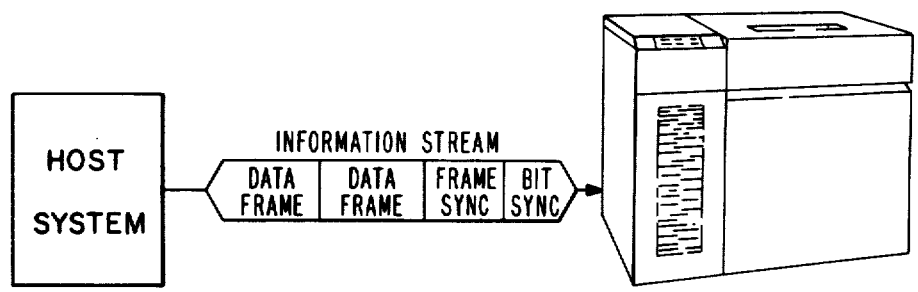
FIG. 41
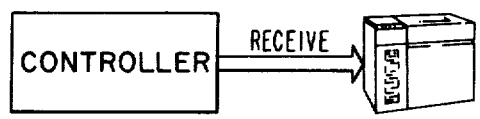
FIG. 42
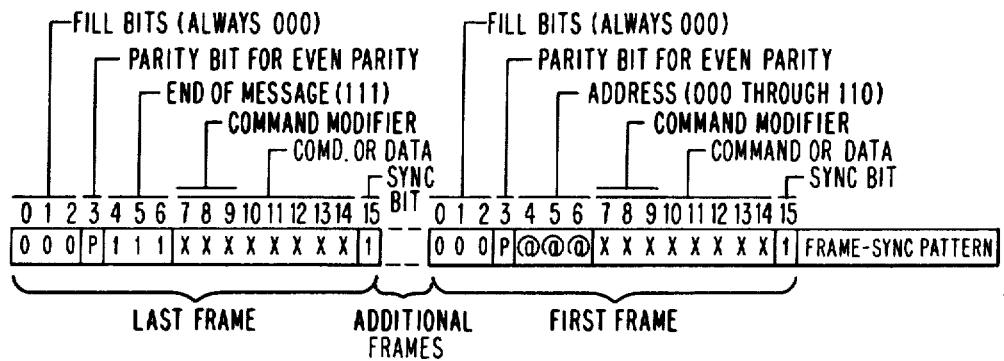
FIG. 43
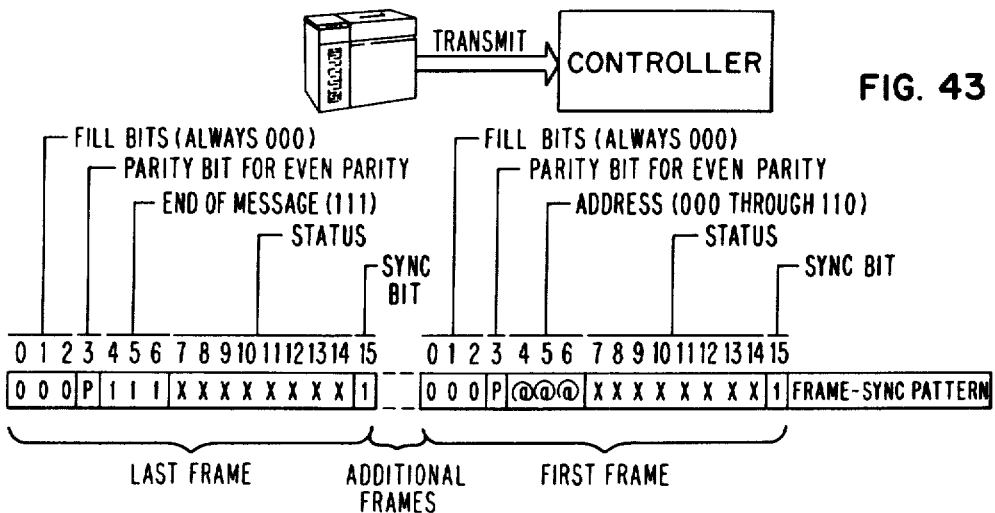

1,4: POLL COMMAND REQUESTS PRINTER STATUS
2,5: RESPONSE STATUS FRAMES INFORM CONTROLLER OF PRINTER AVAILABILITY
3: WRITE DATA COMMAND PREPARES PRINTER FOR PRINTING OPERATION
6: ACTIVATE WRITE COMMAND STARTS PRINTING OPERATION
7: CONTROLLER SENDS DATA & EMBEDDED FORMATTING COMMANDS TO PRINTER

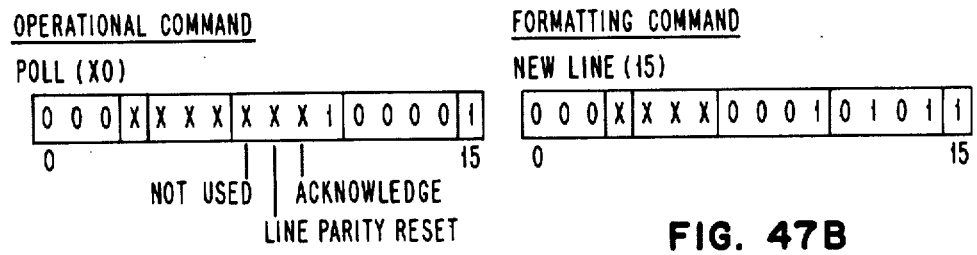
FIG. 47A
FIG. 47B
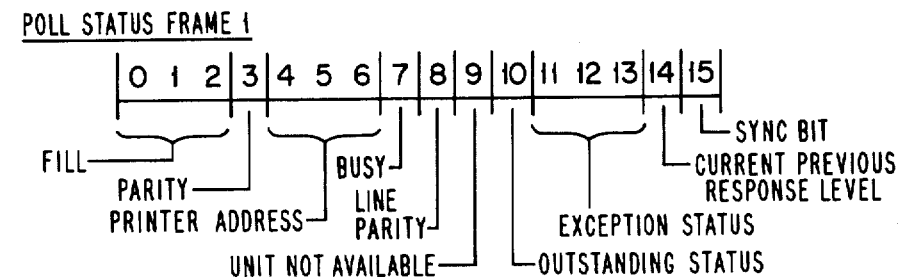
FIG. 48
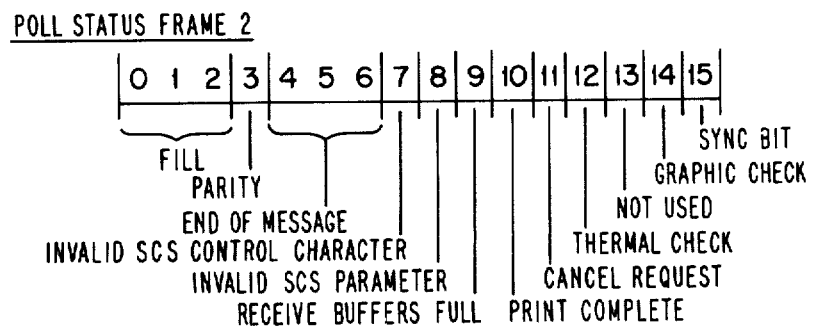
FIG. 49

COMMUNICATIONS MICROPROCESSOR (CMM)

CONTROL MICROPROCESSOR (CTM)

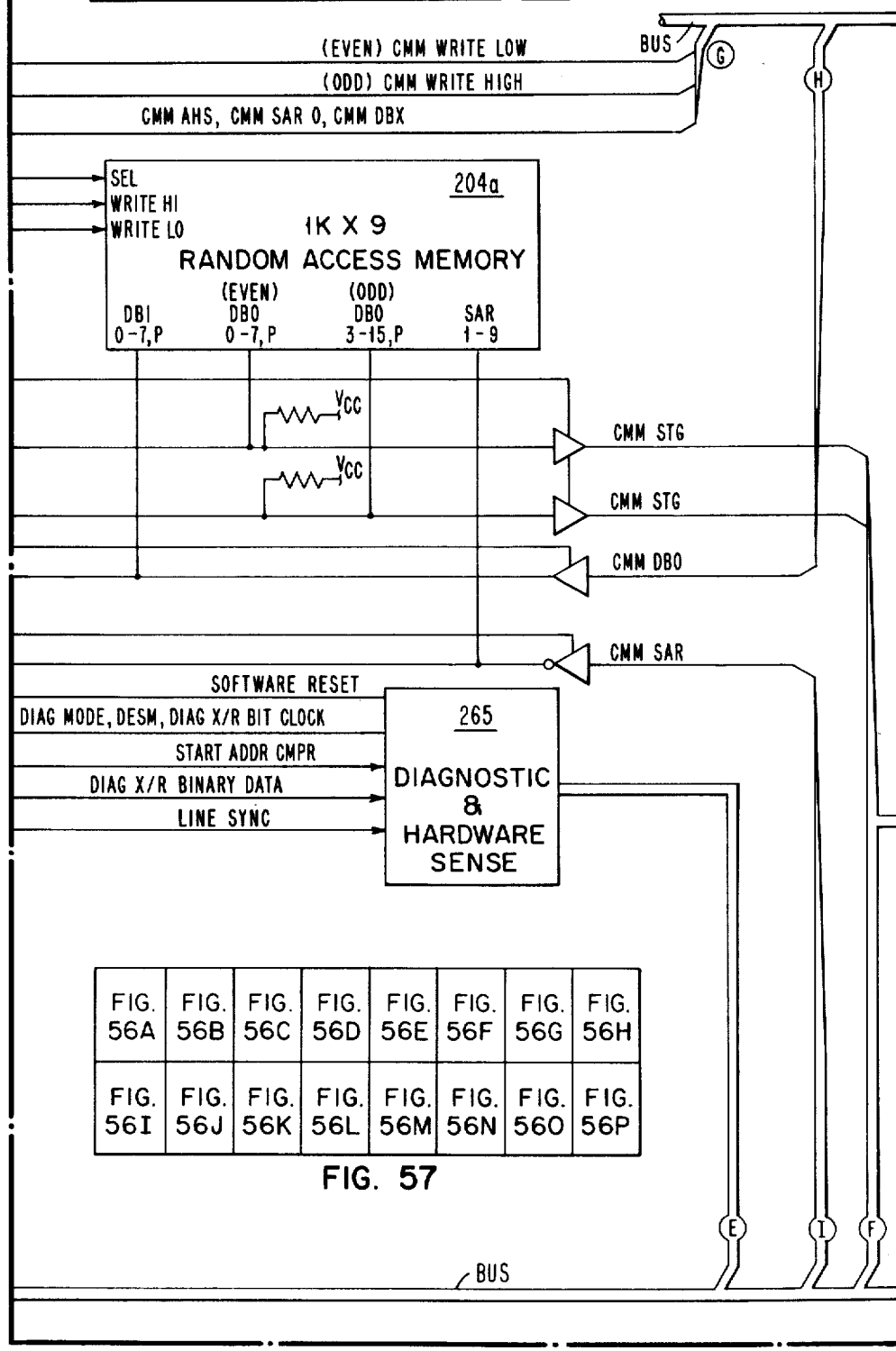

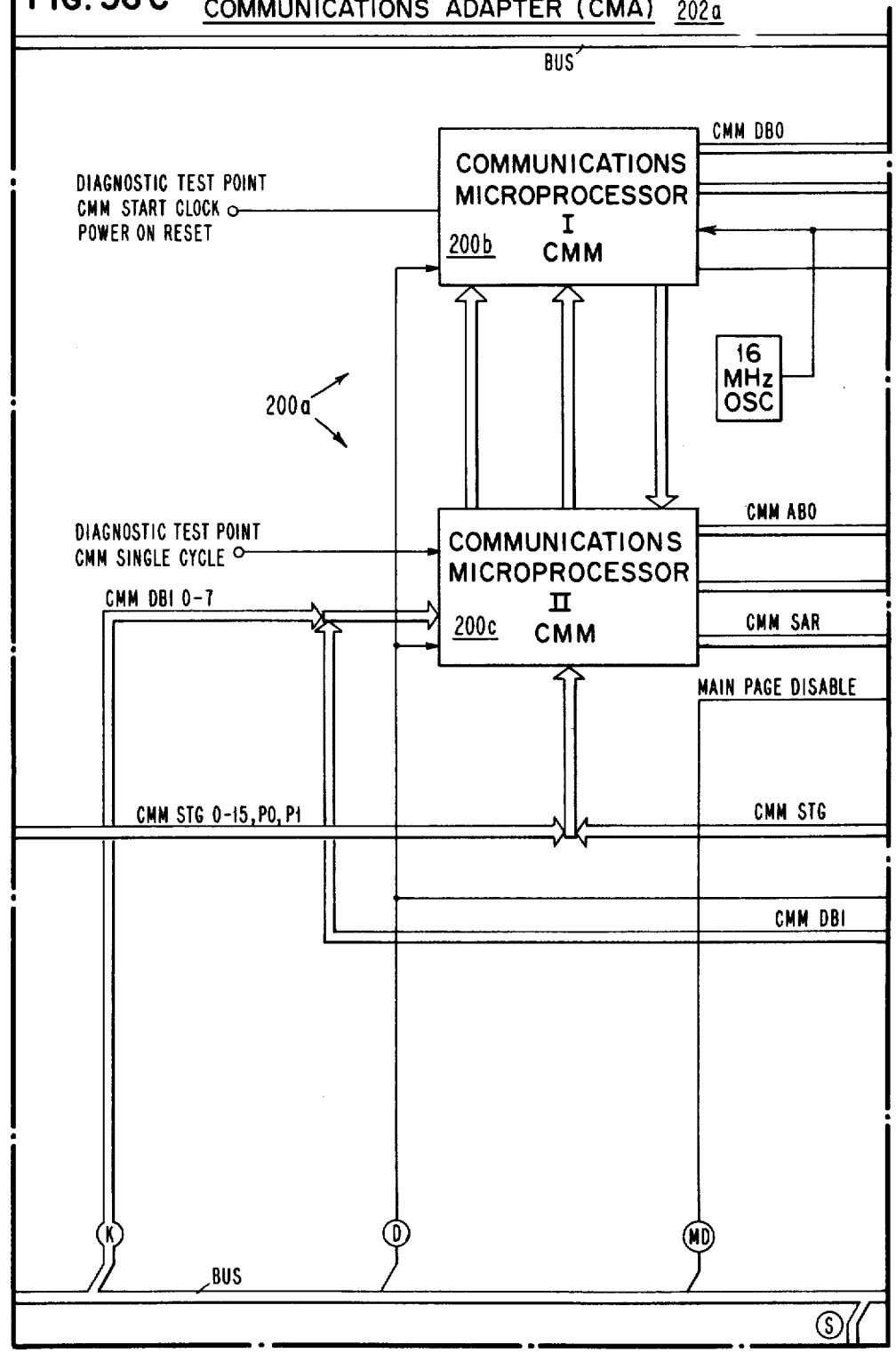
FIG. 56C  COMMUNICATIONS ADAPTER (CMA) 202a

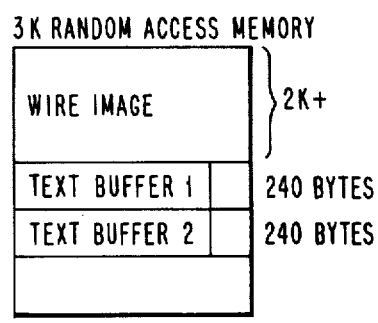
FIG. 59
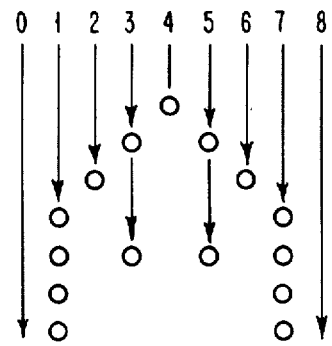
FIG. 60
```
TABLE 1 --- FE  1   1   1   1   1   1   1   0
TABLE 2 --- 1E  20  48  80  48  20  1E ---
                 ↓   ↓   ↓   ↓   ↓   ↓   ↓
                 0   0   0   1   0   0   0
                 0   0   1   0   1   0   0
                 0   1   0   0   0   1   0
                 1   0   0   0   0   0   1
                 1   0   1   0   1   0   1
                 1   0   0   0   0   0   1
                 1   0   0   0   0   0   1
         SLICES  0   0   0   0   0   0   0
           0 | 1 | 2 | 3 | 4 | 5 | 6 | 7 | 8  ADDRESS
           1 | 2 | 3 | 4 | 5 | 6 | 7 | 8 | 9  SLICE NUMBER
```
FIG. 61

HEAD IMAGE GENERATOR (HIG)

PRINT HEAD IMAGE GENERATOR FOR PRINTER SUBSYSTEM

BACKGROUND OF THE INVENTION

This invention relates to printer systems and more particularly to systems of this nature that operate in conjunction with a host data processing system. More particularly, the invention relates to image generator circuits for generating the images necessary to print characters on forms or documents. Many printers or printer systems make use of wire matrix structures wherein the characters are printed or composed by printing individual dots on the paper in a matrix format. In other cases belt or other structures are used to produce the characters. In any case, when wire matrix printing is used, the printing is ordinarily done by means of print wires arranged in a vertical column, a horizontal row or a plurality of print wires arranged in some conventional geometric fashion. Such image generator circuits are ordinarily not capable of processing image data for printing structures that are based on more unconventional arrangements such as in a printer system having the print wires arranged in a slanted or serrated pattern, or some other structural pattern in relation to the print line and the characters to be printed.

SUMMARY OF THE INVENTION

In accordance with the present invention, there is provided a print head image generator for use in conjunction with a printer subsystem, the subsystem incorporating a print assembly having a plurality of print wires arranged in print head groups. The print wires are arranged on a slanted serrated basis with respect to the print line and the direction of movement of the print assembly during printing of characters. An arrangement of the print wires on this basis provides a number of advantages including short wire strokes and easier serviceability of the print wire actuators if a need arises. Ordinarily, a printer subsystem of this nature is interconnected with a host system that provides character image information based on more conventional image patterns such as vertical columns or horizontal columns of dots arranged in character arrays. In order to take advantage of the conventional data inputs, the present printer subsystem provides a print head image generator that is operated under microprocessor control and that develops slanted images from the conventional images supplied by the host.

CROSS-REFERENCE TO RELATED PATENT APPLICATIONS

The present patent application is one of a group of copending patent applications which concern the same overall printer subsystem configuration but which individually claim different inventive concepts embodied in such overall printer subsystem configuration. These related patent applications were filed on the same date, namely, Oct. 19, 1979, and specifically incorporated by reference herein, and are more particularly described as follows:

(1) Application Ser. No. 086,484 entitled "Printer Sybststem with Microprocessor Control", the inventors being Messrs. William W. Boynton, et al;
(2) Application Ser. No. 086,494 entitled "Partial Line Turnaround for Printers", the inventors being Messrs. Gregory N. Baker et al;
(3) Application Ser. No. 086,384 entitled "Font Selection and Compression for Printer Subsystem", the inventor being Mr. Lee T. Zimmerman;
(4) Application Ser. No. 086,490 entitled "Automatic Print Inhibit in Margins for Printer Subsystem", the inventors being Messrs. Willard B. Greene et al;
(5) Application Ser. No. 086,491 entitled "Detection of Multiple Emitter Changes in a Printer Subsystem", the inventors being Messrs. Barry R. Cavill et al;
(6) Application Ser. No. 086,568 entitled "Ribbon Shield for Printer", the inventor being Mr. Donald K. Rex;
(7) Application Ser. No. 086,483 entitled "Print Wire Actuator Block Assembly for Printers", the inventor being Mr. Albert W. Oaten;
(8) Application Ser. No. 086,567 entitled "Microcomputer Control of Ribbon Drive for Printers", the inventors being Messrs. Earl T. Brown et al; and
(9) Application Ser. No. 086,493 entitled "Head Image Generator for A Matrix Printer", the inventor being Mr. Leo K. Leontiades.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 11 is a view of ribbon shield having a print aperture positioned in a horizontal plane.

FIG. 12 is a cross-sectional view of the ribbon shield on the lines 12—12 in FIG. 11.

FIG. 13 is an overhead view of the printer slightly from the rear of the unit showing the forms feed open.

FIGS. 27 and 28 illustrate an alternative forms feed assembly for the printer unit.

FIGS. 33A and 33B, when arranged as shown in FIG. 34, show in greater detail the relationship of the print wires to character locations on the forms to be printed.

FIG. 41 illustrates a stream of information between the host system and the printer subsystem.

FIG. 42 illustrates significance of bits in the frames during a receive mode when information is transferred from the controller to the printer subsystem.

FIG. 43 illustrates bit significance for the frames during a transmit mode when information is transferred from the printer subsystem to the controller.

FIGS. 47A and 47B illustrate representative operational and formatting commands.

FIGS. 48 and 49 illustrate frame layout for status reports during a Poll operation.

FIG. 59 illustrates an arrangement of wire images and text buffers in a Random Access Memory utilized by the head image generator herein.

FIG. 60 illustrates the character "A" and the nine vertical slices designated "0-8" that make up the character and that are developed during printing.

FIG. 61 illustrates the development of character images from stored information by the head image generator.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host to print on the forms and in turn provides status signals to the host during operations.

The printer itself is an output line printer designed to satisfy a variety of printing requirements in data processing, data collection, data entry, and communications systems. It can be used as a system printer or a remote work station printer.

The following printer highlights are of interest:
Print density of 10 or 15 characters per inch (25.4 mm) selectable by the operator or by the using system program;
Condensed print mode, 15 characters per inch (25.4 mm) saves paper costs and makes report handling, mailing, reproduction, and storage easier;
Line spacing of 6, or 8 lines per inch (25.4 mm) or any other line density selectable by the operator or by the using system program;
Incremental and reverse forms movement selectable by the using system program;
Sixteen self-contained character sets selectable by the using system program with a base language selected by hardware jumpers.
Special graphics ability (special characters, graphs, plotting, etc.) selectable by the using system program;
Matrix printing technology;
Built-in diagnostics for problem determination by the operator;
Microprocessor control unit;
Maximum print line width—330.2 mm (13.2 in);
Maximum print positions for 10 characters per inch (25.4 mm)—132;
Maximum print positions for 15 characters per inch (25.4 mm)—198;
Adjustable forms width—76.2 to 450 mm (3.0 to 17.7 in);
Maximum forms length—76.2 to 317.5 mm (3.0 to 12.5 in).

Figure 1:
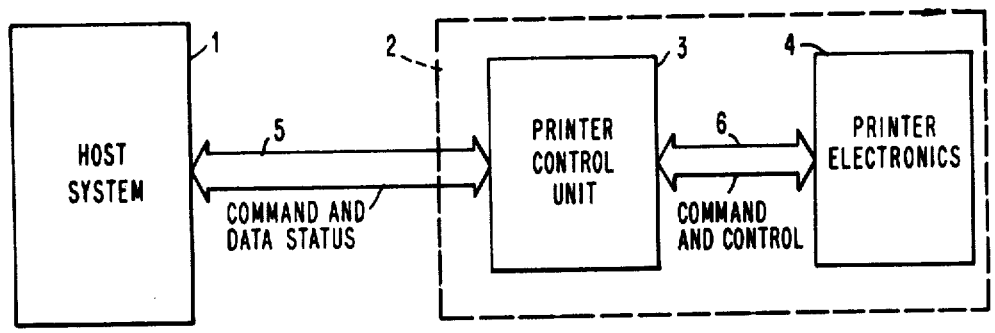
FIG. 1 is a simplified system diagram for the printer subsystem.

FIG. 1 illustrates a representative system configuration including a host system 1 and the printer subsystem 2 which includes a printer control unit 3 and printer electronics 4. Command and data signals are provided by the host system by way of interface 5, and command and control signals are provided from printer control unit 3 to the printer electronics 4 by way of bus 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier, the operator panel, and the printer sensors.

The elements of the system, such as the printer control unit and printer electronics, incorporate one or more microprocessors or microcomputers to analyze commands and data and to control operations.

Figure 2:
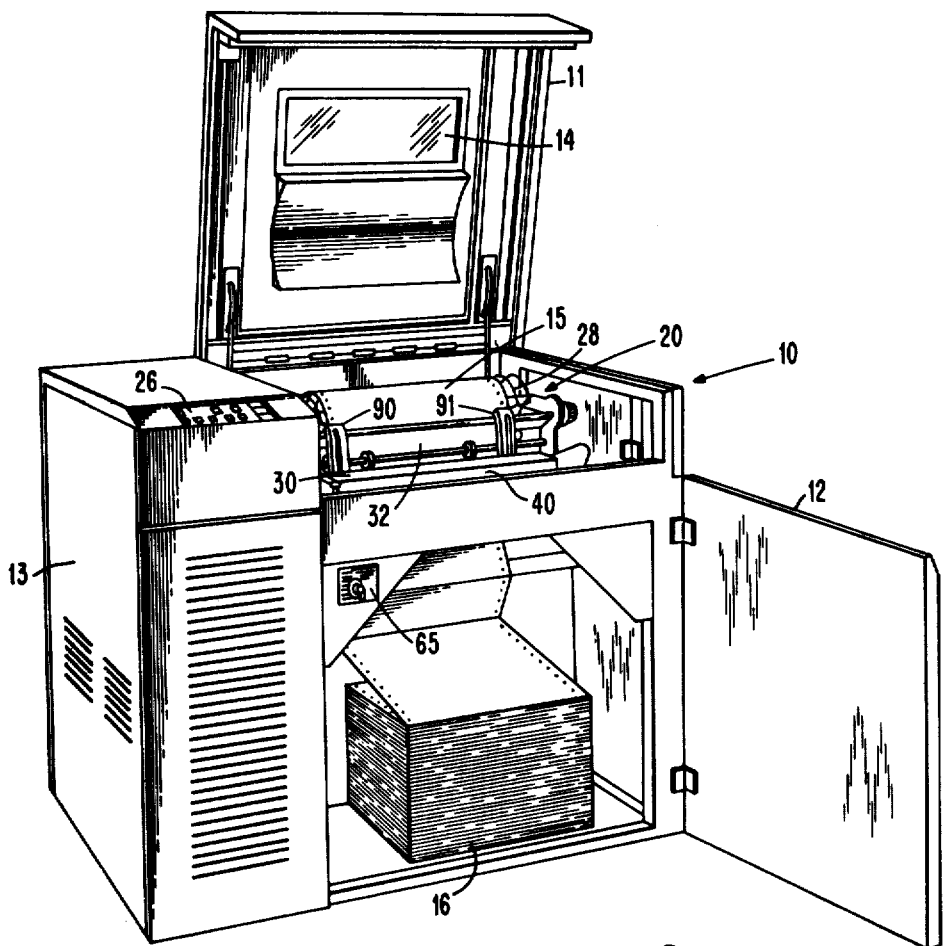
FIG. 2 illustrates the printer console and a number of printer components as well as forms feeding.
Figure 3:
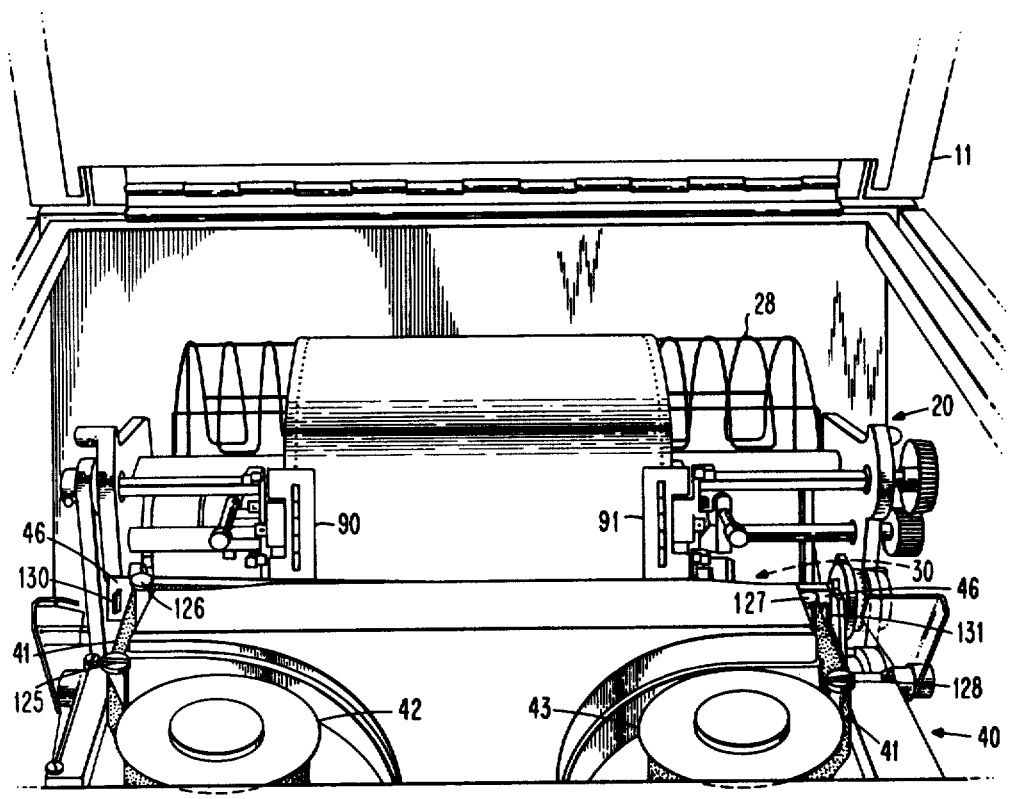
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover is closed. Forms (documents) 15 are provided from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms after printing to a takeup stack, not shown but positioned below the printing mechanism and to the rear of the printer console. The printer incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize ink smudging on forms 15. Two motors shown more clearly in FIG. 8 drive ribbon 41 back and forth between spools 42 and 43. The printer control unit detects ribbon jams and end of ribbon (EOR) conditions. A ribbon jam turns on an error indicator and stops printing. An EOR condition reverses the ribbon drive direction.

Figure 4:
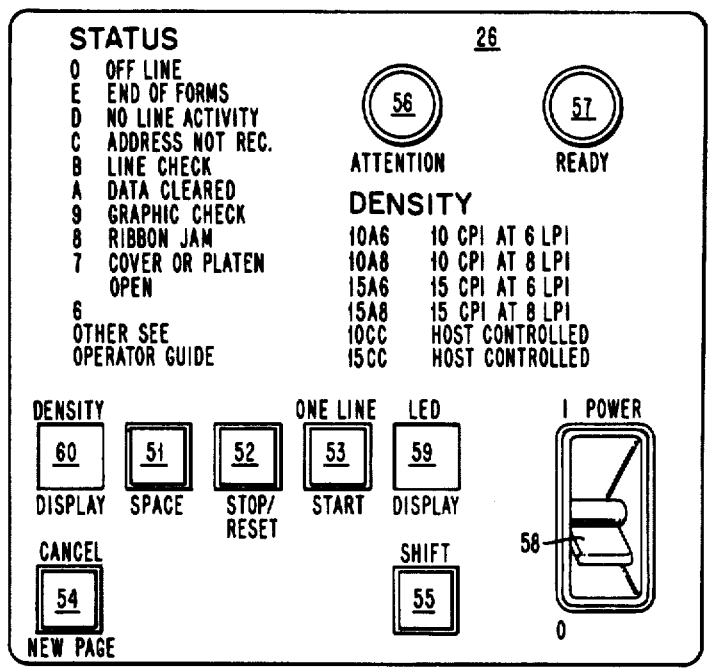
FIG. 4 illustrates an operator panel useful with the printer of FIGS. 1 and 2.

The printer includes an operator panel 26 (shown in greater detail in FIG. 4) that consists of several operator control keys (pushbuttons 51-55 and 60), two indicator lights 56, 57, a power on/off switch 58, and an operator panel display 59. By using various combinations of the keys in conjunction with the shift key 55 the operator can: start or stop printing and view the last line printed, set print density, position the forms up or down one page or one line at a time, move the forms incrementally up or down for fine adjustment, and start or stop the diagnostic tests when selected by a mode switch, to be described.

The indicator lights on the operator panel display notify the operator that: the printer is ready to print data from the using system (57), the printer requires attention (56), the current print density setting (59), errors, if any, have been detected, and the results of the diagnostic tests (59).

Figure 5:
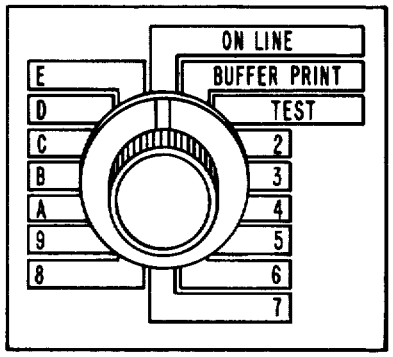
FIG. 5 shows a mode switch for control of on-line, off-line conditions.

A 16-position mode switch 65 is located behind the front door 12 and is shown in greater detail in FIG. 5. The on-line positions permit printing to be controlled by the using system. All other positions are off-line and do not allow printing to be initiated from the using system.

The first three switch positions are used by the operator to select these modes:

On-line. The normal operating position. With the switch in this position, the printer accepts commands from the using system. The operator panel display 59 indicates any detected error conditions.

Buffer Print. An additional on-line position which prints the EBCDIC values (hexadecimal codes) sent from the host and the associated character images. No control characters are interpreted. This feature allows the user to view the data stream sent to the printer.

Test. For off-line checkout and problem determination. In test mode, when Start key 53 is pressed, the attention indicator (56) stays on and Ready indicator (57) is turned on until the diagnostic tests that are stored in the printer control unit are finished or the Stop key is pressed. If an error is detected, the printer stops and displays an error code in the operator panel display 59.

The remaining thirteen (13) positions of the mode switch designated "2-9" and "A-E" are used by service personnel to select a variety of diagnostic tests to aid in off-line problem determination and confirmation of service requirements.

Figure 6:
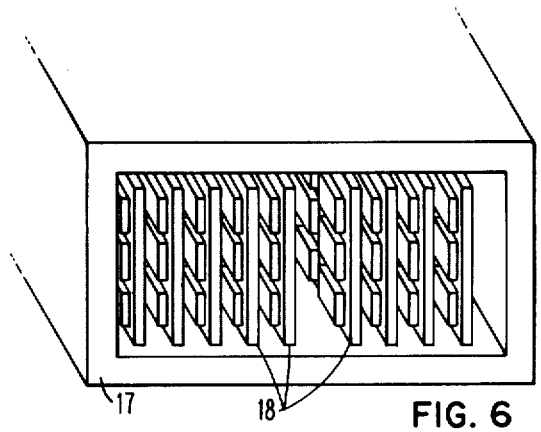
FIG. 6 shows a gate assembly with printed circuit cards.

FIG. 6 illustrates a gate assembly 17 located behind side cover 13, FIG. 2, the gate assembly including modular printed circuit cards such as cards 18 that contain much of the circuit elements for printer control unit 3 and printer electronics 4, FIG. 1.

Figure 7:
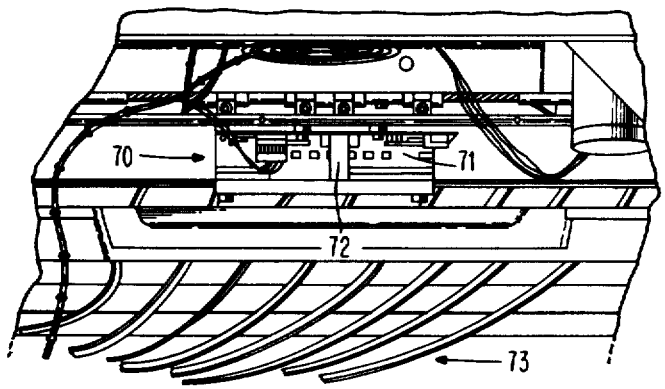
FIG. 7 is a frontal view of the printer console of FIG. 2 with the cover open showing a print emitter.

FIG. 7 is a frontal view of a print emitter assembly 70 that includes an emitter glass 71 and an optical sensor assembly 72. Glass 71 is vertically positioned with respect to sensor assembly 72 and is mechanically attached to print mechanism 30 so that as the print heads, print actuators, and print wires move back and forth left to right and conversely as viewed in FIG. 7, glass 71 also moves in the same manner with respect to sensor assembly 72 to indicate horizontal position of the print wires. Cabling 73 supplies signals to the print actuators which are described in detail below.

OVERVIEW OF PRINTER MECHANISMS

Figure 8:
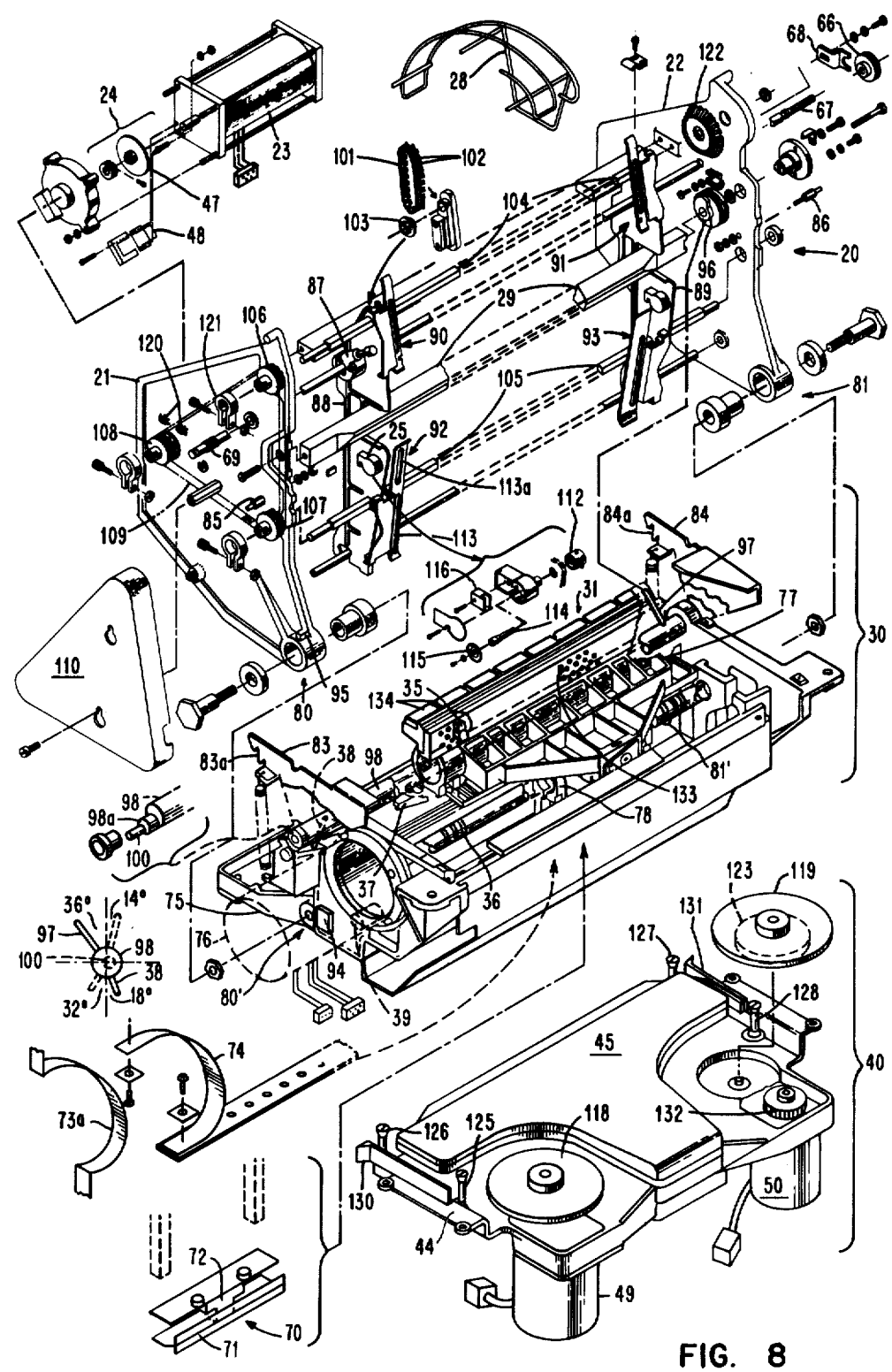
FIG. 8 is an exploded view of various printer assemblies including the forms feed assembly, the print assembly and the ribbon drive assembly.
Figure 9:
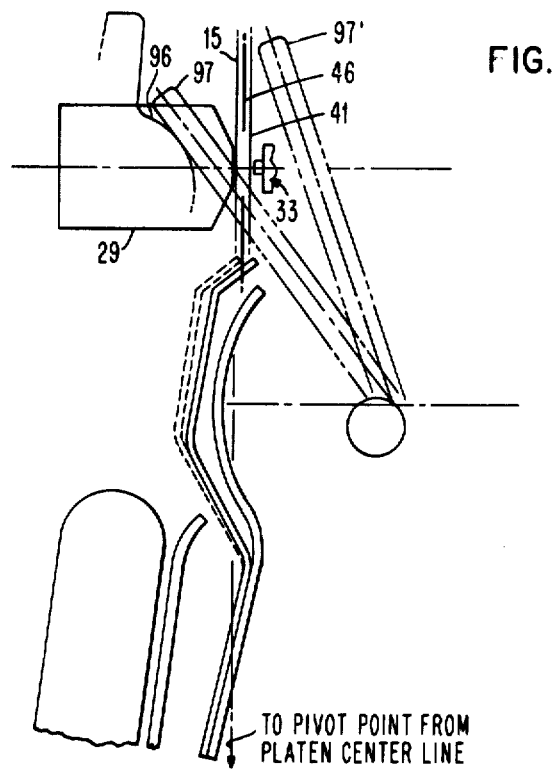
FIG. 9 is a cross-sectional view at the print line of the printer of FIGS. 2, 3, and 8.
Figure 10:
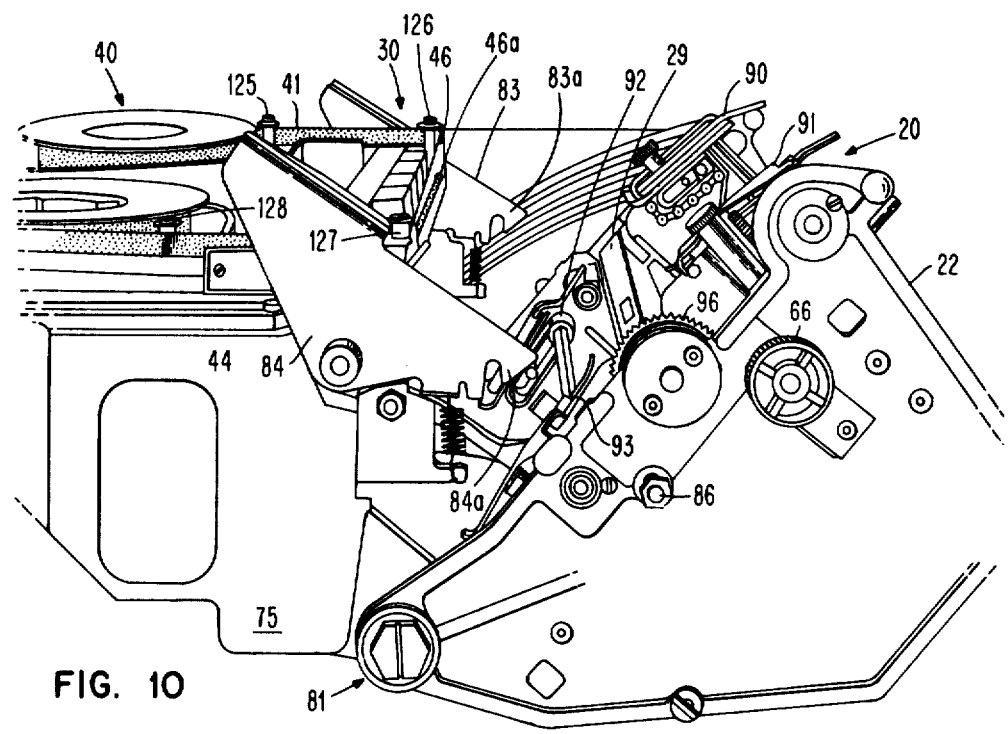
FIG. 10 is a right side elevation of various printer assemblies shown in FIG. 8.

FIGS. 8, 9 and 10, among others, show the details of construction of the forms feed assembly 20, the print assembly 30, the ribbon drive assembly 40, and various associated emitters. A general overview of these assemblies is first presented.

As best seen in FIGS. 8 and 10, forms feed assembly 20 has end plates (side castings) 21 and 22 which support the various forms feed mechanisms including a drive motor 23 to drive tractors 90-93, the motor having a forms feed emitter assembly 24. The forms feed assembly has a separate end of forms and jam detector emitter 25. Assembly 20 also includes a platen 29 located behind the forms and against which the print wires 33 are actuated during printing. See FIG. 9.

The print assembly 30 includes a base casting 75 supporting various mechanisms including print motor 76, shown in phantom in FIG. 8 in order that other elements may be seen more easily, and connected to drive a print head carrier 31 with actuator block assembly 77 in a reciprocal fashion horizontally to effect printing on an inserted form. The print assembly also drives the print emitter assembly 70 having emitter glass 71 and optical sensor assembly 72.

The ribbon drive assembly 40 includes a support casting 44, a cover 45, and drive motors 49 and 50.

FORMS FEED ASSEMBLY

In order to load paper in the printer the forms feed assembly 20 pivots away from the base casting 75 at pivot points 80 (80') and 81 (81'), the latter pivot point being best seen in FIG. 10, to allow access to thread the forms into position. Latches 83 and 84 are raised by the operator so that extremities 83a and 84a disengage eccentric pins 85 and 86 on the forms feed assembly 20. The forms feed assembly 20 then pivots away from the operator as viewed in FIGS. 3 and 8 and to the right as viewed in FIG. 10. This allows access to tractors 90–93 so that the operator may load paper. The forms feed assembly is then reclosed and relatched by latches 83 and 84 for normal machine operation. During the time that the forms feed assembly is pivoted back for service, a switch 94 prevents machine operation. This switch is actuated by a tang 96 on forms feed assembly 20 when it is closed.

Referring to FIG. 8, the forms feed assembly includes means for adjusting for forms thickness. As mentioned, the entire forms feed assembly pivots back from the rest of the printer about pivot points 80 and 81. In the closed position the forms feed assembly is in such a position that a spiral cam and knob assembly 96 engages a pin 97 on the main carrier shaft 98 of the print assembly 30. See also FIG. 9. Adjustment of the spiral cam and knob assembly 96 is such that it rotates the main carrier shaft 98. Assembly 96 is retained in position by a spring loaded detent assembly. This has a spring loaded pin which engages notches in the knob so that it is held in the position set by the operator. Associated with shaft 98 are eccentrics such as portion 98a on the left end of shaft 98 with tenon 100 onto which latch 83 is mounted. Rotation of shaft 98 thus moves latches 83 and 84 which changes the distance between assemblies 20 and 30 and thus the distance between the ends of print wires 33 and platen 29. This adjustment enables the printer to accommodate forms of various thicknesses. The printer can handle forms from one part to six parts thickness.

The paper feeding is accomplished by the four sets of tractors 90–93 two above the print line and two below the print line. The individual tractors include drive chains to which pins are attached at the proper distance to engage the holes in the form. As an example, tractor 90 has drive chain 101 with pins 102. Chain 101 is driven by a sprocket 103 attached to a shaft 104 which also drives the sprocket and chains for tractor 91. Tractors 92 and 93 are driven from shaft 105. Because the tractors are above and below the print line, the printer is able to move the paper in either direction. The normal direction of forms drive is upwardly in FIGS. 3 and 8. However, it is possible to move the paper downwardly, as well.

Rotation of shafts 104 and 105 and forms feeding is accomplished by appropriate drive of motor 23 in the proper direction which in turn drives pulleys 106 and 107 (to which shafts 104 and 105 are connected) from motor pulley 108 by means of drive-timing belt 109. Cover 110 covers belt 109 and pulleys 106–108 during rotation. The forms feed emitter assembly 24 includes an emitter wheel 47 with marks to indicate rotation and a light emitting diode assembly 48 that serve to indicate extent of rotation of motor 23 in either direction and as a consequence, the extent of movement of the forms as they are driven by motor 23.

The capability of the printer to feed paper in both directions offers some advantages. For example, in order to improve print visibility at the time the Stop button is pushed by the operator, the paper may be moved up one or two inches above where it normally resides so that it can be easily read and can be easily adjusted for registration. When the Start key is depressed, the paper is returned to its normal printing position back out of view of the operator. The printer may also be used in those applications where plotting is a requirement. In this case a plot may be generated by calculating one point at a time and moving the paper up and down much like a plotter rather than calculating the entire curve and printing it out from top to bottom in a raster mode.

End of forms and jam detection is accomplished by assembly 25 having a sprocket 112 just above the lower left tractor. The teeth in this sprocket protrude through a slot 113a in the flip cover 113. This sprocket is not driven by any mechanism but simply is supported by a bearing that is part of assembly 25. The sprocket engages the feed holes in the paper as it is pulled past by the tractor assemblies. On the other end of the shaft 114 from the sprocket is a small optical emitter disc 115. The marks in this disc are sensed by an LED phototransistor assembly 116 and supplied to the electronics of the subsystem. The electronics verifies that marks have passed the phototransistor assembly 116 at some preselected frequency when the paper is being fed. If the mark is not sensed during that time, the machine is shut down as either the end of forms has occurred or a paper jam has occurred.

The castings 88 and 89 supporting the tractors 90–93 are adjustable left or right in a coarse adjustment in order to adjust for the paper size used in a particular application. After they are properly positioned they are locked in place on shaft 67 by locking screws such as locking screw 87.

All tractors are driven by the two shafts 104 and 105 from motor 23 as previously described. The motor adjusts in the side casting 21 in slots 120 in order to provide the correct tension for belt 109.

Besides the coarse adjustment, there is also a fine adjustment which is used to finally position in very small increments laterally the location of the printing on the forms. This is done by a threaded knob 66 which engages shaft 67 to which both tractor castings clamp. This shaft floats between side castings 21 and 22 laterally. The threads in knob 66 engage threads on the right end of shaft 67. The knob is held in a solid position by a fork 68 the portion 682 engaging notch 66a formed by the flanged portion 66b of knob 66. Therefore knob 66 stays stationary and the threads driving through the shaft force shaft 67 laterally left to right, depending upon the direction in which knob 66 is rotated. Shaft 67 is always biased in one direction to take out play by a spring 69 on the left end of shaft. As the paper leaves the top of the tractors, it is guided up and toward the back of the machine and down by the wire guide 28.

In order to insure that the distance between the pins in the upper tractors is in correct relationship to the pins in the lower tractors an adjustment is performed. This adjustment is made by inserting a gauge or piece of paper in the tractor assembly which locates the bottom pins in the correct relationship to the top pins. This is done by loosening a clamp 121 on the end of shaft 104. Once this position is obtained, then clamp 121 is tightened and in effect phases the top set of tractors to the bottom set so that holes in the paper will engage both sets of tractors correctly. Forms may be moved through the tractor forms feed mechanism manually by rotating knob 122. This knob simply engages the top drive shaft 104 of the upper tractor set and through the timing belt 109 provides rotational action to the lower tractor set, as well.

PRINT ASSEMBLY

In FIG. 8, printing assembly 30 comprising a carrier 31 actuator block 77 assembly 7 and support 78 accommodates all the print heads with their wire actuators 35 and print wires 33. Also, see FIGS. 13 and 14–26. This assembly is designed to hold from two up to eight or nine print head groups of eight actuators each. Thus, a printer with eight print head groups, as shown in FIGS. 8 and 13, has sixty-four print wire actuators and sixty-four associated print wires 33. Print wires 33 project through apertures 148, FIG. 13. Only two actuators 35 are shown positioned in place in FIG. 8. The other sixty-two actuators would be located in apertures 133 only a few of which are depicted. To insure long life of the print wires, lubricating assemblies 134 containing oil wicks are positioned in proximity to the print wires. The print wire actuators fire the wires to print dots to form characters. Carrier 31 is shuttled back and forth by a lead screw 36 driven by motor 76. Lead screw 36 drives the carrier back and forth through nuts which are attached to the carrier. When carrier 31 is located at the extreme left, as viewed in FIGS. 3 and 8 (to the right as viewed in FIG. 13), this is called the "home position". When the carrier is moved to the home position, a cam 37 attached to the carrier engages a pin 38, the pin being attached to the main carrier shaft 98. If the machine has not been printing for some period of time, in the neighborhood of a few seconds, the printer control unit signals the carrier to move all the way to the left, in which case cam 37 engages pin 38 to rotate the main carrier shaft 98 approximately 15 degrees. On each end of the shaft are the eccentrically located tenons, such as tenon 100, previously described. These tenons engage the latches 83 and 84 so that the distance between the print assembly and the forms feed assembly is controlled by the latches. As shaft 98 rotates, the eccentrics associated with latches 83 and 84 separate the forms feed assembly from the print assembly.

The purpose of motor 76, of course, is to move the carrier 31 back and forth in order to put the print actuators 35 and print wires 33 in the proper positions to print dots and form characters. Since the motion is back and forth, it requires a lot of energy to get the mass of carrier 31 and actuators 35 stopped and turned around at the end of each print line. A brushless DC motor is used. The commutation to the windings in the motor is done external to the motor through signals sent out of the motor via a Hall effect device emitter 39. In other words, the emitter 39 within the motor sends a signal out telling the printer control unit that it is now time to change from one motor winding to the next. Therefore, there are no rubbing parts or sliding parts within the motor, and switching is done externally via electronics based on the signals that the motor sends out from its emitter. The motor draws about 20 amperes during turnaround time and, because of the high current it draws and because of the torque constant required from the motor, it is built with rare earth magnets of Semarium cobalt which provide double the flux density of other types of magnets.

Semarium cobalt is not just used because of the higher flux density but also because its demagnetization occurrence is much higher and, therefore, more current can be sent through the motor without demagnetizing the internal magnets. During printing, carrier 31 that holds the print actuators 35 goes at a velocity of approximately 25 inches per second. The turnaround cycle at the end of the print line requires 28 milliseconds approximately, resulting in a Gravity or "G" load in the neighborhood of 4 G's. The carrier, with all the actuators mounted, weighs about eight and a half pounds.

The current necessary to fire the print actuators is carried to the actuators via the cable assemblies 73, FIGS. 7 and 13, one for each group of eight actuators. The cabling, such as cable 73a, FIG. 8, is set in the machine in a semicircular loop so that as carrier 31 reciprocates it allows the cable to roll about a radius and therefore not put excessive stress on the cable wires. This loop in the cable is formed and held in shape by a steel backing strap 74. In this case there is one cable assembly for each group of eight actuators or a maximum of eight cable backing strap groups.

RIBBON DRIVE ASSEMBLY

The ribbon drive assembly 40 for the printer is shown in FIG. 8, but reference is also made to FIGS. 3, 9, and 13. Spools 42 and 43 are shown with spool flanges but may be structured without spool flanges and contain the ribbon. The spools can be seen on either side of the machine near the front, FIG. 3 and are respectively driven by stepper motors 49 and 50. These spools typically contain 150 yards of standard nylon ribbon that is one and a half inches wide. Gear flanges 118 and 119, FIG. 8, support ribbon spools 42 and 43, respectively. Drive for spool 43, as an example, is from motor 50, pinion gear 132 to a matching gear 123 formed on the underneath side of gear flange 119 then to spool 43. In one direction of feed, the ribbon path is from the left-hand spool 42 past posts 125 and 126, FIGS. 3, 8 and 13, across the front of the ribbon drive assembly between the print heads 34 and forms 15, then past posts 127 and 128 back to the right-hand ribbon spool 43. A ribbon shield 46 to be described in conjunction with FIGS. 11–13 is generally located between posts 126 and 127 and is mounted on the two attachment spring members 130 and 131.

RIBBON SHIELD

FIG. 11 illustrates ribbon shield 46 that is particularly useful in the printer described herein. FIG. 12 is a cross-sectional view along the lines 12—12 in FIG. 11. Shield 46 has an elongated aperture 46a extending almost its entire length. The aperture enables the print wires 33 to press against the ribbon in the printer through the shield in order to print on forms 15. Shield 46 has slits 46b and 46c at opposite extremities to permit easy mounting in the printer on spring members 130 and 131 of the ribbon drive assembly, FIG. 13.

ASSEMBLY VIEW

FIG. 13 is an assembly view of the printer including forms feed assembly 20, printer assembly 30, and ribbon drive assembly 40. Ribbon drive assembly 40 includes the two ribbon spools 42 and 43 which alternatively serve as supply and takeup spools. As mentioned, the spools typically contain 150 yards of standard nylon ribbon that is one and one-half inches wide. If spool 42 is serving as the supply spool, ribbon 41 will be supplied past posts 125 and 126, through the ribbon shield 46 past posts 127 and 128 and thence to the takeup spool 43. Shield 46, FIGS. 11 and 13, and ribbon 41, FIG. 13, are illustrated slightly on the bias relative to horizontal which is their more normal relationship in the printer. The ribbon drive assembly 40 is also positioned on a slight bias relative to horizontal to accommodate the bias of shield 46 and ribbon 41. In this condition aperture 46a assumes a horizontal relationship with respect to the print wires 33 and forms 15. Thus, in FIG. 13, the rightmost end of shield 46 is somewhat elevated in relation to the leftmost end in order that aperture 46a is maintained in a relatively horizontal position with respect to the print actuators in print mechanism 30. A few of the groups of print wires 33 are indicated at a breakaway section of shield 46. As previously noted, the print wires are reciprocated back and forth laterally in relation to a form, not shown in FIG. 13, in order to effect the printing of characters. The reciprocation is by means of drive mechanisms activated from motor 76. The activating signals for the actuators in print mechanisms 21 are supplied through cabling indicated at 73.

ACTUATOR BLOCK, GUIDE, AND ACTUATORS

Figure 14:
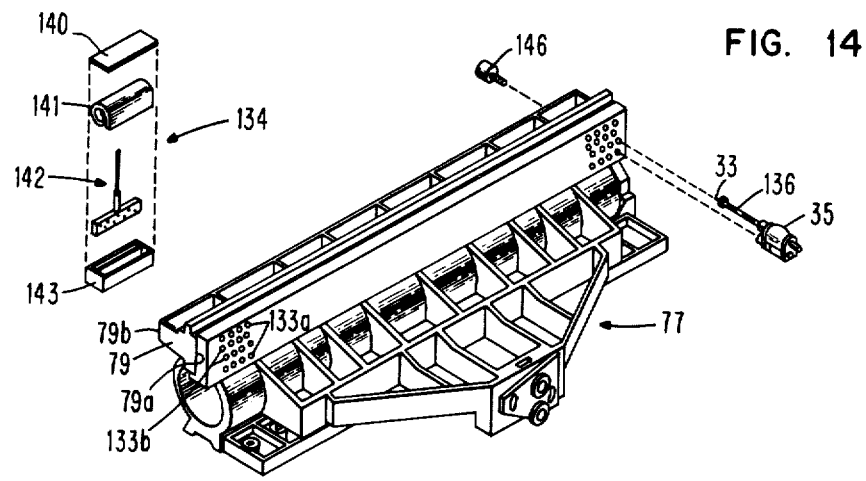
FIG. 14 illustrates a print wire block assembly and associated guide.

Enlarged views of the actuator block 77, guide 79, print wire actuators 35, lubricating assemblies 134, and various related mechanisms are shown in FIGS. 14–23. Referring to FIG. 14, this better illustrates the arrangement of apertures 133 in actuator block 77 which can accommodate eight print heads with eight print wire actuators. Apertures 133a are used to mount actuators 35 while apertures 133b allow passage of barrels 136 of actuators 35 through actuator block 77 and guide 79 up to the print line. A typical lubricating assembly 134 comprises a cover 140, felt element 141, wick assembly 142, and housing 143 that contains lubricating oil.

Figure 15:
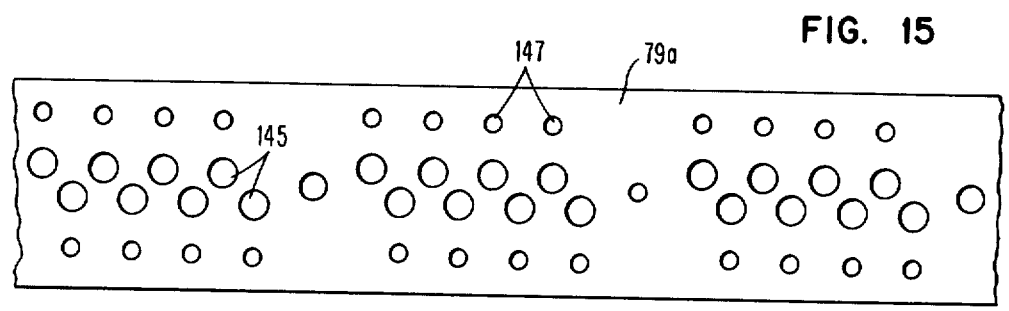
FIGS. 15 and 16 illustrate front and rear faces of the guide shown in FIG. 14.
Figure 16:
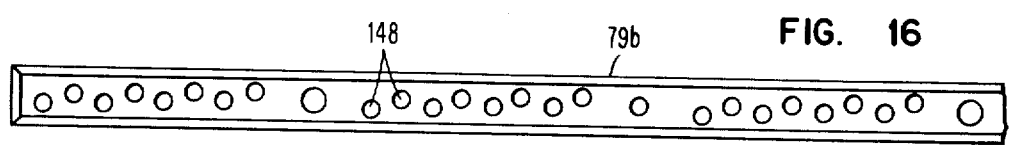

FIG. 15 illustrates a portion of face 79a of guide 79 while FIG. 16 illustrates a portion of face 79b of guide 79. Barrels 136 of actuators 35 pass through apertures 145 on face 79a of guide 79 and are retained by bolts such as bolt 146 passing through apertures 147 from the opposite side of guide 79. Individual actuator barrels 136 and print wires 33 project through apertures 148, FIGS. 13 and 16.

Figure 17:
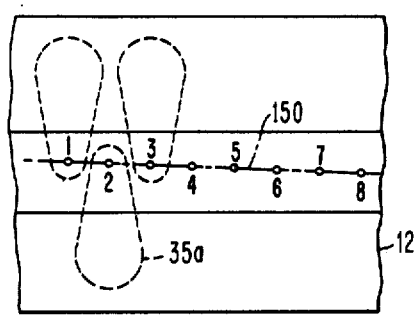
FIGS. 17-19 illustrate an alternative mounting of print wire actuators with an angled face on the block assembly.
Figure 18:
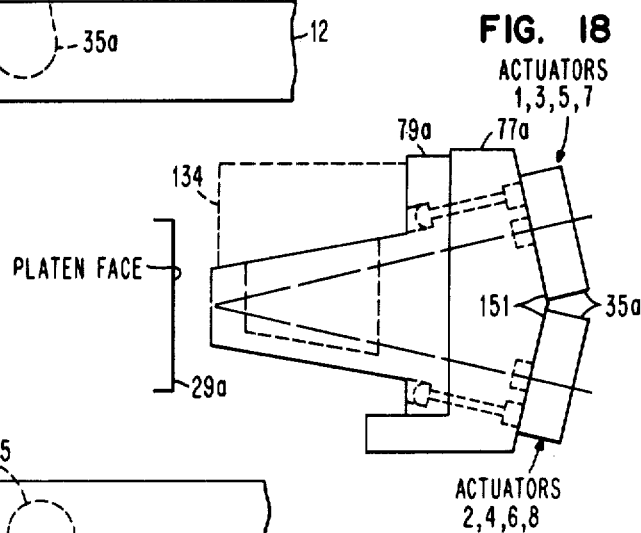
Figure 19:
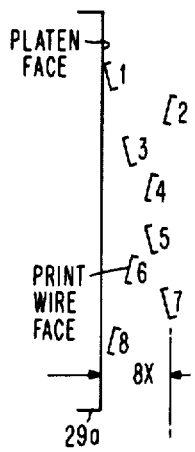
Figure 20:
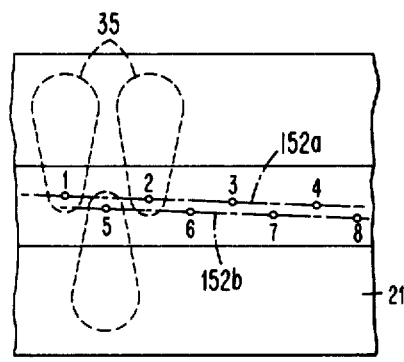
FIGS. 20-22 illustrate mounting of print wire actuators with a flat face on the actuator block assembly.
Figure 21:
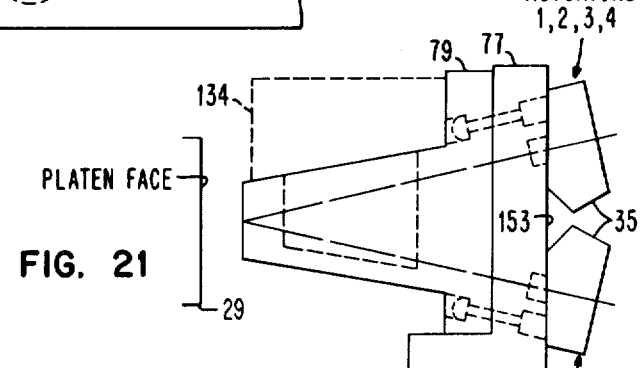
Figure 22:
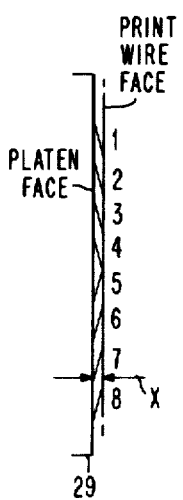

FIGS. 17–22 illustrate several arrangements which permit mounting of a greater multiplicity of actuators in a given amount of space through actuator block 77 and guide 79. FIGS. 17–19 illustrate one possible mounting arrangement for the actuators while FIGS. 20–22 illustrate the actual mounting arrangement previously described in conjunction with FIGS. 8, 13, and 14–16.

In FIGS. 17–19 which represent an alternative mounting arrangement, print actuators 35a and print wires 33 for one print head set of eight (1–8) are arranged on a straight slope 150. This slope, combined with actuator block 77a having a double angle configuration at 151, FIG. 18, results in a staggered print wire face-to-platen condition, FIG. 19. This print wire face-to-platen distance, shown as 8X, is critical to both the stroke and flight time of the print wires.

The preferred arrangement, FIGS. 20–22, has a number of attributes, including improved functioning, increased coil clearance, and ease of manufacture. In this method, print wires 33 arranged in a set 1–8 are mounted in two offset sloped subsets 152a and 152b forming a sloped serrated pattern. (See also FIGS. 15 and 16.) Subset 151a includes print wires 1–4 of the set while subset 152b includes print wires 5–8. This, combined with a straight surface 153 on actuator block 77 and angled actuators 35, FIG. 21, represent an in-line print wire face-to-platen condition as in FIG. 22. The print wire face-to-platen distance, shown as X, is at a minimum. This permits a higher printing rate and prevents wire breakage. The offset sloped print wire sets gives a greater clearance between wire positions which allows a larger actuator coil to be used.

Figure 24:
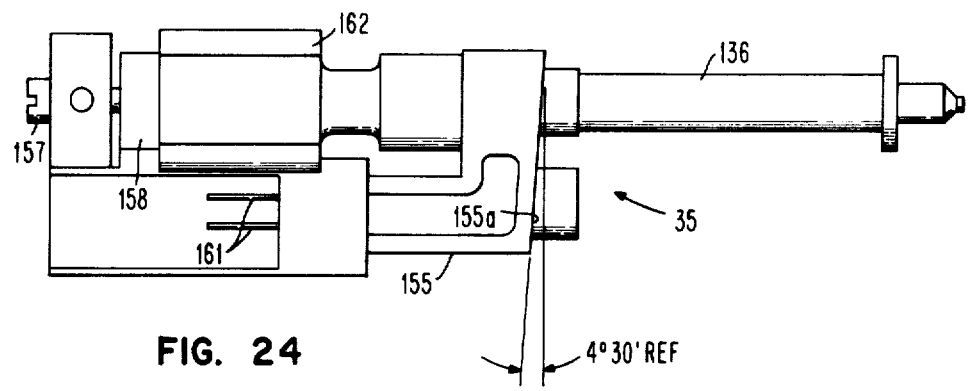

Use of a straight surface 153 instead of the double angle 151 facilitates manufacturing of the actuator block and thereby reduces cost. However, brackets 155 are still cut at an angle such as shown in FIG. 24. The angular relationships of the print actuators 35a with respect to the platen faces in FIG. 18 and print actuators 35 with respect to the platen face in FIG. 21 are somewhat larger than would be encountered in an actual implementation but they are shown this way to make the relationships easier to see. In contrast, an actual angular relationship might be smaller such as the 4° 30' angle front face 155a on bracket 155 of actuator 35 in FIG. 24.

FIGS. 23–26 illustrate a preferred form of actuator 35. This actuator is based on the principles of operation described and claimed in U.S. Patent Application Ser. No. 043,183, filed May 29, 1979, having R. W. Kulterman and J. E. Lisinski as inventors and entitled "Springless Print Head Actuator". This application is assigned to the same assignee as the present application. In the Kulterman actuator, a print wire is provided having an armature which is retained in home position by a permanent magnet. When printing of a dot is required, an electromagnet is energized which overcomes the magnetic forces of the permanent magnet and propels the print wire toward the paper.

Figure 23:
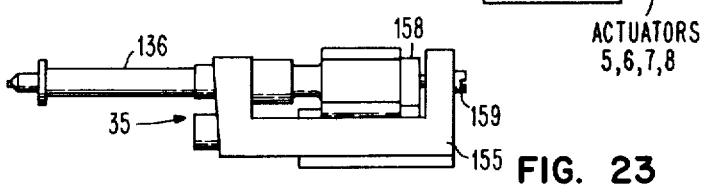
FIGS. 23-26 illustrate a print wire actuator, a plurality of which are mounted in the block assembly shown in FIG. 14.
Figure 26:
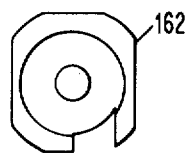
Figure 25:
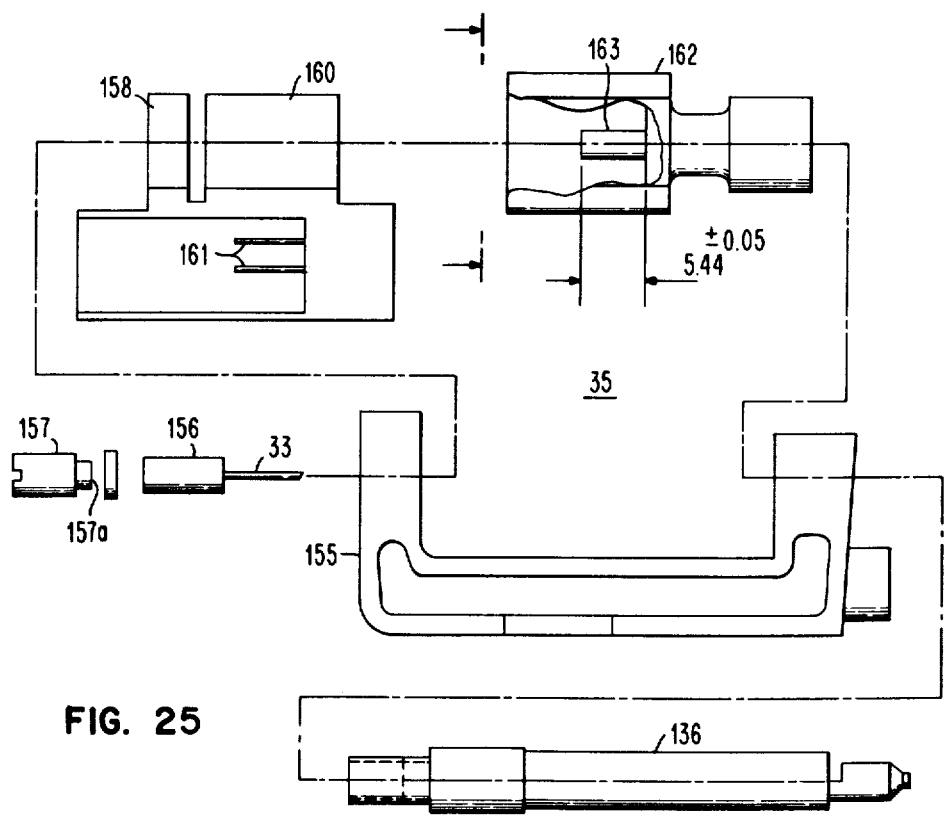
Figure 29:
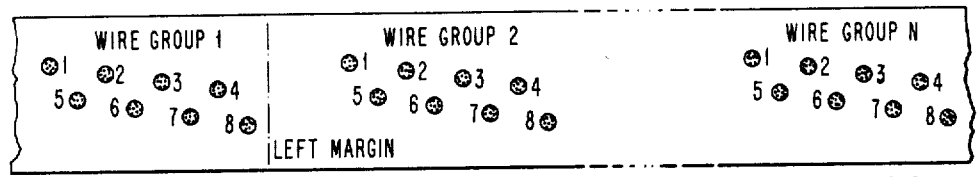
FIG. 29 illustrates the arrangement of print wires in groups relative to a left margin in the printer unit.

FIG. 23 illustrates one side elevation of the actuator, while FIG. 24 illustrates the opposite side elevation. The actuator comprises a number of elements arranged in a generally concentric manner on bracket 155. It is noted that FIG. 24 is somewhat enlarged relative to FIG. 23. Reference is also made to FIGS. 25 and 26 for details of the individual components of the actuator. Also, it is noted that some slight structural differences appear between the actuator shown in FIGS. 23–26 and those illustrated in FIGS. 17–22, the actuators in FIGS. 17–22 being more diagrammatically illustrated. The actuator includes a barrel 136 for supporting print wire 33 in proper relationship for printing when mounted in actuator block 77 and guide 79. Attached to the leftmost end of print wire 33 as viewed in FIG. 25 is an armature 156 which is arranged against a stop portion 157a of an adjustment screw 157 by forces exerted from a permanent magnet 158. A lock nut 159, FIG. 23, retains adjustment screw 157 in proper position. Thus, when not active, armature 156 and print wire 33 abut against stop 157a. When it is desired to actuate print wire 33, electromagnet 160 is rapidly impulsed from an external source by way of connectors 161. Energization of coil 160 overcomes the magnetic flux forces of permanent magnet 158 moving armature 156 and print wire 33 to the right as viewed in FIG. 25 thus causing the rightmost end of print wire 33 which is in proximity to the forms, to print a dot on the forms. A bobbin housing 162 is made of metallic substances to provide a shielding effect with respect to electromagnet 160. It is found that this has been beneficial when numerous print wire actuators are mounted in position on actuator block 77 and guide 79 since it prevents stray impulses from reacting from one actuator to another nearby actuator. This has proven to be extremely advantageous when multiple print actuators are provided as in the present printer. A core element 163 provides a forward stop location for armature 156 in readiness for restoration by permanent magnet 158 against stop 157a as soon as current is removed from coil 160.

FIG. 26 is an end elevation of housing 162 along the lines 26–26 in FIG. 25.

ALTERNATIVE FORMS FEED ASSEMBLY

FIGS. 27 and 28 illustrate an alternative single direction forms feed assembly 170 which feeds forms only in the upward direction as viewed in these figures. In contrast with the forms feed assembly previously described in conjunction with FIG. 8, this forms feed assembly has only a single upper set of tractors 171 and 172. A driving motor 173 provides driving force through gears 175 and 176 by way of timing belt 178. The various elements comprising the forms feed assembly are supported in a left end plate 180 and a right end plate 181. FIG. 28 is a left end elevation of the forms feed assembly 170 illustrating the positional relationships of motor 173, timing belt 178 and other elements. A cover plate 182 covers timing belt 178 during operations. Driving of the pin feeds on the two tractors 171 and 172 is analogous to the driving of the pin feeds for forms feed assembly 20 illustrated in FIG. 8 and previously described. In forms feed assembly 170, the tractor drive includes a drive shaft 183.

Lateral support for the forms feed assembly 170 is provided by an upper support 185 and a lower support 186. The assembly also includes a platen member 29a. Other elements such as knobs 122a, 66a, and 96a are analogous to their counterpart elements 122, 66, and 96 shown in FIG. 8. The tractor mounts to the printer base casting 75 in FIG. 8 at pivot points 80a and 81a.

In place of the two lower tractors 92 and 93 in FIG. 8, this forms feed assembly includes a pressure drag assembly 188 with compliant fingers 189. These fingers exert physical pressure against the paper when in position against platen 29a and in the immediate vicinity of the printing station.

At the same time that forms feed assembly 170 is opened for insertion of new forms, the drag assembly 188 is also opened, but while the forms feed assembly moves toward the rear of the printer, the drag assembly moves toward the front. Spring element 187 enables drag assembly 188 to adjust to allow the forms to slide through when loading the forms. One additional cam element 190 cooperates with a follower 191 to provide adjustment of the pressure exerted by the drag assembly 188 on the paper for the purpose of accommodating various thicknesses of forms.

The assembly includes an End of Forms sprocket assembly 192 that could also serve to detect paper jams and that works in an analogous fashion to assembly 25 with sprocket 112 shown in FIG. 8.

PRINTING OF CHARACTERS, RELATIONSHIPS OF PRINT WIRES, CHARACTER LOCATIONS AND EMITTERS

Characters that are printed are formed by printing dots on the paper. These dots are printed by wires that are mounted in groups of eight on a carrier bar that moves back and forth adjacent to the print line. Printing is bidirectional with complete lines of print formed right-to-left and left-to-right. See FIGS. 29, 30, 33A and 33B.

Figure 30:
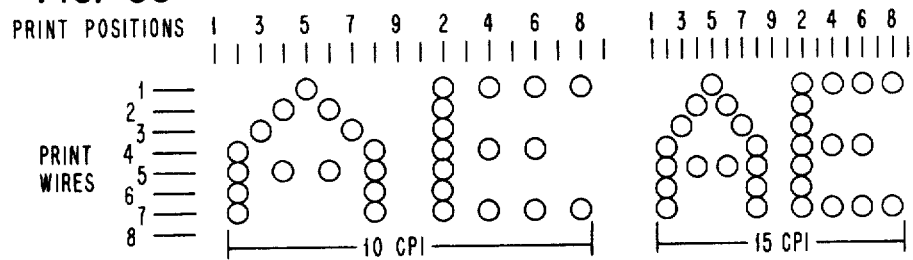
FIG. 30 illustrates printing of characters at 10 characters per inch and 15 characters per inch.

A character is formed in a space that is eight dots high by nine dots wide. As shown in FIG. 30, two of the nine horizontal dot columns (1 and 9) are for spacing between characters. Any one wire can print a dot in four of the seven remaining horizontal dot positions (2 through 8). The printer can print 10 characters per inch or 15 characters per inch.

Most of the characters printed use the top seven wires in the group to print a character in a format (or matrix) that is seven dots high and seven dots wide. The eighth (bottom) wire is used for certain lower case characters, special characters, and underlining.

The number of print wire groups varies according to the printer model, and typically can be 2, 4, 6 or 8 groups. Printing speed increases with each additional wire group.

There are 16 character sets stored in the printer control unit. Any of these sets may be specified for use by the using system program.

Figure 31:
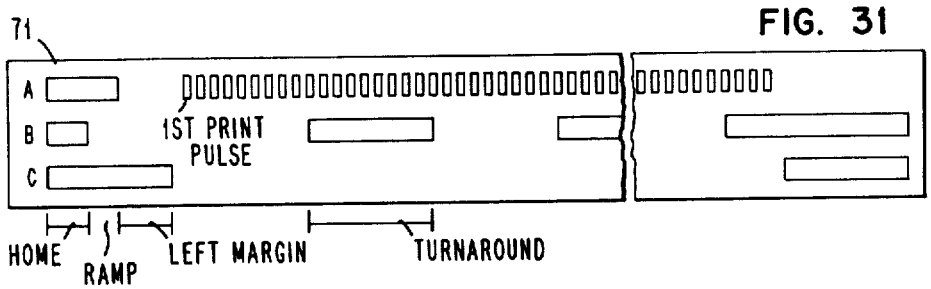
FIGS. 31 and 32 illustrate the print emitter and its operating scheme.

FIG. 31 is a representation of the emitter glass 71 also shown in FIGS. 7 and 8 and associated with the print mechanism 21. It has sections called "Ramp", "Home", and "Left Margin". These are coded sections, designated Track A, Track B, and Track C. Track B is sometimes referred to as the "Turnaround" track. "Home" is indicated by all three tracks being clear. "Ramp" is when Track A and Track C are clear, but Track B is opaque. "Left Margin" is when only Track C is clear, and Tracks A and B are opaque. Left Margin can be told from Right Margin because Track B is clear on Right Margin whereas Track B is opaque on Left Margin. For convenience, glass 71 is shown in a more normal representation with the left margin areas to the left and the right margin areas to the right. In actuality, the emitter glass 71 is physically located in the machine with the right-hand part in FIG. 31 toward the left and the left-hand part in FIG. 31 toward the right as viewed in FIGS. 7 and 8. This is due to the fact that the associated optical sensor 72 is physically located at the rightmost area of the emitter glass 71 when the print mechanism is in home position, and glass 71 actually is moved past the optical sensor assembly 72 from left to right as the print mechanism moves from left to right away from home position.

Figure 32:
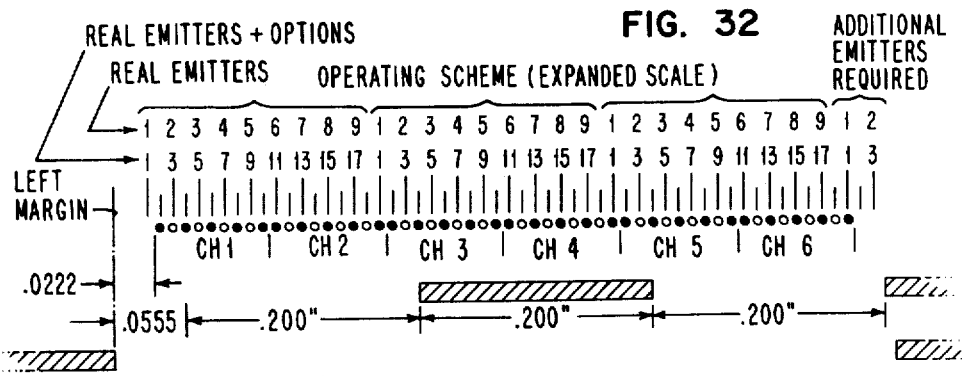

FIG. 32 illustrates the development of emitter pulses from the emitter glass 71 shown in FIG. 31, the signals being termed "real emitters" when actually sensed from Track A. "Option" emitters (sometimes referred to as "false" emitters) are developed electronically in the printer control unit. The use of emitter 70 in keeping track of printing location is described. The emitter tells the electronics when the wires are in a proper position to be fired to print the dots in correct locations. It essentially divides the print line into columnar segments, each one of which is available to the electronics to lay down a print dot. Track A, the basic track which controls the printing of dots has spacings of 0.0222 inches. This corresponds to two print columns distance on the emitter glass 71 in a normal print cycle and for ten characters per inch one option is inserted halfway in between.

Each emitter track actuates one pair of light emitting diode-photo transistor (LED-PTX) sensors within sensor assembly 72. Track A provides print initiation pulses, Track B provides turnaround information, and Track C indicates if the print heads are in either left or right margin.

If the line to be printed is shorter than the maximum print line length, typically 13.2 inches, then a signal for turnaround (reversal of print motor 76 direction) is given as soon as the last character has been printed. The motor now decelerates until it comes to a stop, and then immediately accelerates in the reverse direction until nominal speed is reached.

To keep track of the print head position, the number of emitters of Track A are counted. The A sensor keeps increasing the count regardless of whether the print assembly moves to the right or left. In order to indicate the true position of the print assembly, provision is made electronically to convert this count so that the count increases when the print assembly moves in one direction and the count decreases when moving in the opposite direction.

In order to accomplish this, Track B has been added. It is assumed that the print assembly is moving to the right. After the last character has been printed and the signal for turnaround has been given, the print assembly will continue to move to the right and the count will increase. However, as soon as the next transition has been reached on Track B, the count is frozen. The print head now comes to a stop and reverses. When it again passes the transition where the count was frozen, the emitter counts will now be subtracted and a true position indication is maintained by the counter for Track A.

The length of the Track B segments are chosen to be longer than the distance it takes the print head to come to a stop. The higher the print head speed and the longer the turnaround time, the longer must be the Track B segments. Thus, if the line is shorter than 132 characters at ten characters per inch, the carrier need not travel all the way to the right end of the print line. It may turn around soon after the printing is completed.

Figure 33A:
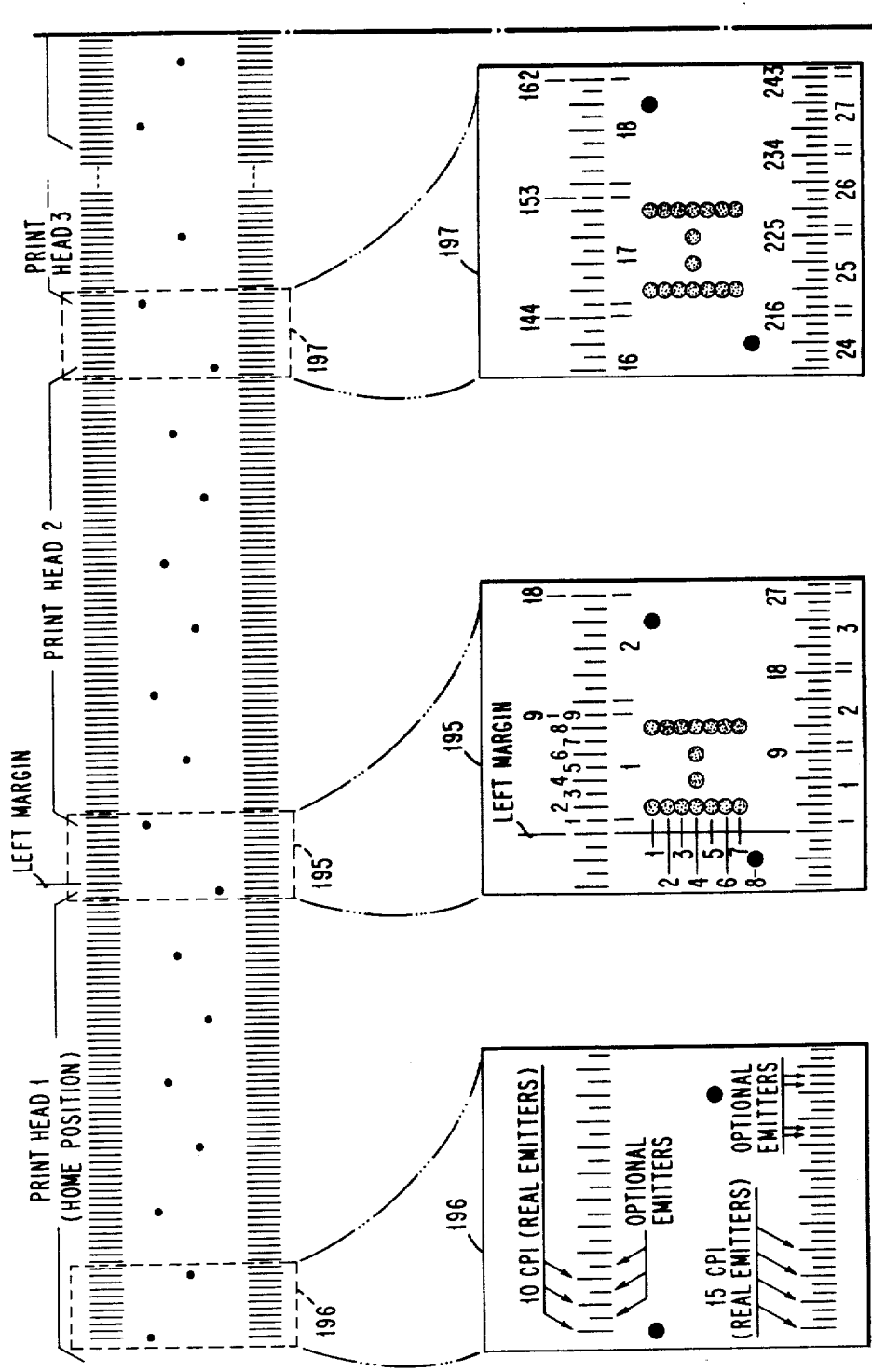

FIGS. 33A and 33B, when arranged as shown in FIG. 34, comprise a diagram showing the physical relationship of the print heads when in the home position relative to character locations on a form to be printed. In addition, the emitter relationships are shown.

In FIG. 33A, print head 1, comprising eight print wires, is normally to the left of the nominal left margin when in home position. Print head 2 lies to the right of the left margin when the print assembly is in home position and the other print heads up to eight, as an example, are physically located at successively further positions to the right in relation to the form. The print wires are arranged in a sloped serrated pattern and are displaced two character positions apart horizontally and one dot location apart vertically. In order to print the character "H" as shown in insert 195, it is necessary that all of the print wires in print head 1 sweep past the "H" character location to effect printing of the individual dots. As each wire passes by and reaches the appropriate position for printing of its assigned dot locations in a vertical direction, it is fired. Thus, formation of characters takes place in a flowing or undulating fashion insofar as the printing of the dots is concerned. That is, an entire vertical column of dots as in the left-hand portion of the character "H" is not formed all at once but is formed in succession as the eight wires in print head 1 sweep past that column. This is true of the printing of all other character columns, as well. As a result of this, each print head is required to pass at least far enough so that all of the wires in that print head will be able to print both the first vertical column of dots in the first character required as well as the last column of dots in the last character to be printed in the group of character locations assigned to that print head.

Accordingly, print head 1, during printing movement of carrier 31, prints all of the characters that normally would appear underneath print head 2 when the print heads are in their home position. The printing of dots associated with print head 2 takes place under the home position for print head 3 and so on.

Inset 196 illustrates the relationship of real and optional emitters, sometimes referred to as "false" emitters, for both ten characters per inch (CPI) and fifteen characters per inch (CPI). During the printing of characters at ten characters per inch, real emitters are found as indicated. These are physical real emitters derived from the emitter glass 71 as the print assembly sweeps from left to right or right to left during printing. The same real emitters are used for printing at fifteen characters per inch. However, when printing is at ten characters per inch, one additional (optional) emitter is necessary between each successive pair of real emitters to form the individual characters while, if characters are printed at fifteen characters per inch, two additional (optional) emitters are required between each successive pair of real emitters to handle the printing of dots for those characters.

Inset 197, FIG. 33A, illustrates the character locations associated with the rightmost print wire of print head 2 and the leftmost print wire of print head 3. Print heads 4–7 are not shown since the relations essentially repeat those shown with respect to print heads 1–3. The rightmost wires of print head 8 are shown in Inset 198, FIG. 33B. In addition, Inset 199 shows that for ten characters per inch, 132 characters can be accommodated in a full print line while for fifteen characters per inch, 198 characters are accommodated.

Figure 35:
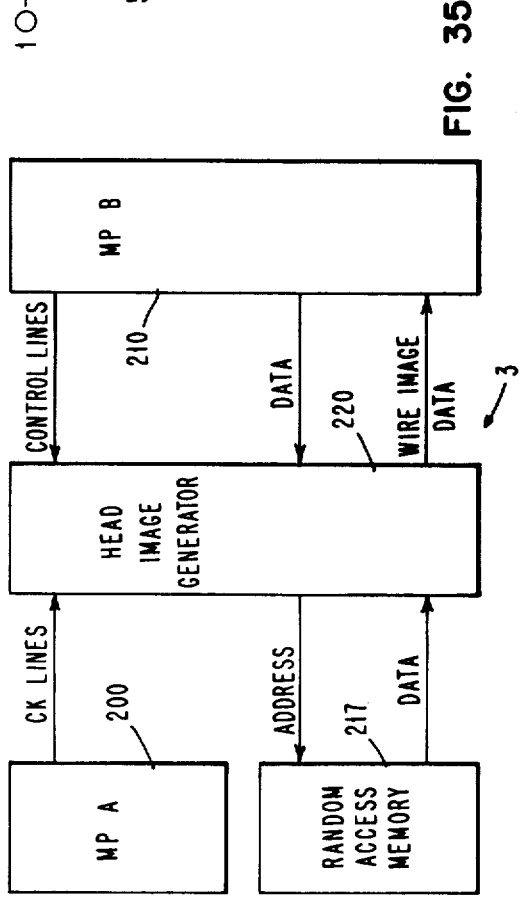
FIG. 35 is a generalized block diagram of the printer control unit shown in FIG. 1.

FIG. 35 is a highly diagrammatic block diagram of the general relationship of various system and control unit components including the two microprocessors 200 and 210 (Also designated MPA and MPB), the Head Image Generator 220 and the random access memory 217 and indicates how the information is transferred that is generated by the Head Image Generator to print dots on the paper by actuation of the actuators.

The microprocessors may be of the type described in U.S. patent application Ser. No. 918,223 filed June 23, 1978, now U.S. Pat. 4,179,738 which issued Dec. 18, 1979, having P. T. Fairchild and J. C. Leininger as inventors and entitled "Programmable Control Latch Mechanism for a Data Processing System".

Figure 37:
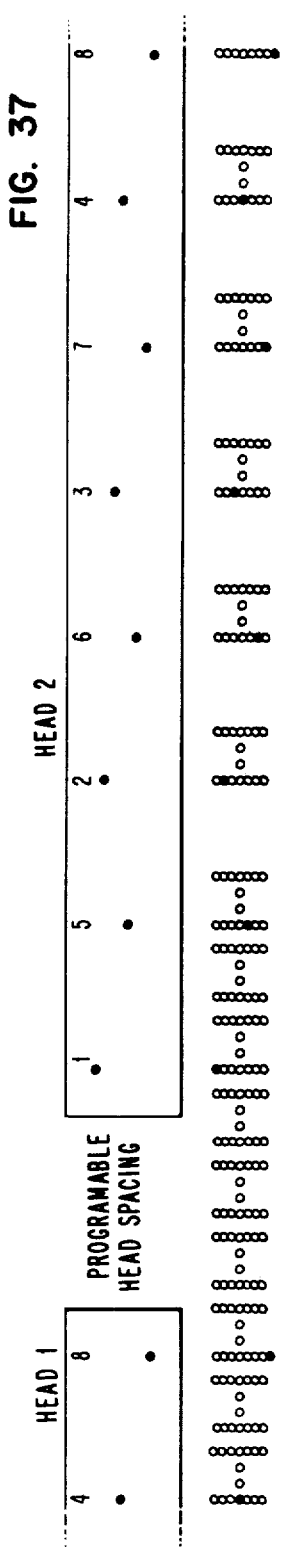

Microprocessor 200 handles communications; microprocessor 210 handles the control of the subsystems. Microprocessor 200 sets up in memory 217 the count and the text buffer that is to be printed at a selected addressable location. The information is then passed over to microprocessor 210 or the buffer that is to be used. The count is passed to the Head Image Generator 200 and also the address in memory 217 which is the text buffer to be printed. Head Image Generator (HIG) 220, knowing the buffer to be printed, accesses memory 217 and defines the dots for the characters to be printed at each of the successive columns assigned to each print head as print carrier 31 moves during printing. HIG passes the data to the Control microprocessor 210 giving it all the dots to be printed at that particular time. This is represented in FIG. 37 which includes a portion of head 1 and all of head 2. FIG. 37 illustrates printing at ten characters per inch. A string of "H's" is assumed to require printing. The darkened dots of the "H's" represent the wires above them that will actually print that dot. For example, in print head 1, wire 4 prints the fourth dot down in the first column of the leftmost "H". This is the second slice of firing for that particular character with another three wire fires being required for wire 4 to complete the horizontal bar portion of the "H". The other seven wires in print head 1 fire at appropriate times to complete their assigned horizontal rows in that character. At head 2, wire 1 is over an "H"; there is no wire over the next "H"; and wire 5 is over the third "H". If printing was at fifteen characters per inch, there would be no wires over two characters between wires 1 and 5 of head 2, rather than just one character as illustrated.

Figure 36:
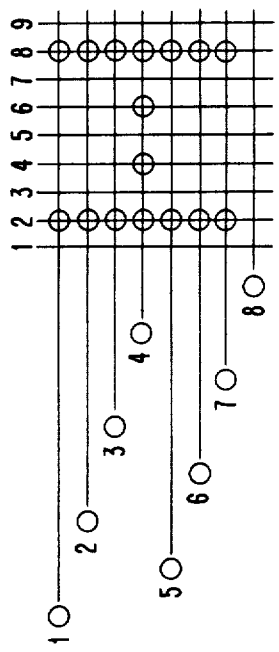
FIGS. 36 and 37 further illustrate the arrangement of dots to form characters and the relationship of the print wires to the various character locations.

The wire layout of "1 5 2 6 3 7 4 8" in FIG. 37 relates to the layout in FIG. 36 where it is shown how an "H" is laid out in relation to the actual wire slices.

PRINTER ATTACHMENT

The printer subsystems may be connected by an interface cable to a controlling device (controller). The printer can be connected to the controlling device itself, or to another printer (or work station unit) with additional cabling.

CONTROLLING DEVICE

Figure 38:
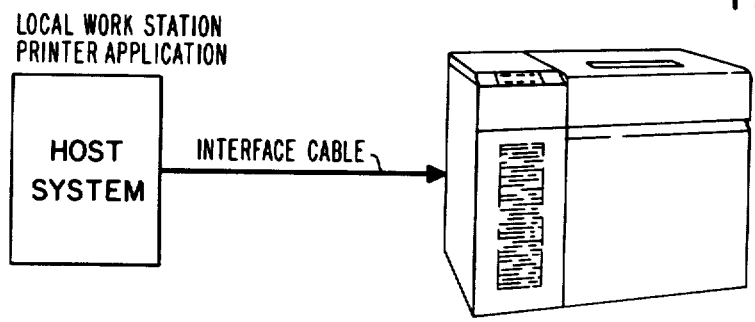
FIGS. 38-40 illustrate various systems in which the printer subsystem may be connected.
Figure 39:
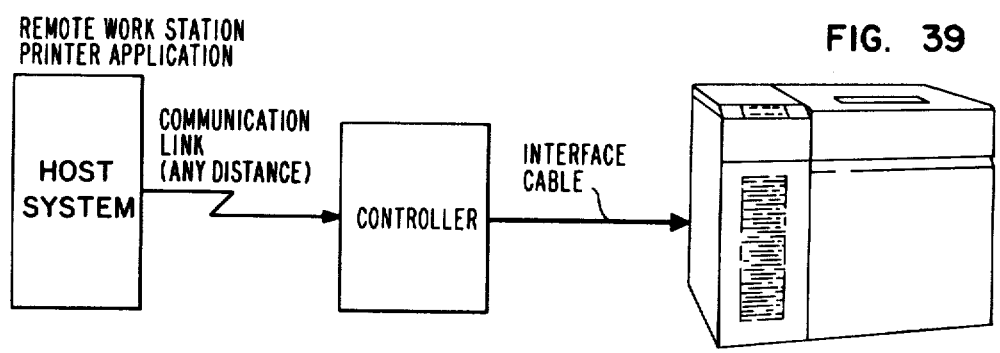

The controlling device to which the printer subsystem is attached may be a host computer system, FIG. 38, or a controller at a remote work station, FIG. 39. In either case, all information transfers (exchanges) between the controlling device and the printer control unit are started from the controlling device by a command. Information transfers ordinarily are not initiated by the printer.

In some applications, the printer subsystem may be directly connected to a host computer system, as in FIG. 38. In such applications, all commands (operational and formatting) are supplied by the computer, along with the data to be printed. Responses from the printer are sent directly to the computer from the printer control unit.

In other applications, FIG. 39, the printer subsystem may be connected to a work station controller, which in turn is remotely connected to a host computer system by a communications network—such as Systems Network Architecture/Synchronous Data Link Control (SNA/SDLC). In such applications, information (data) to be printed and printer formatting commands are transferred from the computer system to the work station controller. The work station controller then generates the operational commands and transfers all this information to the printer. Responses from the printer are sent to the work station controller then to the computer system by the communications network.

CABLE THROUGH CONNECTOR

Figure 40:
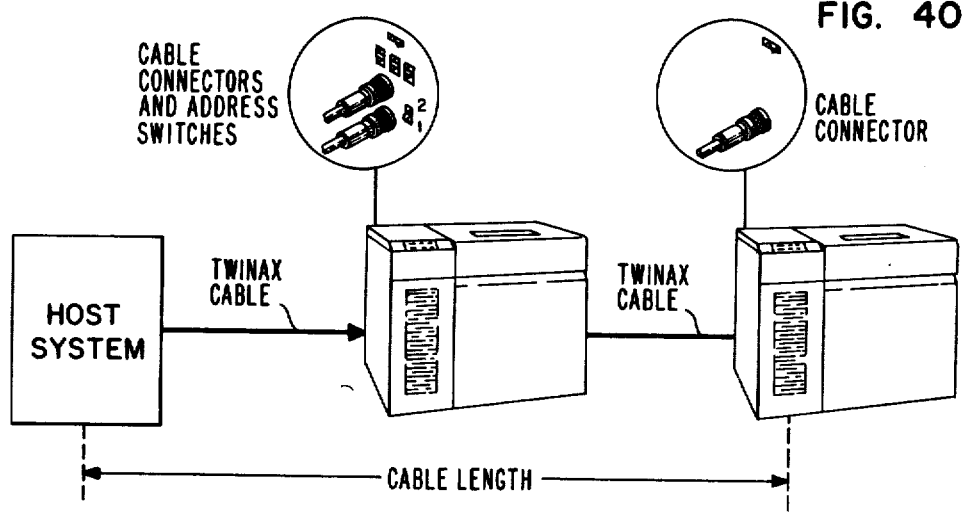

The Cable Through Connector feature, FIG. 40, connects multiple printers or other work station units on the same interface cable line to the system or controller.

Units with this feature have address-setting switches and an additional cable connector. The customer assigns a unique address to each unit on the cable connector line and sets the address switches at installation time. The feature is not needed on the last unit on the line. The number of units that can be connected to the same line depends on the capability of the controlling device.

With this feature, the maximum cable length restriction is from the controlling device to the last unit on the line.

AUDIBLE ALARM

The optional alarm produces a tone that alerts the operator to conditions that require operator attention.

INTERFACE CABLE

The interface cable may be either coaxial or twinaxial. Representative maximum cable lengths from the controller to the last device on the interface are:

Coaxial cable—610 m (2000 ft.)
Twinaxial cable—1525 m (5000 ft.)

The type of cable selected depends on the requirements of the controlling device to which the printer subsystem is attached.

INFORMATION TRANSFER

Data Stream

All information transferred between the controlling device and the printer subsystem is in the form of a serial "stream" of information bits, FIG. 41. Contained in this stream are:

Bit synchronization patterns
Frame synchronization patterns
Data frames

The bit and frame synchronization (sync) patterns establish timing control between the controlling device and the printer. The data frame is the unit of information used to transfer all commands, data to be printed, and status information.

The data stream can flow in either direction on the interface cable—but only in one direction at a time (half-duplex). The controlling device always initiates the data stream flow for either direction. Only one device on the interface can be communicating with the controlling device at a time.

The data stream flows on the interface for each transfer of single or multiple frames of information. The cable carries no signal between information transfers.

In a typical information transfer from controller to printer, the information stream may be a mixture of operational commands, formatting commands, and data to be printed. Blocks of up to 256 frames may be included in the information stream for a given transfer.

The information stream for any information transfer always begins with the bit-sync and frame-sync patterns, and ends with an end-of-message code in the last frame of the sequence. The end-of-message code causes turnaround on the cable, allowing status information to be transferred in the opposite direction on the cable on the next sequence.

INFORMATION FRAME

The basic unit of information transfer is a 16-bit information frame. The information frame is used for transferring all commands, data, and status information between the controlling device and the printer. A Receive mode from controller to printer is illustrated in FIG. 42 and a Transmit mode from printer to controller is illustrated in FIG. 43.

The 16 bits of the information frame are assigned the following significance: Bits 0 through 2, the fill bits, always 000, are for timing control. Bit 3, the parity bit, is set to maintain an even bit count (even parity) in each frame.

Bits 4, 5, and 6 are the address bits for selecting a specific printer (or other work station unit) attached to the interface. Up to seven units can be addressed by combinations of these bits (000 through 110 are valid addresses). A bit combination of 111 indicates an end-of-message and causes line turnaround.

Bits 7 through 14 are for commands, data or status information. Bit 15, always on, is a synchronization bit.

PRINTER ADDRESSING

Figure 44:
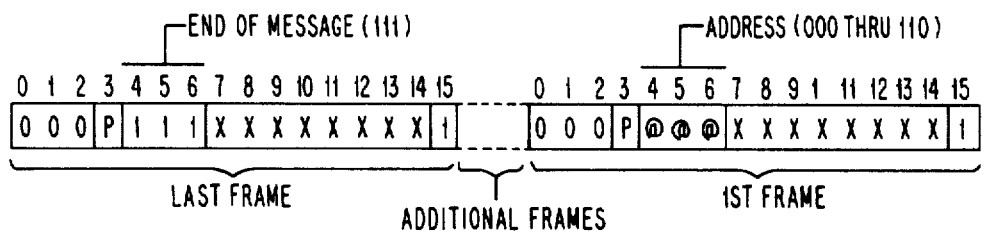
FIG. 44 illustrates the bit configurations for printer addressing.

Printer addresses are coded in bits 4, 5, and 6 of the information frame, FIG. 44. The address for a single printer on the interface cable is 000. With the Cable Connector feature, addresses can range from 000 through 110. Addresses of printers attached with the Cable Connector feature are set with switches by the customer. A bit combination of 111 is used as an end-of-message indicator in the last frame of a transfer sequence and, therefore, cannot be used as a valid address.

The first frame following any signal turnaround on the cable is a command frame containing a valid printer address (000 through 110) for selecting a specific printer on the interface cable. Each successive frame following a command frame is then checked for the end-of-message code (111).

All response frames from the printer to the controlling device, except the end-of-message frame, contain the address of the selected printer.

PRINTER RESPONSES

All information transfers between the controlling device and the printer are initiated from the controlling device by command frames. The printer, however, does transfer information to the controller on request. These transfers are called printer "responses".

In general, printer response frames are requested by the controller to determine the readiness (or "status") of a printer for accepting data from the controller. A variety of printer operational and error conditions are reported to the controller by means of printer response frames. These conditions are described in detail in the section below entitled "Status and Error Information".

PRINTER CONTROL UNIT

The printer control unit 3 (See FIGS. 1 and 35, as examples) connects the printer to the interface cable from the controlling device, controls the flow of information to and from the controlling device and controls all internal printer functions.

When data is received for printing, the printer control unit formats the data into print lines, using formatting commands (control codes) embedded in the data stream. Two print-line format buffers are used so one line can be printed while the next line is being formatted. This comprises a "lookahead" function which allows bidirectional printing for maximum throughput.

INFORMATION CODES

All 256 8-bit codes of the Extended Binary Coded Decimal Interchange Code (EBCDIC) are recognized by the printer control unit. In a data stream hexadecimal codes of 00 through 3F represent formatting commands, 40 through FE represent data (FF is always a blank character.)

All of these codes may be used to represent characters.

OPERATIONAL COMMANDS

Figure 45:
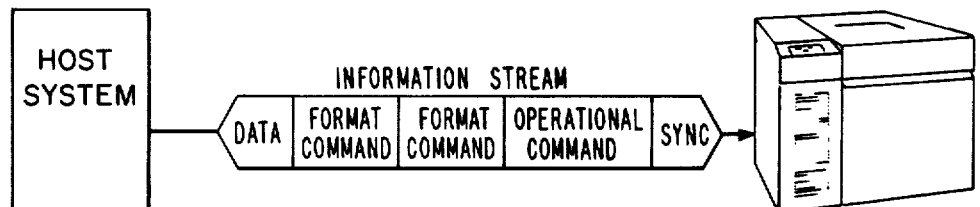
FIG. 45 shows command and data arrangements in the information stream.

Operational commands, listed in Table I below, determine the printer function to be performed, such as Write Data, Read Status, etc. Also, see FIGS. 45 and 47A. FIG. 47A illustrates a representative operational command: "Poll." Some operational commands require an additional command or data frame. In these cases, the next frame transmitted must contain that command or data frame. Operational commands are embedded in the data stream wherever required for proper control of the printer. The Hex Code given is for bits 7 through 14 of a data frame.

OPERATIONAL COMMAND SEQUENCE

Figure 46:
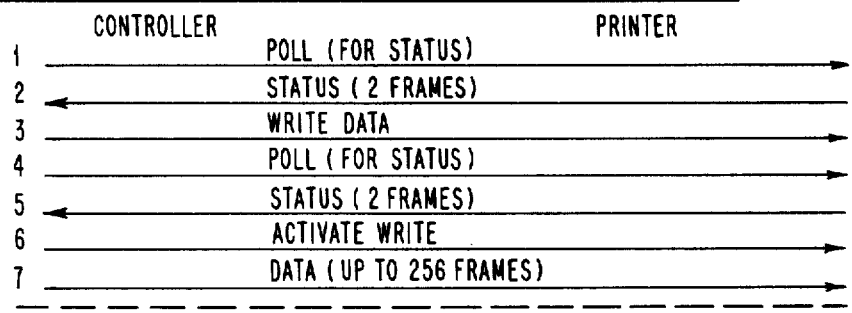
FIG. 46 is a chart illustrating a typical transfer of data to be printed.

The diagram in FIG. 46 illustrates a representative sequence of events between a controlling unit and the printer subsystem to effect printing of data.

TABLE I
OPERATIONAL COMMAND SUMMARY

| Command Name | Hex Code | Function |
|---|---|---|
| Poll | X0 | Poll causes a one-frame status response from the printer until a Set Mode command is issued; thereafter, Poll initiates a two-frame status response. Bit 8 set to 1 resets line parity error indication. Bit 9 notifies the printer to send current status frames. |
| Read Device ID | 0C | Initiates the transfer of the ID (Identifier) frame from the printer to the controlling device. Must be followed by an Activate Read command. |
| Read Status | 88 | Initiates the transfer of one frame of outstanding status from the printer. Must be followed by an Activate Read Command. |
| Activate Read | 00 | Required to complete Read Device ID or Read Status operations. This command signals the hardware that data is to start a transfer and is not placed in the command queue. |
| Write Data | 1E | Causes the printer to store all data frames after the Activate Write. |
| Activate Write | 01 | Causes printing of data frames that follow this command. This command signals the hardware that data is to start a transfer. This is not placed in the command queue. |
| Write Control Data | 05 | Resets exception or outstanding status. |
| Set Mode | 13 | Must be issued before the printer accepts any other command except Poll and Reset. Followed by a data frame that defines the interval between frames. |
| Reset | 02 | Resets printer to a power-on reset condition. |
| Clear | 12 | Clears all print data buffers. |
| End-of-Queue (EOQ) | 62 | Marks end of command queue loading. |

FORMATTING COMMANDS

FORMATTING COMMAND FUNCTION

Formatting commands, shown in Table II below, control forms movement and line length. They are embedded in the information stream that follows the Write Data command, FIG. 45. Also, See FIG. 47B which illustrates a representative formatting command: "New Line."

Some formatting commands require more than one frame. A code in the first frame identifies multiple frame commands. In some cases the code in the second or third frame further defines the total number of frames to be used. The formatting command codes are also referred to as "standard character string" (SCS) codes. SCS is an SNA control-character subset.

TABLE II

FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| Null (NUL) | 100 | | | | | | No Operation performed. |
| Carriage Return | 0D | | | | | | Moves the print position to the first position of the current line. |
| New Line | 15 | | | | | | Moves the print position to the first position of the next line. |
| Interchange Record Separator (IRS) | 1E | | | | | | Same as New Line. |
| Line Feed (LF) | 25 | | | | | | Moves the print position to the same horizontal position of the next line. |
| Form Feed (FF) | 0C | | | | | | Moves the print position to the first position of the next page. |
| Bell (BEL) | 2F | | | | | | Turns off Ready, turns on Attention and the audible alarm, and stops printing. |
| Absolute Horizontal Position (AH) | 34 | C0 | NN | | | | Moves the print position to the horizontal position specified in the parameter frame. The parameter frame NN immediately follows the AH command. |
| Absolute Vertical Position (AV) | 34 | C4 | NN | | | | Moves the print position specified in the parameter frame. The parameter frame NN immediately follows the AV command. |
| Relative Horizontal Print Position (RH) | 34 | C8 | NN | | | | Moves the print position horizontally towards the end of the line from the current print position the number of columns specified in the parameter frame. The parameter frame NN immediately follows the RH command frame. |
| Relative Vertical Print Position (RV) | 34 | 4C | NN | | | | Moves the print position vertically towards the bottom of the page from the current print position the number of lines specified in the parameter frame. The parameter frame NN immediately follows the RV |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| set Horizontal Format (SHF) | 2B | C1 | NN | HH | | | command frame. Sets the print line length to the value specified in the parameter frames. The parameter frames NN and HH immediately follow the C1 command frame. |
| Set Vertical Format (SVF) | 2B | C2 | NN | VV | | | Sets the page length to the value specified in the parameter frames. The parameter frames NN and VV immediately follow the C2 command frame. |
| Set Graphic Error Action (SGEA) | 2B | C8 | NN | GG | UU | | Sets the unprintable character option and defines the default graphic that is specified in the parameter frames. The parameter frames NN, GG, and UU immediately follow the C8 command frame. |
| Transparent (TRN) | 35 | NN | | | | | Permits the codes normally used as control characters to be used as printable characters. The parameter frame NN specifies the number of frames that follows the 35 command frame. |
| Subscript (SBS) Not available for single direction paper feed. | 38 | | | | | | Line feeds 1.41 mm (4/72 in) to print subscript characters. |
| Superscript (SBS) Not available for single direction paper feed. | 09 | | | | | | Reverse line feeds down 1.41 mm (4/72 in.) to print superscript characters. |
| Set Character Distance (SCD) | 2B | D2 | 04 | 29 | P1 | P2 | Sets the character density to 10 or 15 cpi as specified in the P1 and P2 parameter frames. |
| Set Baseline Increment (SBI) Not available for single direction paper feed. | 2B | D2 | 04 | 15 | P1 | P2 | Sets the depth of one line of print to .176 mm (1/144 in.). |
| Set CGCS through Local ID (SCL) CGCS-Coded Graphic Character Set | 2B | D1 | 03 | 81 | P1 | | Loads 1 of 16 graphic character sets specified in the P1 parameter frame. |
| Absolute Move Base- | 2B | D3 | 04 | D2 | P1 | P2 | Moves the print position forward |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| line (AMB) Not available for single direction paper feed | | | | | | | in the vertical direction from the current print position to the new print position specified in the P1 and P2 parameter frames. |
| Relative Move Baseline (RMB) Not available for single direction paper feed. | 2B | D3 | 04 | D4 | P1 | P2 | Moves the print position forward or backward in the vertical direction from the current print position to the new print position specified in the P1 and P2 parameter frames. |
| Load Alternate Characters (LAC) | 2B | FE | NN | MM | | | Data allows customer designed fonts or characters to be loaded for printing. |
| Set Line Density (SLD) | 2B | C6 | NN | P1 | | | Selects vertical line density of 6 or 8 lines per inch or any distance in multiples of 1/72 inch up to 255. |

STATUS AND ERROR INFORMATION
Poll Response Frames

Following a power-on reset (POR), the printer subsystem responds to controller polling with a single status frame, FIG. 48. The printer continues to respond to controller polling with a single status frame until the printer receives a Set Mode command.

After receiving a Set Mode command, the printer responds to polling with two status frames, the second of which is shown in FIG. 49.

Status information described in frame 1, FIG. 48, is the same in either case.

Bits 0, 1, 2—Fill.

These bits are always set to 000 and are used for timing control.

Bit 3—Parity.

This bit is used to maintain an even bit count (even parity).

Bits 4, 5, 6—Printer address.

These bits are used for selecting a specific printer attached to the interface. Up to seven printers can be addressed by the combinations (000 through 110). A bit combination of 111 indicates an end-of-message and causes line turnaround.

Bit 7—Busy.

0 = Not busy when operational command queue is empty.
1 = Busy when operational command queue is not empty or an activate command is received.

Bit 8—Line parity.

0 = No line parity error is detected in a received frame.
1 = LIne parity error is detected in a received frame.

Bit 9—Unit not available.

0 = Unit available (the Ready light is on).
1 = Unit not available.

Bit 10—Outstanding status.

0 = No outstanding status.
1 = Outstanding status (available by using the Read status command).

Bits 11, 12, and 13 indicate a variety of exception status conditions. Until the exception status is reset, only Poll, Set Mode, and Reset commands are processed. The Write Control Data Command (if the exception status is not power-on transition) is also processed. The power-on transition exception status is reset by the Set Mode command. The exception status conditions are reset by the Write Control command (see "Write Control Data").

| Bit 11 | Bit 12 | Bit 13 | Meaning |
|---|---|---|---|
| 0 | 0 | 0 | No exception status exists. |
| 0 | 0 | 0 | Activate lost - caused by a line parity error following a Write Data, Read Status, or Read Device ID. |
| 0 | 1 | 0 | Invalid activate command - caused when a Write Activate follows a Read Status or Read Device ID or, a Read Activate following a Write Data. |
| 0 | 1 | 1 | Reserved. |
| 1 | 0 | 0 | Invalid command - caused when a |

-continued

| Bit 11 | Bit 12 | Bit 13 | Meaning |
|---|---|---|---|
| | | | command is outside the operational command set or more than 240 microsecond interframe interval has been specified. |
| 1 | 0 | 1 | Input queue or input buffer overrun - caused when more than 16 commands and associated data frames or more than 256 data frames have been sent. |
| 1 | 1 | 1 | Power-on transition-causes only status frame 1 to be sent in response to a Poll command. |

Bit 14—Current/Previous response level.

When bit 14 goes from 0 to 1 or 1 to 0, the using system determines that the response frame is current status. When bit 14 is unchanged from the previous response, the using system determines that the response frame is previous status. Any change in the response frame changes bit 14 from its previous state. Bit 14 is set to 0 after power-on.

Bit 15—Sync.

A synchronization bit that is always set to 1. Frame 2 contains information shown in FIG. 49.

Bit 0 through 6

Same as Poll status frame 1.

Bit 7—Invalid SCS (standard character string) control.

0=No Invalid SCS Control Code is detected.
1=Invalid SCS Control Code is detected. Reset by a Reset or Clear command.

Bit 8—Invalid SCS (standard character string) parameter.

0=No Invalid SCS parameter is detected.
1=Invalid SCS parameter is detected. Reset by a Reset or Clear command.

Bit 9—Receive buffers full.

Used by the using system to determine when data can be sent to the printer.
0=Receive buffers are not full.
1=Receive buffers are full.

Bit 10—Print complete.

The print complete bit is set to 0 when the printer detects an Active Write command. The print complete bit is set to 1 by Power-on reset, a Clear command, a Reset command, or when all input data is printed.
0=Printing is in progress.
1=Printing is completed.

Bit 11—Cancel Request.

The Cancel request bit is set to 1 when the operator presses the Cancel key on the Operator Panel. This bit is reset by the next Poll command (with Acknowledge bit set to 1), a Reset or Power-On reset.
0=No cancel request.
1=Cancel request.

Bit 12—Not used.

Bit 13—Not used.

Bit 14—Graphic check.

This bit set to 1 indicates that an undefined character has been detected in the data stream. This bit is reset by the next Poll command (with Acknowledge bit set to 1), a Reset or Power-On reset.
0=No graphic error is detected.
1=Graphic error is detected.

Bit 15—Same as Poll status frame 1.

Read Status Response Frame

One response frame is sent for every Read Status command. The response frame, sent only after the Activate Read command is received, contains a hex code that defines the status condition within the printer.

The hex code corresponds to the last two digits of the error code that may be available as a system error message (depending on the using system). The first digits of these hex codes are also automatically displayed on the printer operator panel 26 when the error occurs.

The defined conditions are:

| Hex Code | Error Condition |
|---|---|
| 11 | Printer controller error |
| 12 | Cable adapter error |
| 31 | Head drive problem |
| 32 | Margin emitter not detected |
| 34 | Turnaround emitter not detected |
| 35 | Print emitter not detected |
| 36 | Head busy (cannot be reset) |
| 37 | Printer control unit |
| 38 | Overcurrent |
| 41 | Forms drive problem (undertermined area) |
| 42 | Forms busy (cannot be reset) |
| 43 | Forms emitter B not detected |
| 44 | Forms emitter A not detected |
| 45 | Run latch failure (printer control unit) |
| 46 | Printer control unit |
| 47 | Overcurrent |
| 48 | Emitter sequence wrong |
| 80 | Ribbon jam |
| 81 | Ribbon jam (diagnostic mode) |
| 82 | Ribbon problem |
| 83 | Head Image Generator error |

PRINTER GENERAL BLOCK DIAGRAM

Figure 50:
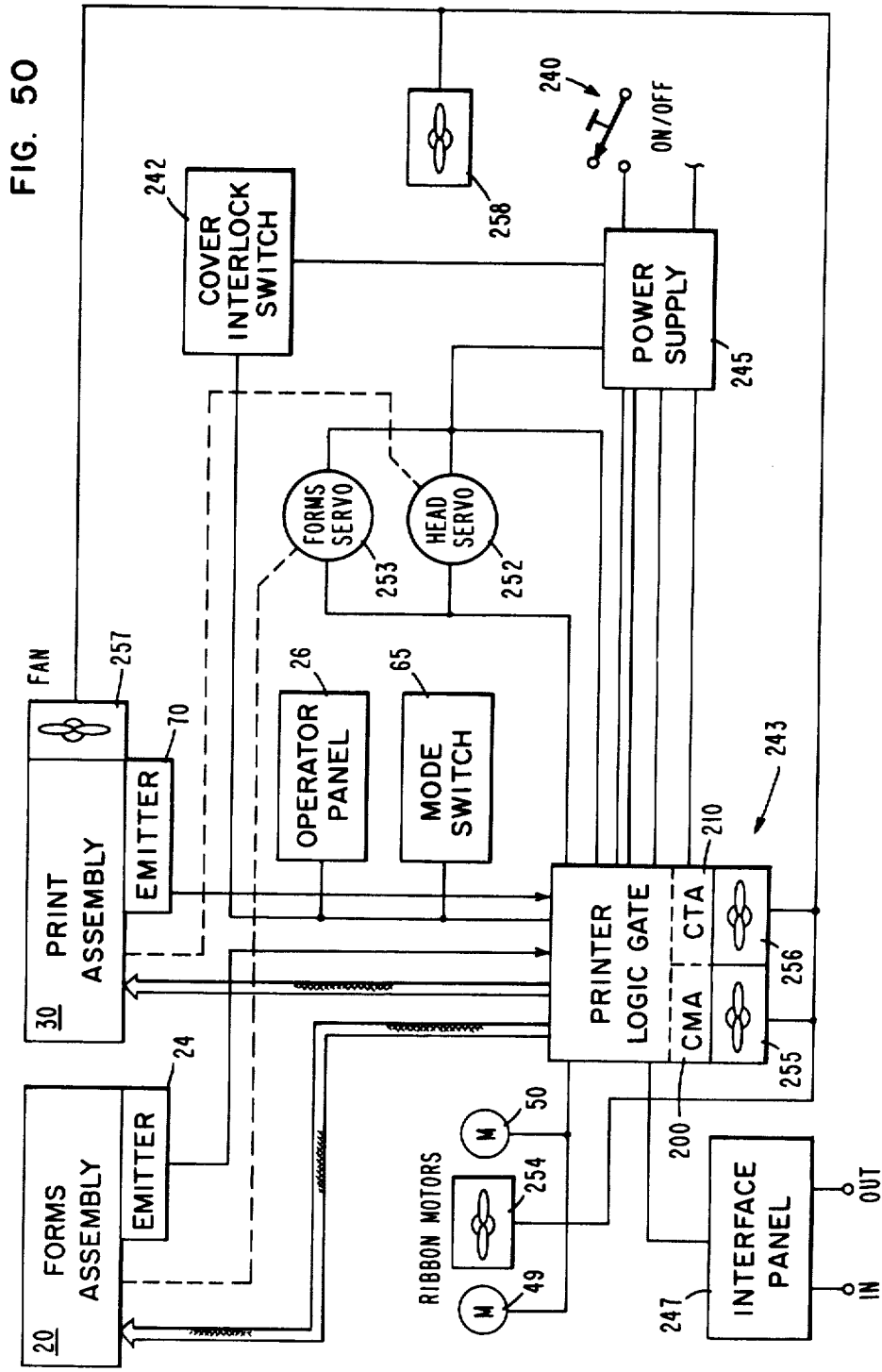
FIG. 50 is a block diagram of various circuit components used in the printer subsystem of FIGS. 1 and 2.

FIG. 50 illustrates various printer blocks of interest. A power supply 245 supplies the unit with all the power to drive and to control. The on/off switch 240 controls power supply 245 being on and off. From the power supply the cover interlock switch 242 enables and disables the 48-volt drive which controls much of the printer logic 243. Logic 243, once enabled, looks at operator panel 26 for information as to the operations to be performed. Mode switch 65 tells the logic which type of operation in testing procedures should be run. Print assembly 30 is controlled by the printer logic along with the forms assembly 20. Emitter devices 24 and 70 supply positional information to the printer logic. The printer logic also controls and talks with the interface panel 247 and passes information on the other parts of the printer. The ribbon motors 49 and 50 are controlled in an on/off fashion by printer logic 243 which accepts inputs from the ribbon assembly to determine when the end of ribbon has occurred. Head servo 252 is a control block that insures that the print head is in the proper position at the proper time for the actuators to fire. Forms servo 253 is a control block that moves the forms to desired locations. Fans 254–258 are used to control temperature within the machine. As indicated in connection with FIG. 35, printer logic 243 includes two microprocessor adapter blocks 200 and 210. The first one included is the Communications adapter CMA which accepts input and passes it to the second one which is the Control adapter CTA that actually controls the printer. These will be discussed in connection with FIGS. 51A and 51B.

MICROPROCESSOR CONTROL—PRINTER SUBSYSTEM

Figure 51A:
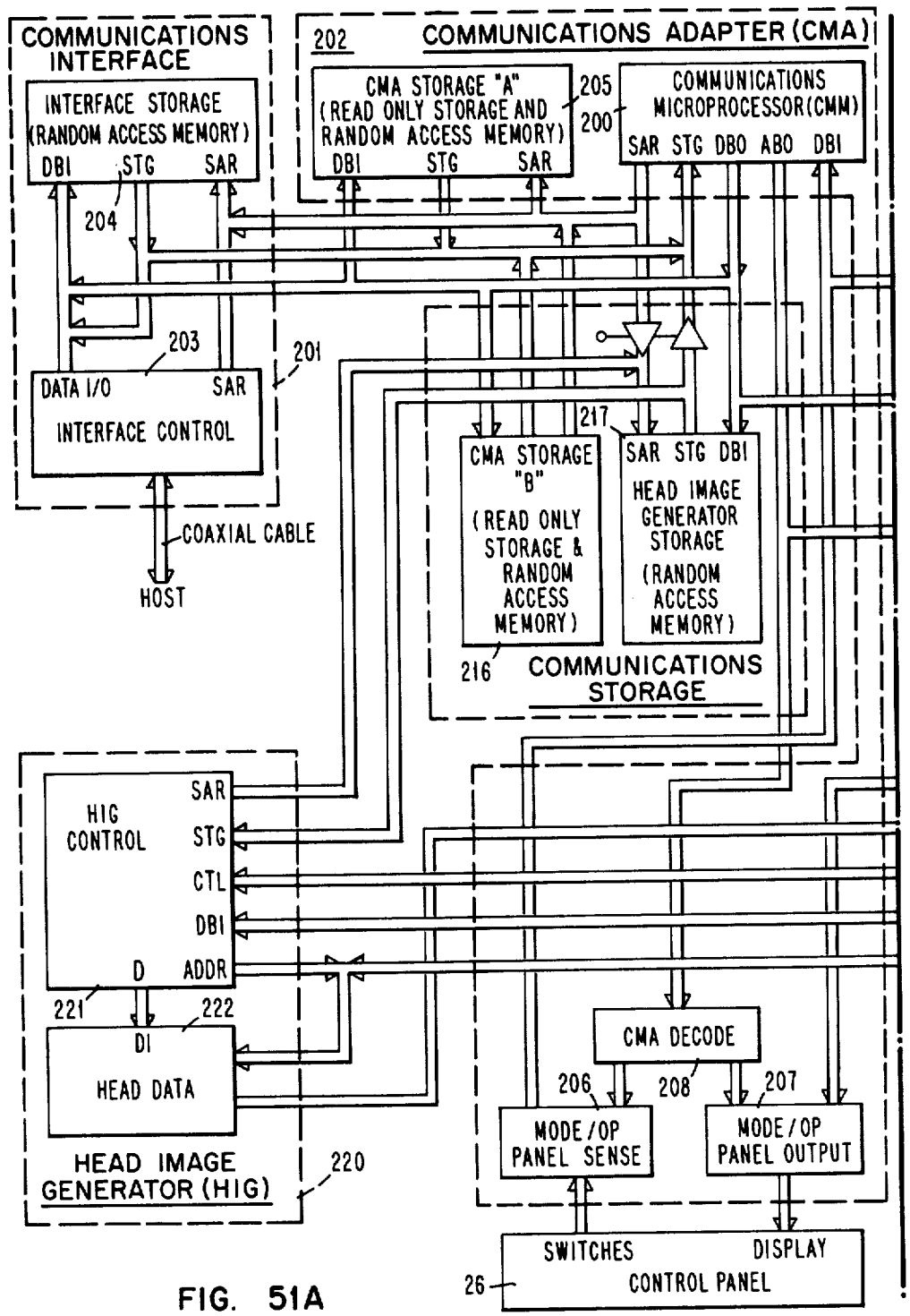
FIGS. 51A and 51B, when arranged as shown in FIG. 52, comprise a block diagram of the printer control unit including a Communications microprocessor (CMM) and a Control microprocessor (CTM) as well as a number of elements in the printer unit.
Figure 51B:
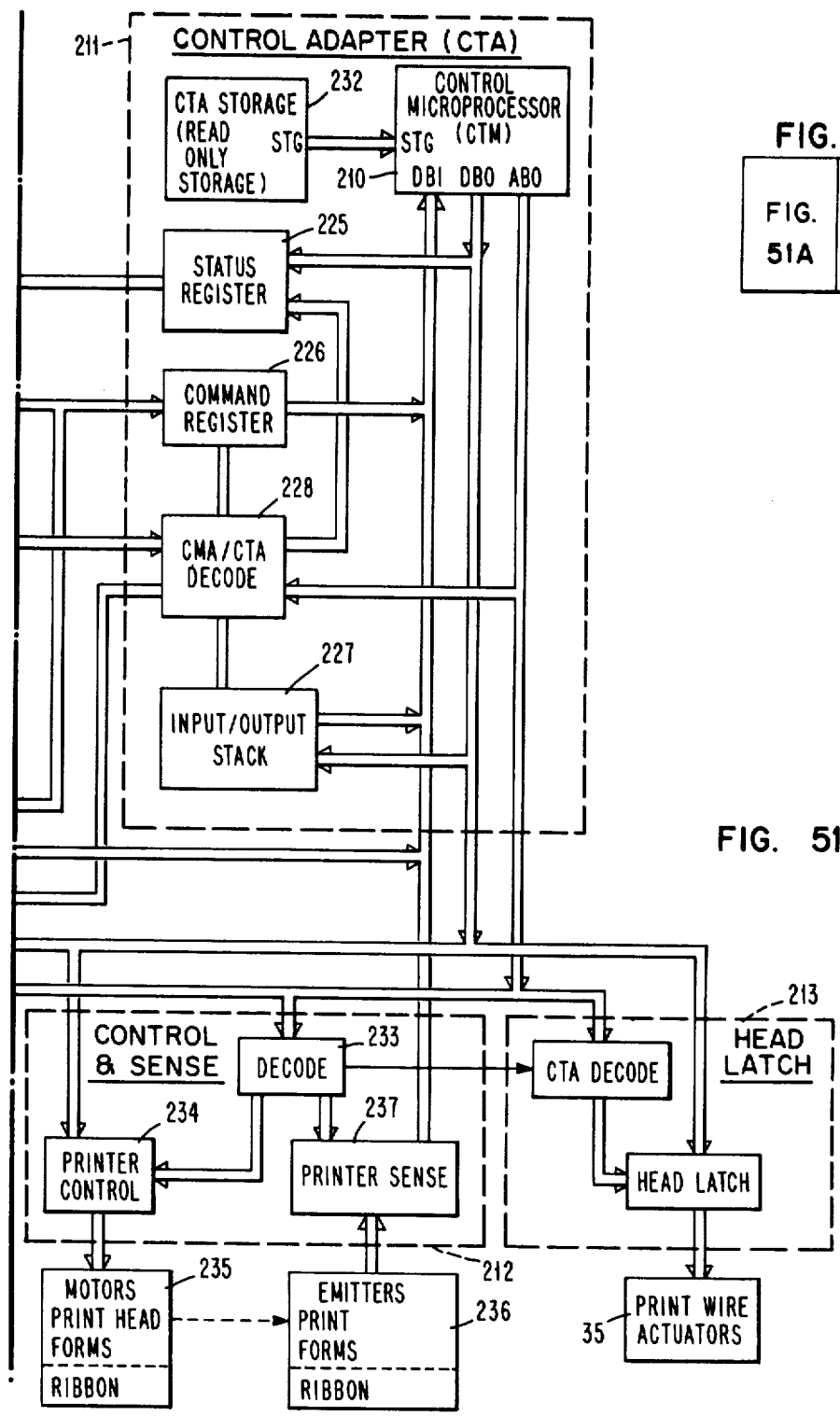

Two microprocessors are provided for the printer subsystem, each having its assigned functions and both can operate concurrently to accomplish the required functions. FIGS. 51A and 51B join together as shown in FIG. 52 to illustrate the details of the Printer Control Unit 3 and Electronics 4, FIG. 1. Various abbreviations used herein are listed in Table III below:

TABLE III

| | |
|---|---|
| ABO | Address Bus Out |
| CMA | Communications Adapter Card |
| CTA | Control Adapter Card |
| CTL | Control |
| D | Data |
| DI | Data In |
| DBI | Data Bus In |
| DBO | Data Bus Out |
| HIG | Head Image Generator |
| MODE/OP | Mode/Operation |
| ROS | Read Only Storage |
| SAR | Storage Address Register |
| STG | Storage Bus In |

There are actually seven main blocks comprising the Printer Control Unit representing seven printed circuit cards. The firsst block is the Communications Interface 201 between the host system and digital printer electronics. That interface communicates with the Communications Adapter (CMA) 202 which is a microprocessor card that takes the host information and compiles it into a form that can be used by the rest of the printer. The CMA includes Communications microprocessor CMM 200. From there, the information is passed on to the Head Image Generator 220 card for building images for the printer. There is another microprocessor card that is the Control Adapter Card (CTA) 211. The CTA includes Control microprocessor CTM 210. The Control Adapter handles the processed information from the Communications Adapter, controls all the mechanical elements of the printer, such as the motors, and receives emitter signals indicating positions of the mechanical elements. This Adapter handles communication with the actual hardware through the Control and Sense card 212 and the Head Latch card 213 that stores the data to be outputted to the wire actuators.

Within the Communications Interface are two blocks. One is the Interface Control block 203; the other is the Interface Storage block 204. The Interface Control block 203 interprets the information coming from the host system in an analog signal form, processes it into digital form, and generates the necessary timing signals to be able to store this information in the Interface Storage 204. The Interface Storage 204 is a Functional Storage Unit (FSU) random access memory which is sized at one K (1K) bytes. All data and commands from the host system go into this Interface Storage; it acts as a buffer for the Communications Adapter 202. Within the Communications Adapter card, there are five blocks. There is the Communications microprocessor 200 (CMM) and its corresponding storage 205 designated "A" which includes both random access memory and read only storage (ROS). There is a mode/Op Panel and Sense block 206 that can read the panel 26, a Mode Op Panel Output block 207 to output displays to the panel, and Decode Logic 208 for these functions. The Communications Adapter 202 translates the information that the host has sent over through high-level or hand-shaking type procecedures and translates it into much more simple terms such as characters to be printed or carriage returns, or line feeds—any other mechanical type control that needs to be performed. Its program is stored in the Read Only Storage (ROS) of the CMA "A" storage. There are 6K bytes in this ROS. The CMA also handles Hardware Operator commands involving printing the printer online, taking it off-line and displaying any type of status information through the display on the Mode Operator Panel 26.

The Communications Storage card 215 has two blocks entitled CMA Storage "B" designated 216 and Head Image Generator (HIG) Storage 217. Storage "B" block 216 contains up to 14K bytes of ROS storage in FSU technology for the Communications Adapter microprocessor 200. The random access memory storage 217 has 3K bytes for the Head Image Generator and is where the Communications microprocessor stores character images to be printed. The character images in this storage are used by the Head Image Generator to generate actual images for the slanted heads. Also, in the block of Random Access Memory are two text buffers and some scratch pad storage.

Because of the staggered slant geometry of the print head assembly and the multiple head configuration, a fairly complex Head Image Generator 220 (HIG) is required to convert conventional character dot format to a slanted format. HIG processes the character images as they would normally appear in a "straight-up" format, but slants them for the Head Latch block 213 to supply to the print wire actuators. This is done through hardware routines that are performed in the Head Image Generator 220. There are basically two blocks in the Head Image Generator, one block being the Control block 221 that actually performs the hardware routines to take the unslanted image and slant it. There is also a Data block 222 that is a small storage unit in which the Head Image Generator stores the slanted information currently being worked on. The Control Adapter 211 can then read this storage and output to the wire actuators through Head Latch 213. This is the slanted data.

The Control Adapter (CTA) 211 has six blocks within it. The Control microprocessor (CTM) 210 receives intputs from various sensors, e.g., ribbon reverse/jam, forms jam, head position, linear encoder, forms position encoder, as well as print commands and data from CMM 200 and HIG 220 and generates print wire firing signals and various control signals to control the ribbon drive, print head drive, print wire actuators, and forms drive. The Control microprocessor (CTM) 210 has a ROS storage 232 that is 12K bytes of FSU ROS to contain its programs or routines. Certain communication registers including Status register 225 and Command register 226 allow the Communications Adapter 202 and the Control Adapter 211 to communicate with one another. Through these registers go commands such as Print commands, Forms commands, Carriage Returns, and the actual decoded messages that the host has sent over. An Input/Output stack 227 is used as a local storage, that is, it is a small random access memory for the Control Adapter to store intermediate data and there is some associated decoding. The Decode block 228 handles the timing relationships for the Communications Adapter and Control Adapter to be able to talk to one another asynchronously.

The Control and Sense card 212 handles the information from the Control Adapter card 211 and interfaces with the actual printer electronics to control by way of Decode block 233 and Printer Control block 234 the head motor, the forms motor, and the ribbon motors represented by block 235. Through blocks 236 and 237 it senses the positional state of printer electronics and mechanics such as the print emitters, forms emitters, etc.

The Head Latch card 213 is another interface card from the Control Adapter that latches up the wire image data, the slanted data that is received from the Head Image Generator 220, and outputs it at the correct time to the print wire actuators so that the dots get printed in the correct place on the form.

A typical print operation is now described. It is assumed that a single print line is provided by the host with a Forms Feed and Carriage Return at the end which is a typical situation. This information comes over in a serial stream from the host as analog signals into the Communications Interface 201 which digitizes the analog signal and stores it in its Interface Storage 204 in the form of characters to be printed. A command informs the Communications Adapter 202 that this is a line to be printed and that it has Line Feed and Carriage Return commands. The Communications Adapter 202 seeing this information appear, will take the characters to be printed out of the Interface Storage 204 and put them into a selected text buffer in CMA Storage "B" on Communications Storage card 215. It then tells the Control Adapter 211 that it has information in a text buffer to be printed.

The Control Adapter, after receiving the information initially tells the Head Image Generator 220 (HIG) that there is data in the selected text buffer that needs to be slanted. Head Image Generator 220 then slants this information, while the Control Adapter card 211 starts the printer in motion; that is, it starts moving the print head carrier 31. It moves the carrier through commands given to the Control and Sense card 212, and it looks for print emitters, or emitters which tell the Control Adapter when to fire wires; it checks for these signals coming from the Control and Sense card. When these signals appear, the CTM retrieves the slanted wire information from the HIG and passes it to the Head Latch card 213 and fires the wires to print dots. The Control Adapter 211 for each print emitter that it sees, asks the Head Image Generator for a new set of slanted data. This is outputted to the Head Latch card 213 and is repeated until the entire text buffer has been printed, that is, all the information that the host sent over. Once the Communications Adapter 202 has seen that this has taken place, that is, the printing has been done, it passes the Forms command to the Control Adapter 211. Control Adapter 211 decodes this command and gives a command to the Control and Sense card 212 to more forms a certain number of forms emitters. It senses these forms emitters through the Control and Sense card again.

Figure 53:
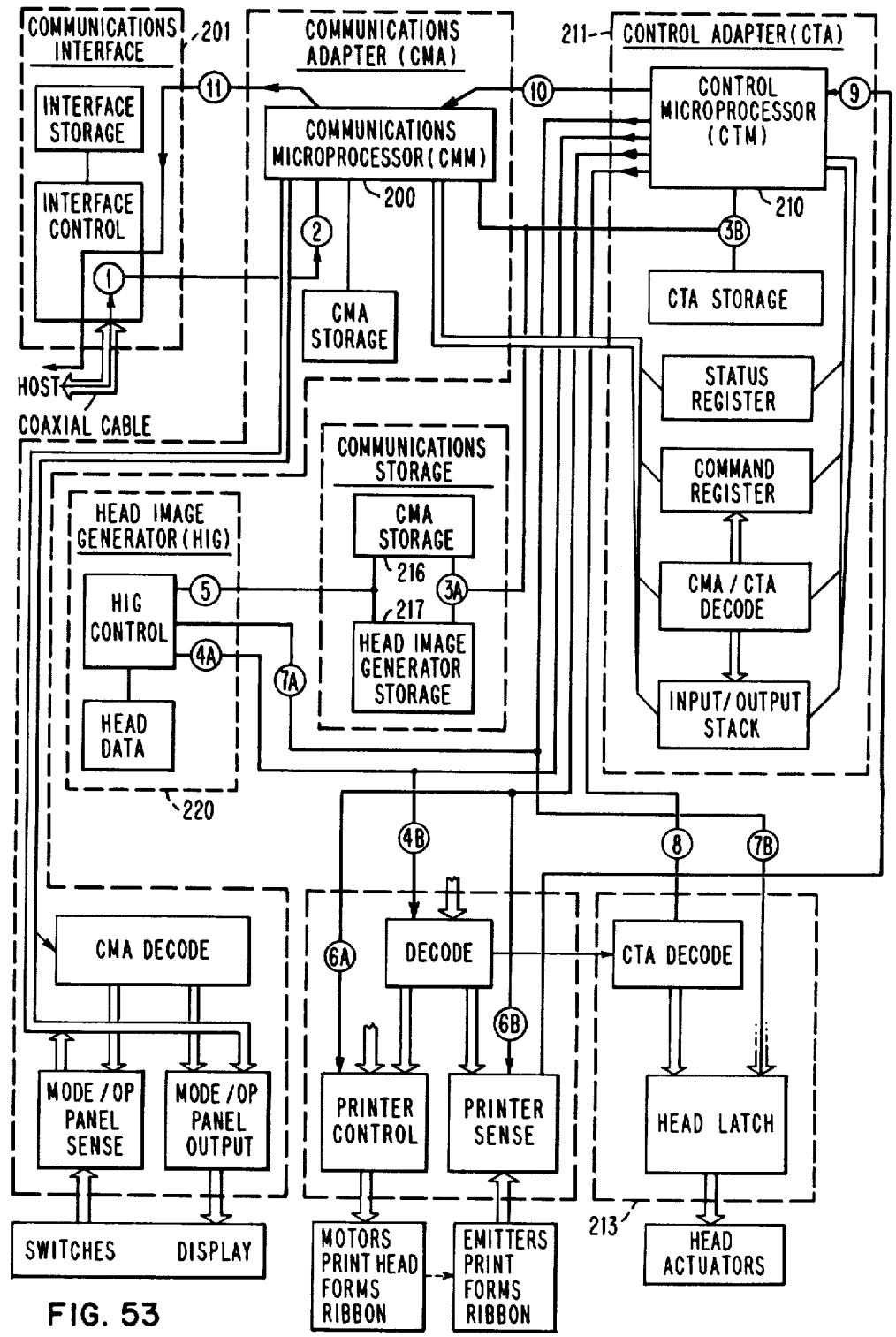
FIG. 53 illustrates a typical data transfer and printing operation in the printer subsystem.

This is further illustrated in FIG. 53. A typical operation is assumed to come from the host to the printer controller unit. [Steps (paths) are illustrated by numbers in circles.] Path 1 represents receipt of the data and commands by interface 201. By path 2, the interface prepares it and passes it on to the CMA 202. CMA 202, essentially in two operations, strips off printable characters and by the path labeled 3A transfers the characters to the text buffers in CMA Storage 216. Initially, font information is stored in HIG Storage 217. At the same time essentially by path 3B, the CMA 202 supplies print commands to the CTA 211 to start the operation. Next are two operations 4A and 4B. CTA 211 initiates operation 4A to HIG 220 which simply says there is data in the text buffer at a certain address, begin HIG operations. At the same time, the path 4B is effective to tell the Control and Sense card 212 to start any of a number of possible operations of the printer, such as: to move the heads off the ramp, move the forms as necessary, do not move the forms, move the head to a certain absolute position or relative position, etc. Item 5 is a path from HIG 220, a flow from the HIG to the storage blocks 216 and 217 which essentially fetches the data and the font information, that it is the hexadecimal representation of the data that is supposed to operate on to start its image generation. Path 6A represents verification by CTA 211 of electromechanical printer operations. This involves checking out the emitters, for example, timing out on the print emitters, etc. to determine that the printer is prepared to print and ready to fire reported back by path 6B.

Item 7 (two paths, 7A and 7B) represents fetching of data from the HIG 220 which is the head latch image that is transferred to the head latch card 213 and some checking is done on it at that point by the CTM.

Item 8 represents CTA 211 signalling the head latch block 213 to fire. This is a pedestal signal to fire the wires. Prior to that point, CTA 211 has to have received a print emitter at step 6B in order to issue the pedestal firing signal.

Step 9 represents a feedback signal from the Control and Sense Card 212 and from the head latch card back to CTA 211. CTA 211 will recheck the Control and Sense Card 212 verifying that the operation was performed that was expected to be performed.

Step 10 is communications from the CTA 211 to the CMA 202 indicating that the operation that the CMA initiated was accomplished without errors. If ther were errors, CMA will be so advised. CMA 202 then compiles status or error information and presents it at Step 11 to the Interface 201 as a poll response to the host.

COMMUNICATIONS MICROPROCESSOR (CMM) OPERATIONS

Figure 54:
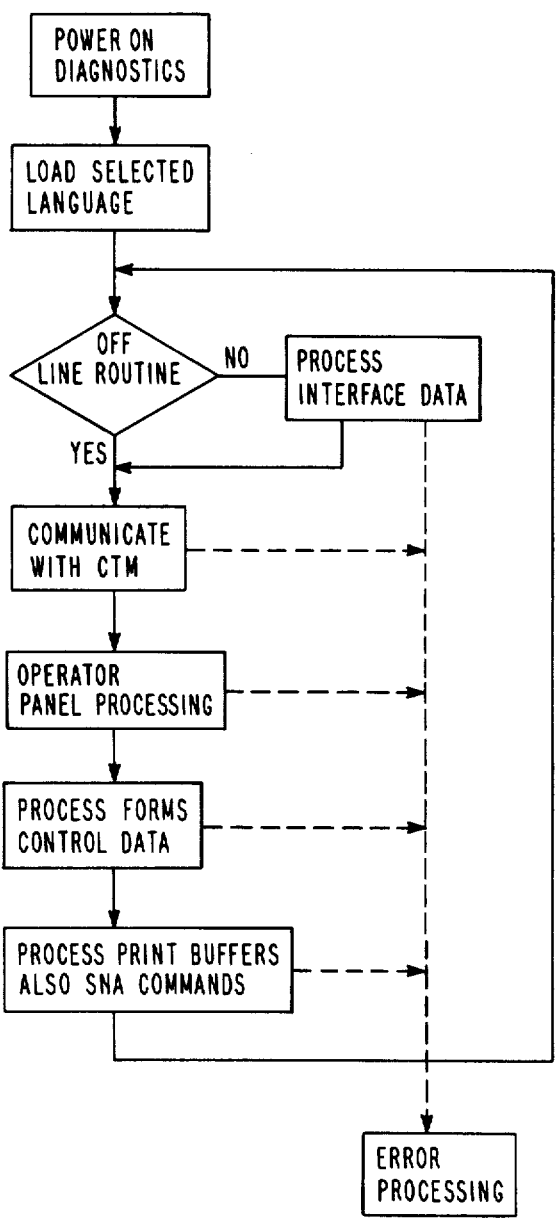
FIG. 54 is a generalized flowchart of the program routines for the Communications microprocessor (CMM) shown in FIG. 51A.

The Communications Microprocessor 200 (CMM) Flowchart, FIG. 54, represents its general operation and starts with the Power On Diagnostics being run. At the conclusion of the Power on Diagnostics, the selected language is loaded into the font Memory for processing and printing. A decision is now made as to whether the Mode Switch is in the off-line or on-line position. If it is in the on-line position, then the interface data is processed, or information coming from the host or going to the host, is processed and prepared. If an off-line routine was indicated, then this process is skipped. In any case, the chart continues to the next block no matter which off-line routine is processed. This block represents communication with the Control microprocessor 210 (CTM). This allows the CMM to receive any errors or information that needs to be passed to the host and it allows the CMM to pass data and commands such as data to be printed, forms, spacing, etc. on to the CTM. Next, the Operator Panel is accessed to determine whether the Start button, Stop button, or other buttons have been depressed for entry information from the Operator Panel. Next, the Process forms or Control data block is checked to determine the movement of forms resulting from commands sent to the CTM. Next is to Process the text buffers which includes SNA commands or the off-line routines. The CMM places them in the proper text buffer to be printed by the CTM and directs the CTM to pick this information up and place it on the paper as dots. All of these routines have a means of communicating with the error processing routine. At the end of the routine, the CMM checks for on-line or off-line status and continues the process again.

CONTROL MICROPROCESSOR (CTM) OPERATIONS

Figure 55:
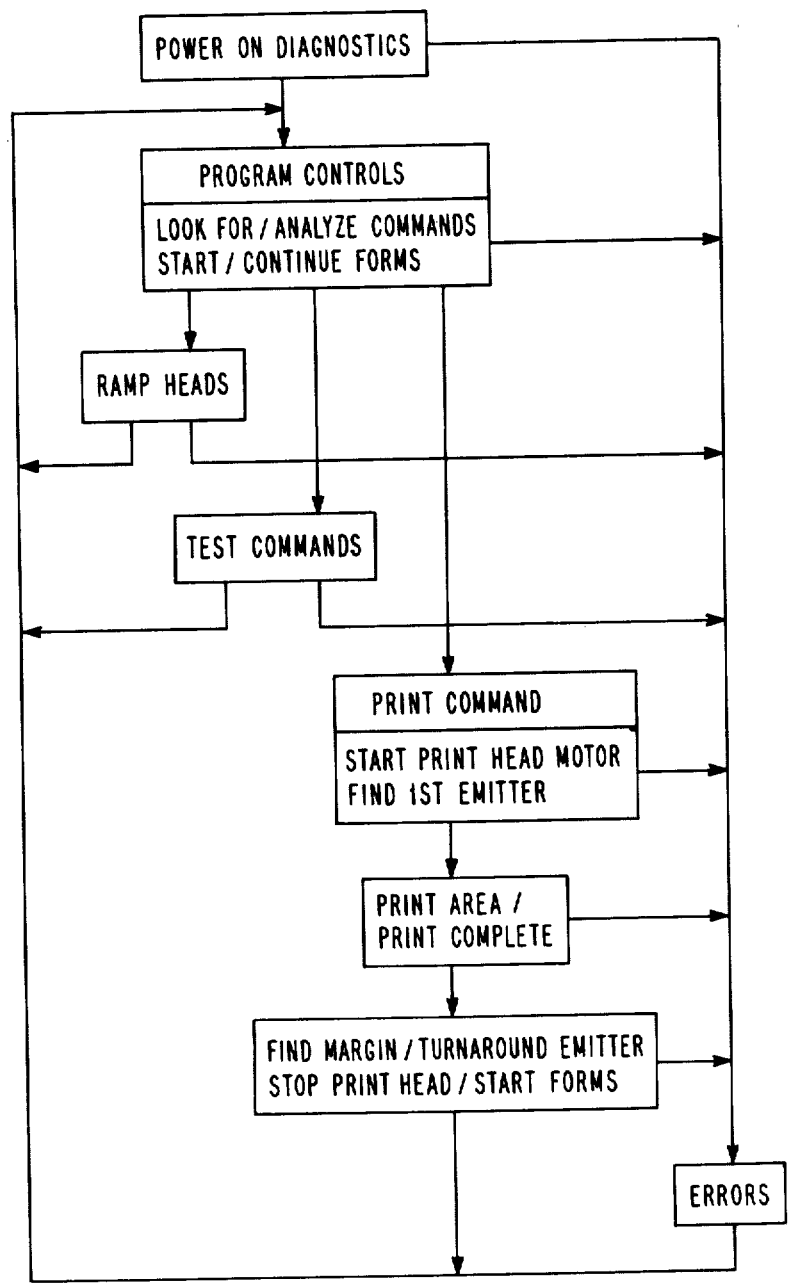
FIG. 55 is a generalized flowchart of the program routines for the Control microprocessor (CTM) shown in FIG. 51B.

FIG. 55 is an overall block diagram of the Control microprocessor 210 (CTM) operations. The CTM goes through Power On Diagnostics upon Power Up and then upon successful completion of that proceeds to Program Controls. The function of this is to look for and analyze commands from the Communications microprocessor (CMM) and start or continue forms operation. When a command is determined, if it is a Print Command, CTM starts the print head motor and looks for the first print emitter. Upon finding the first print emitter, CTM goes into the Print block and stays in that area printing the line of data until it reaches Print Complete representing complete printing of the line. Then CTM goes into the margin routines to find the margins or a turnaround emitter. Once the margins or the turnaround emitter are determined, CTM stops the print head, starts the forms and returns to Program Control to look for and analyze further commands. If CTM receives additional commands from the CMM, upon completion of the forms operation, it starts the next print operation. Out of any of these blocks, if an error is detected, CTM exits and goes into an error routine to determine what and where the error is. It notifies the CMM of the error. The CMM, based on the type of error, will either retry the command or stop the operation of the printer and notify the host.

DETAILED DESCRIPTION OF PRINTER CONTROL UNIT—A DETAILED EMBODIMENT

Figure 56A:
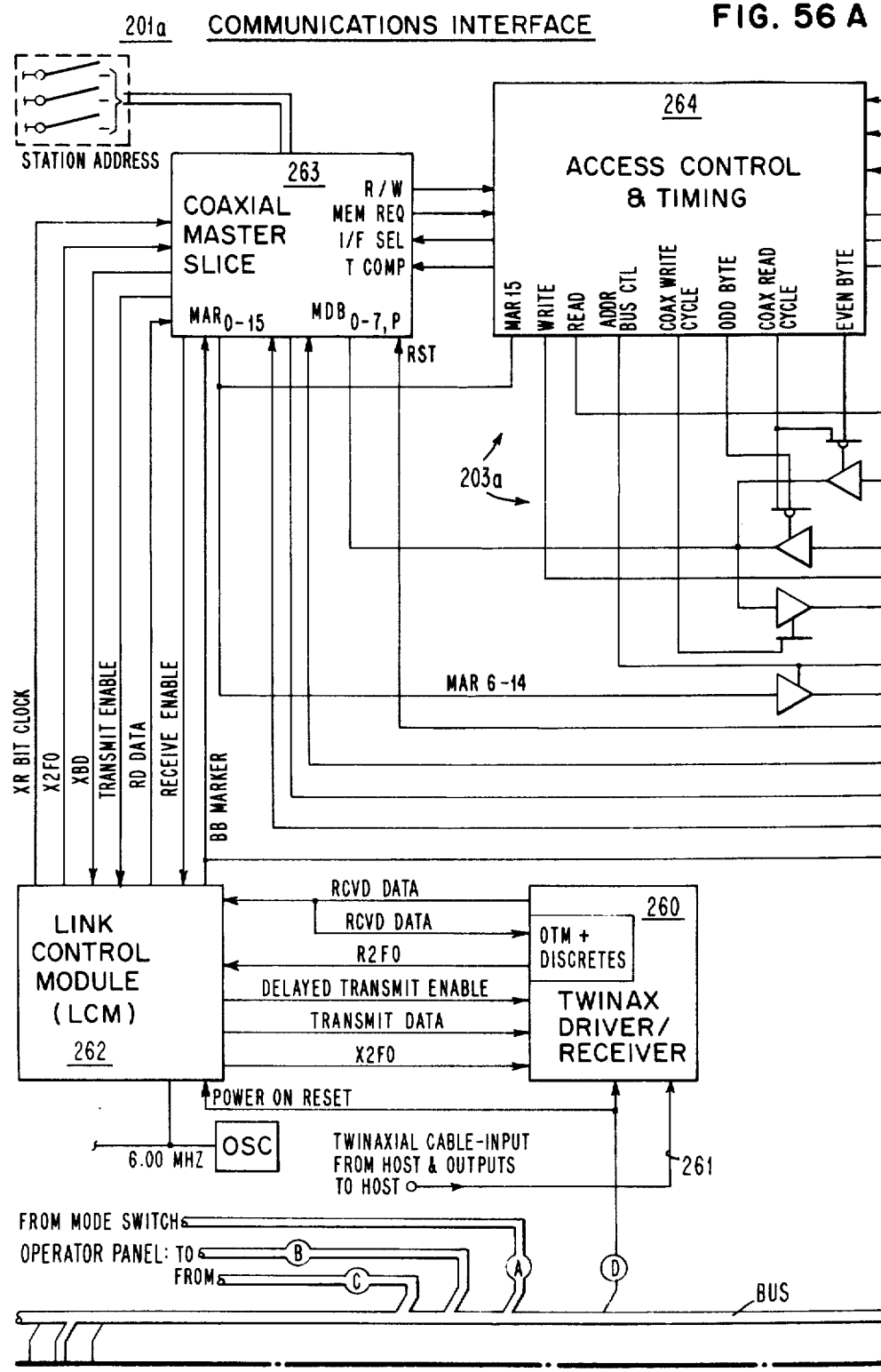
FIGS. 56A-56P when arranged as shown in FIG. 57, represent a printer control unit that is generally based on the printer control unit shown in FIGS. 51A and 51B but which does have differences in some of the details of implementation.

FIGS. 56A-56P represent detailed circuits for a printer control unit useful in the printer subsystem described herein and which is generally based on the block diagrams of the printer control unit shown in FIGS. 51A and 51B but which differs in some of the details of implementation. FIGS. 56A-56B should be arranged as shown in FIG. 57 (on same sheet of drawings as FIG. 56B).

As with the version shown in a general way in FIGS. 51A and 51B, the printer control unit of FIGS. 56A-56P is assumed to be arranged on seven printed circuit cards having the same general headings as previously discussed in connection with FIGS. 51A and 51B. Table IV lists the seven circuit card titles and their figure number locations.

TABLE IV

| FIG. NUMBERS | PRINTER CONTROL UNIT ITEM |
|---|---|
| 56A, 56B | COMMUNICATIONS INTERFACE |
| 56C, 56D | COMMUNICATIONS ADAPTER (CMA) |
| 56E, 56F | CONTROL ADAPTER (CTA) |
| 56G, 56H | HEAD LATCH |
| 56I, 56J, 56K | HEAD IMAGE GENERATOR (HIG) |
| 56L, 56M, 56N | COMMUNICATIONS STORAGE |
| 56O, 56P | CONTROL & SENSE |

In addition, for convenience, reference numbers similar to those used in FIGS. 51A-51B will be used in the present description with an appropriate suffix to indicate that there are some differences in the circuit components and arrangements between the two embodiments described.

The circuit groups are used mainly when the related circuit lines are located on drawings that are located some distance away within the collection of drawings 56A-56P. When circuit data or control lines are located in such a manner that they readily interconnect when the drawings are lined up as shown in FIG. 57, then the circuit group designations are not used since the circuit connections may be readily seen by such arrangement.

ABBREVIATIONS USED

A variety of abbreviations are used in the drawings particularly in FIGS. 56A-56P, and these abbreviations are set forth in Table V below:

TABLE V

| Abbreviation | Definition |
|---|---|
| ABO | Address Bus Out |
| ADDR W ADD | Address |
| ADDR | Address Bus |
| AHS | Address High Storage |
| ALT | Alternate |
| ATTN | Attention |
| B | Buffer (no invert) |
| BB | Bit - Byte |
| CH | Check |
| CHAR | Character |
| CK | Clock |
| CLK | Clock |
| CMA | Communications Adapter |
| CMD | Command |
| CMPR | Compare |
| COAX | Coaxial |
| CPI | Characters Per Inch |
| CS | Control Strobe |
| CTA | Control Adapter |
| CTL or CNTL | Control Microprocessor |
| CTM | Cycle |
| DB | Data Bus |
| DBBM | Diagnostic Bit Byte Mark |
| DBI | Data Bus In |
| DBO | Data Bus Out |
| DBX | Data Bit "X" |
| DEC | Decode |
| DET | Detect |
| DIAG | Diagnostic |
| DR | Driver |
| ENBL or EN | Enable |
| EOF | End of Forms |
| FF | Flip Flop |
| FMS | Forms |
| GTE | Gate |
| HI | High |
| HIG | Head Image Generator |
| HL | Head Latch |
| H/W | Hardware |
| I/F | Interface |
| INC | Increment |
| INIT | Initialize |
| INV | Inverter |

TABLE V-continued

| Abbreviation | Definition |
|---|---|
| K | 1000 |
| LANG | Language |
| LD | Load |
| LO | Low |
| LTH or LTCH | Latch |
| MAR | Memory Address Register |
| MDB | Memory Data Bus |
| MEM REQ | Memory Request |
| MHZ | Megahertz |
| MPLX or MUX | Multiplex |
| MTR | Motor |
| N | Inverter/Buffer |
| NO | Number |
| O.C. | Open Collector |
| P CHEK | Parity Check |
| PG | Page |
| POR | Power On Reset |
| POS | Position |
| R2FO | Two Times Receive Clock |
| RBD | Receive Binary Data |
| RCV | Receive |
| RCVD | Received |
| RD | Read |
| REG | Register |
| ROS | Read Only Storage |
| RST | Reset |
| RV | Reverse |
| R/W | Read/Write |
| SAR | Storage Address Register |
| SEL | Select |
| SING | Single |
| SPD | Speed |
| SS | Sense Strobe |
| ST | Start |
| STAT | Station |
| STG | Storage |
| SW | Switch |
| SYNC | Synchronization |
| SYS | System |
| T COMP | T Complete |
| TXTB | Text Buffer |
| WH | Write High |
| WL | Write Low |
| WR | Write |
| X2FO | Two Times Transmit Clock |
| XBD | Transmit Binary Data |
| XMIT | Transmit |
| X/R | Transmit/Receive |
| XRBC | Transmit/Receive Bit Clock |

CIRCUIT TERMINOLOGY

To the extent that they are the same as the block diagram in FIGS. 51A-51B, the same reference numerals will be applied to those circuit modules in FIGS. 56A-56P. However, a number of additional circuit elements are shown in FIGS. 56A-56P not previously discussed before in connection with FIGS. 51A and 51B.

In contrast with the circuit diagram of FIGS. 51A and 51B where individual cables are shown interconnecting the various blocks, FIGS. 56A-56P have a single bus structure which accommodates all cabling in the printer control unit shown in those figures. This is simply designated by the term "BUS". The inclusion of the single bus structure in FIGS. 56A-56P is done for convenience in presentation of the printer control unit described therein, it being understood that a single bus structure in actual hardware would not necessarily be as desirable as separate cabling or buses as may be required to route the wiring to the different components of the printer subsystem.

Also as a convenience, groups of circuit connections for data and/or control signals that are somewhat related have been arranged into circuit groups A-Z in FIGS. 56A-56P. Thus, the cabling designated "B", To Operator Panel, in FIG. 56A is routed through the primary bus and is found connected to the logic in/out wrap block in FIG. 56D. Some of the circuit groups may be found on more than one sheet of the drawings. The circuit groups, their definitions, and locations in the figure numbers are indicated in the following Table VI.

TABLE VI
CIRCUIT INTERCONNECTIONS - FIGS. 56A-56P

| Circuit Group | Definition | Found in FIG. Nos. |
|---|---|---|
| A | From Mode Switch | 56A, 56D |
| B | To Operator Panel | 56A, 56D |
| C | From Operator Panel | 56A, 56D |
| D | Power On Reset | 56A, 56C, 56E, 56G, 56I, 56L, 56O |
| E | Interface Diagnostics | 56A, 56N |
| F | CMM Storage | 56B, 56C, 56N |
| G | CMM Write Low | 56B, 56E |
|  | CMM Write High | 56I, 56L |
|  | CMM Address High Storage (AHS) |  |
|  | CMM Storage Address Register (SAR) |  |
|  | CMM Data Bit X (DBX) |  |
| H | CMM DBO | 56B, 56D, 56L |
| I | CMM Storage Address Register (SAR) | 56D, 56L |
| J | 16 MHZ Oscillator | 56D, 56E, 56I |
| K | CMM Data Bus In (DBI) | 56C, 56E |
| L | CMM Address Bus Out (ABO) | 56D, 56E, 56L |
| M | CMM Select 001, 110, 111 STG | 56D, 56L |
| MD | Main Page Disable | 56C, 56N |
| N | CTM Reset Storage (RST STG) | 56E, 56P |
| O | CTM Error | 56E, 56G |
| P | CTM Control Strobe | 56E, 56G, 56P |
| Q | CTM Address Bus OUT (ABO) 0-7 | 56E, 56L, 56K |
| R | HIG Head Data 0-7 | 56E, 56K, 56L |
| S | HIG Error | 56E, 56K |
|  | HIG Print Feedback |  |
| T | CTM Data Bus Out (DBO) 0-7 | 56F, 56H, 56K, 56L, 56P |
| U | CTM Data Bus In (DBI) 0-7 | 56F, 56H, 56P |
| V | HIG Load Character No. | 56F, 56G, 56K |
|  | HIG Load Control | 56L |
|  | HIG Print Mode |  |
|  | Head Latch (HL) Enable |  |
| W | HIG Select 110 | 56I, 56L |
|  | HIG Select 111 |  |
|  | HIG Reset Storage |  |
| X | HIG Storage | 56I, 56N |
| Y | HIG Storage Address Register (SAR) | 56I, 56L |
| Z | Head/Forms Overcurrent and Reset | 56D, 56O |

DATA FLOW AND COMMUNICATIONS—PRINTER CONTROL UNIT

As mentioned, the printer control unit is divided into two primary sections, one being the control section and one the communications section. In the control section, most of the operations performed are on an Input/Output (I/O) basis. On the other hand, the communications side of the printer control unit, that is, Communications Interface 201a, Communications Adapter 202a, Communications Storage 215a, and the Head Image Generator 220a all perform communications on a memory basis, that is through a memory module. In this regard, Communications Adapter 202a can request information from the Communications Interface 201a, and the Communications Interface thereupon searches through its memory 204a, FIG. 56B, looking for that information and presents it back to the Communications Interface. The Head Image Generator 220a operates somewhat in the same manner. It can request information from the Communications Storage Random Access Memory (217a and 217b, FIG. 56N) and is time-sharing the memory with the Communications Adapter.

The Communications Interface 201a shares its memory with the Communications Adapter 202a in a more asynchronous manner; that is, the Communications Interface accesses its buffer Random Access Memory 204a at a higher speed than the Communications Adapter accesses it and is not synchronized with it in any way except when the Communications Interface requests some information from this memory. At that moment, the Communications Interface syncs up with the Communications Adapter until the information has been passed. Then, the Communications Interface reverts back to its own speed and its own synchronization to interface with this buffer. With regard to the Head Image Generator 220a, there is a more synchronous type of information transfer. The Head Image Generator is synchronized with every memory cycle that the Communications Adapter takes, whether or not it is to the Head Image or the Wire Image or Text Buffers in Memories 217a, 217b, FIG. 56N. Just prior to the Communications Adapter 202a taking any memory cycle, the Communications Storage 215a detects if the Communications Adapter 202a is going to the Wire Image memory or Text Buffer memory or whether it is not. If the Communications Adapter 202a is not going to these memory locations, it passes control to the Head Image Generator to use if the Head Image Generator needs it, at which time the Head Image Generator will take two memory cycles, then stop and wait to see if the Communications Adapter will require these memories on its next memory cycle. If the Communications Adapter card does require these memories including test buffers and wire images, then the Communications Storage 215a allocates them to the Communications Adapter and locks out the Head Image Generator for one Communications Adapter storage access interval.

PRINTER CONTROL UNIT CIRCUIT BLOCKS AND OPERATION COMMUNICATIONS INTERFACE

The Communications Interface 201a, FIGS. 56A and 56B, consists of six major blocks. The first block is the Discrete Interface 260 between the host input on twinaxial cable 261 and the digital portion of the card. This discrete hardware consists of drivers and receivers of an analog nature that receive and buffer the analog signals coming from the host and that drive the analog signals going back to the host on cable 261. Out of this driver-receiver network the signals that are obtained are phase encoded. These go to the Link Control Module 262. Link Control Module 262 decodes the encoded data, that is, separates out the clock and the data information into separate lines that can now be used by the Coaxial Master Slice block 263. Master Slice block 263 is a digital control block that controls the writing of information to Random Access Memory 204a and that controls the receiving and transmitting of data to and from the host. It obtains all its inputs from Link Control Module 262. It receives input from Random Access Memory 204a and supplies outputs to the Random Access Memory 204a. The Access Control and Timing block 264 exists to interface this Random Access Memory between the Coaxial Master Slice and the Communications Microprocessor on a time-shared basis. Random Access Memory 204a has 1K bytes of storage and is a buffer for information coming over from the host system and is written to and read by the Coaxial Master Slice block 263. It can also be written to and read by the Communications Microprocessor 200a. The Diagnostic Hardware and Sense block 265 controls diagnostic hardware within Coaxial Master Slice 263 that can be used at card tasks and also may be used in on-line diagnostics within the printer. Note connection by way of the Bus and cable group E to FIG. 56N.

Communications Adapter

Figure 56D:
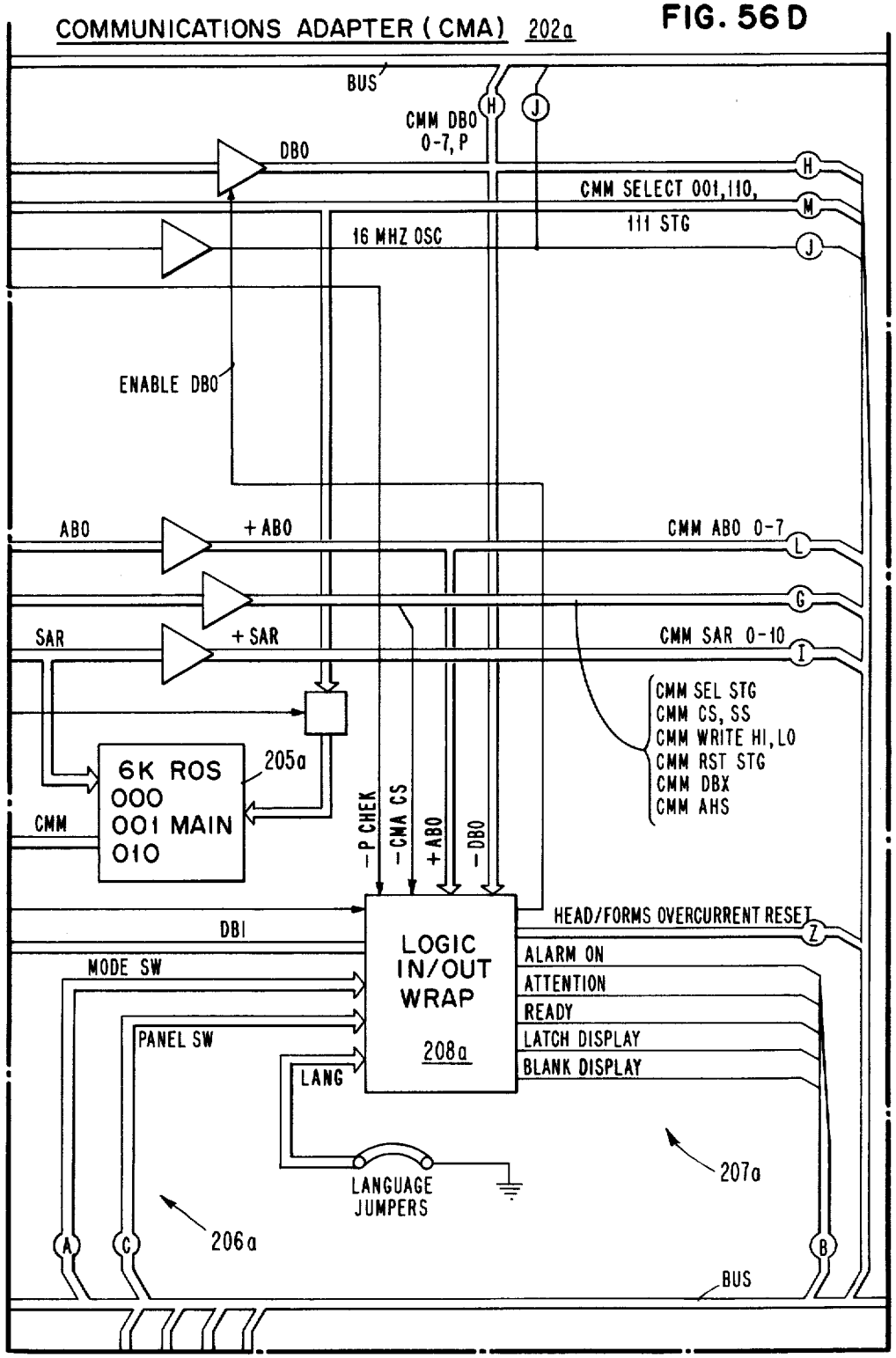

The Communications Adapter 202a, FIGS. 56C and 56D, has four major blocks within it. Two blocks 200b and 200c comprise the microprocessor 200a. The microprocessor obtains its program from the FSU Read Only Storage (ROS) Module 205a, FIG. 56D. There are six K bytes of program storage on this module. Microprocessor 200a fetches its instructions from this ROS storage and communicates with the Communications Interface 211a and the Control Adapter 210a in the Communications Storage card through the Logic Input/Output 208a. This has on it diagnostic hardware so the card is able to self-diagnose and also contains the logic required to output information to the operator's panel and receive information from the printer subsystem.

There are several major cables on the Communications Adapter card that cross card boundaries and that are of interest. The Storage Address Register (SAR) lines are memory address lines that originate from the Communications Adapter card. The CMA goes to its own memory 205a and also addresses the Communications Storage card 215a memories and the Communications Interface memory 204a. The Data Bus Out (DBO), Cable H, is the bus on which all information to memory travels. It originates on the Communications Adapter 202a, travels to block 208a on that card, travels to Memories 217a and 217b on the Communications Storage card 215a, FIG. 56N, and to Memory 204a on the Communications Interface card 201a, FIG. 56B. The Communications Storage Cable F, FIGS. 56B and 56C, as examples, has many sources, but just one control source, the Communications Adapter card. This is the output of all storage. The output of the Communications Storage card, FIG. 56N, drives this cable. Also the output of the Communications Interface Memory 204a drives this cable. The Address Bus Out (ABO) cable L, FIG. 56D, from the Communications Adapter card supplies input/output addresses to Communications Storage 215a and to Control Adapter 211a.

Also emanating from the Communications Adapter by way of cable B are various control type signals tha go to the operator panel such signals as turning the Attention light on and turning the Ready light on, latching the display, blanking the display, turning the alarm on. There are also inputs from the operator panel by way of cable C so that the Communications Adapter card can tell when an operator panel button has been pushed. It also can sense by way of cable A the Mode switch for various diagnostic routines that are to be run on the printer.

There are also some general control type signals; that is, Select Storage, Control Storage, Write High and Low Storage, Reset Storage, Data Bit X and Address High Storage (AHS) signals that emanate from the Communications Adapter by way of cable G that aid in the control of the memory read and write operations. These signals go to Communications Interface 201a, Communications Storage 215a and also to the Head Image Generator 220a. The Data Bus In (DBI) cable K has many sources, but only one control and that is the Communications Adapter 202a. This is the input line for I/O devices to pass information to the Communications Adapter. It is driven by the Control Adapter 211a, FIG. 56E, and various other devices on the Communications Adapter itself.

Control Adapter

Figure 56E:
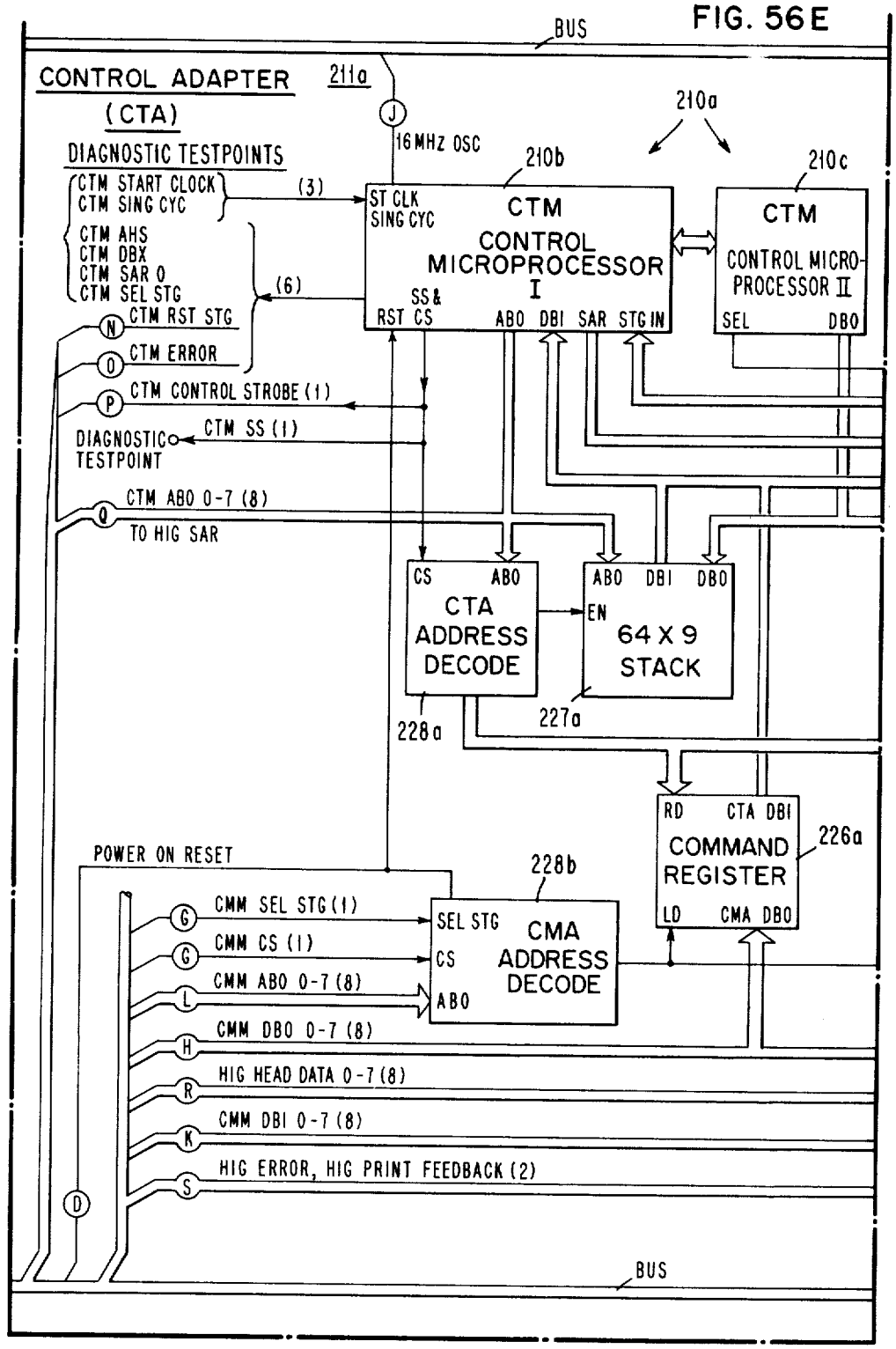
Figure 56:
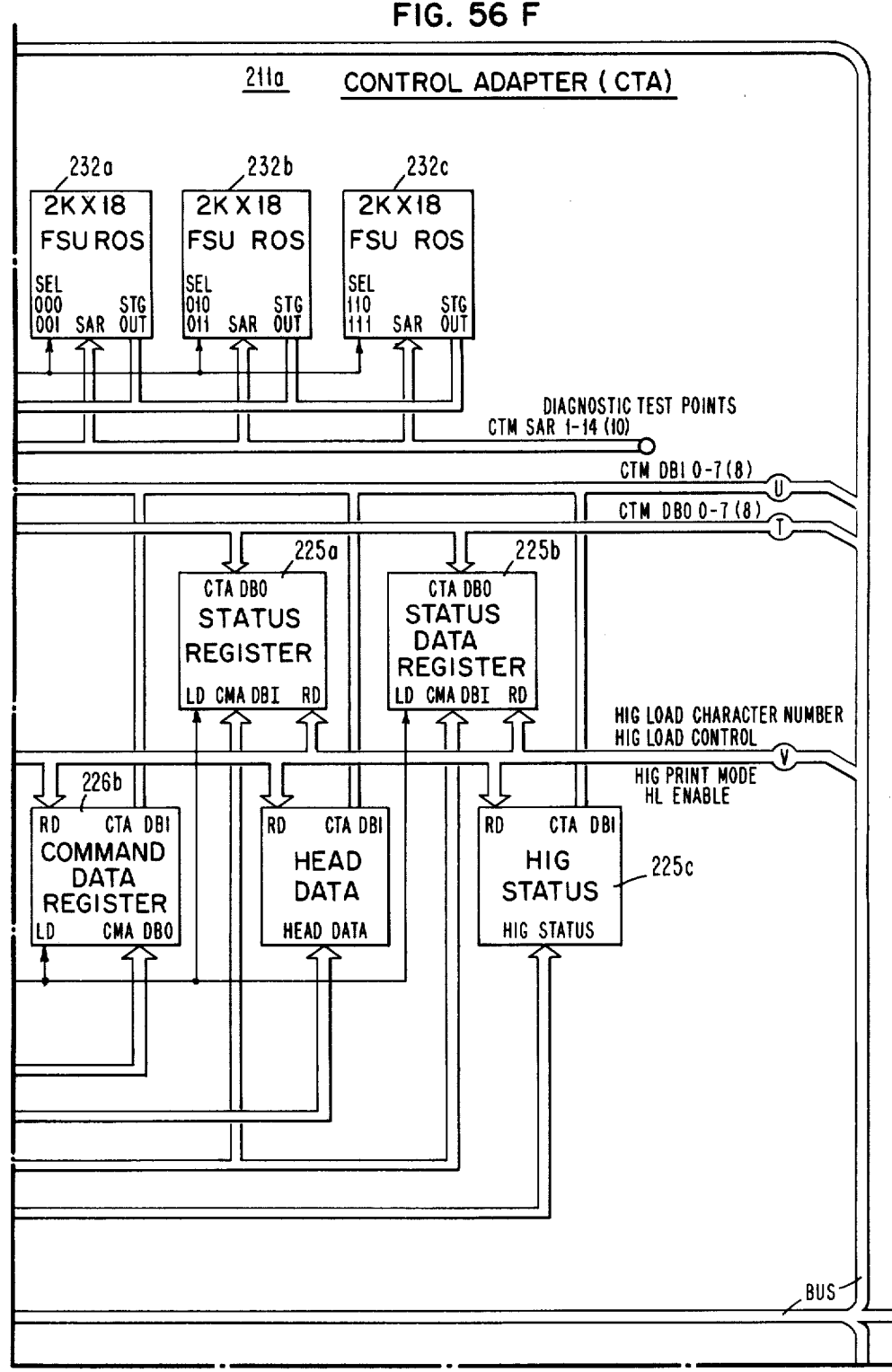

The Control Adapter 211a, FIGS. 56E and 56F, includes a microprocessor 210a comprising blocks 210b and 210c. It has 12K bytes of FSU Read Only Storage (ROS) modules 232a–232c that are dedicated to program and data that do not change. Within the card there exists communications registers 226a, 226b, 225a, 225b, and 225c that allow the Communications Adapter 202a, FIGS. 56C and 56D, to talk to the Control Adapter 211a or to pass on information as to commands, such as print commands and forms commands. The status registers 225a, and 225b for the Control Adapter enable it to store information concerning printer status—if there has been an error out in the printer, a mechanical or an electrical error, or at what stage a command may be in. Controlling all of this are two address decode blocks 228a and 228b. Block 228a generates the signals to enable the use of the communications registers 225a, 225b, 226a and 226b and allows the Control Adapter to use a small scratch pad memory 227a. Memory 227a has 64 locations by 9 bits wide (that includes parity checking). Block 228a enables the Control Adapter to input head data from the Head Image Generator (HIG) by way of block 222d and to read the Head Image Generator status (225c) as to whether or not there has occurred a Head Image Generator error, which is a parity error. This may occur while the Head Image Generator is reading from the Communications Storage card 215a, FIGS. 56L–56N, or in what is called a "print mode". This allows printing of every dot, whereas the Head Image Generator normally only prints every other dot. In summary, Decode block 228a controls the Communication Adapter's access to these communications registers 225a, 225b, 226a and 226b. The Command Register 226a and Command Data Register 226b are the two registers through which commands pass from the Communications Adapter to the Control Adapter. The Status Register 225a and Status Data Register 225b pass the error codes or status information from the Control Adapter to the Communications Adapter. These registers have hand-shaking logic so that each processor can asynchronously talk or pass information from one to the other.

There are many cables originating and returning to Control Adapter 211a, FIGS. 56E and 56F. There are Storage Address lines that are not used by any other card, but are for diagnostic purposes. These include Storage Address lines (See FIG. 56F, for example) going to the FSU ROS 232a–232c on the Control Adapter. Also, it is the Control Adapter Data Bus Out (DBO) cable T that contains the information going to output devices such as the Control and Sense card (FIG. 56P), Head Latch card (FIG. 56H0, and the Head Image Generator (FIG. 56K). This cable is also used by devices on the Control Adapter card itself for purposes such as accessing the Communications Registers.

Figure 56G:
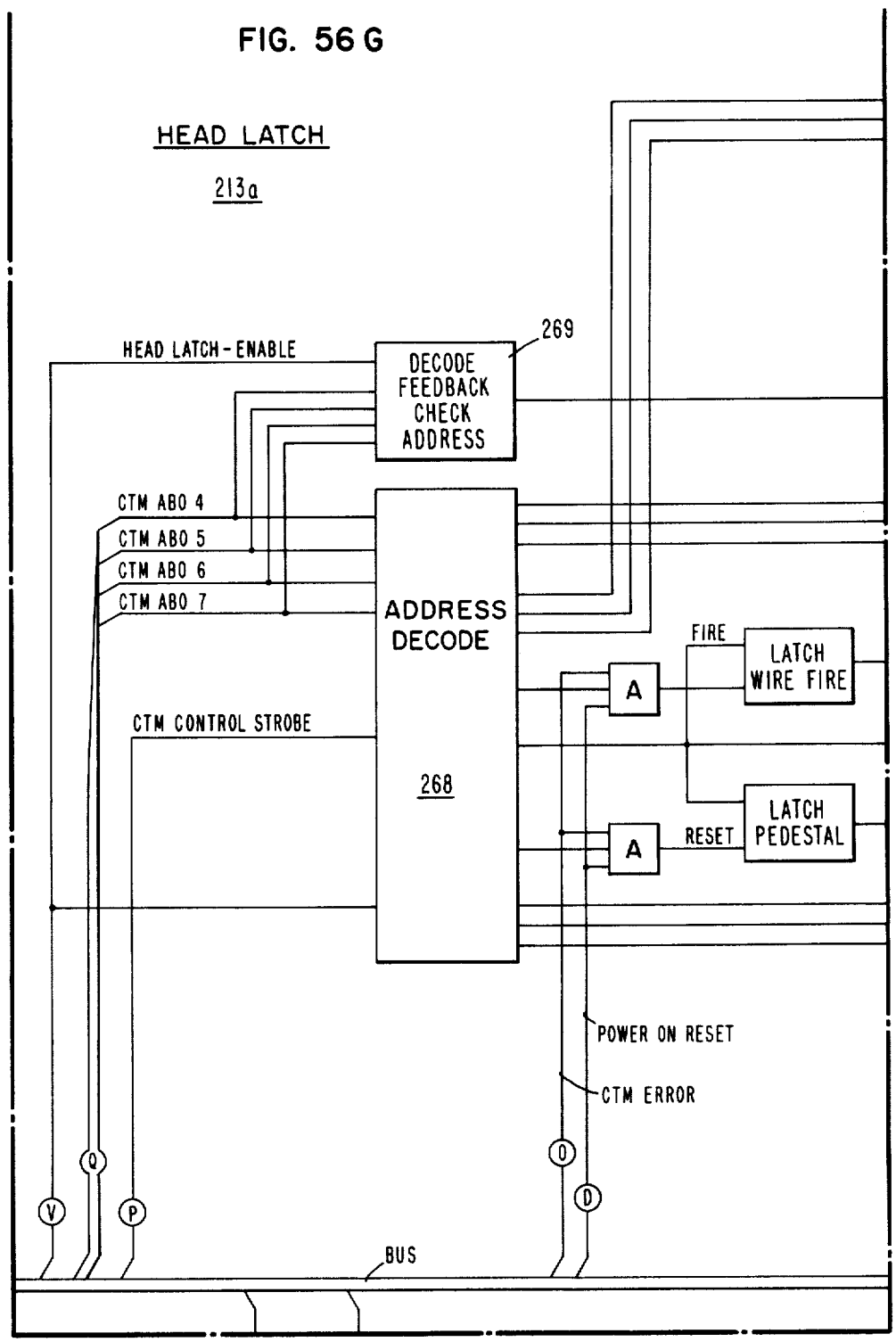
Figure 56H:
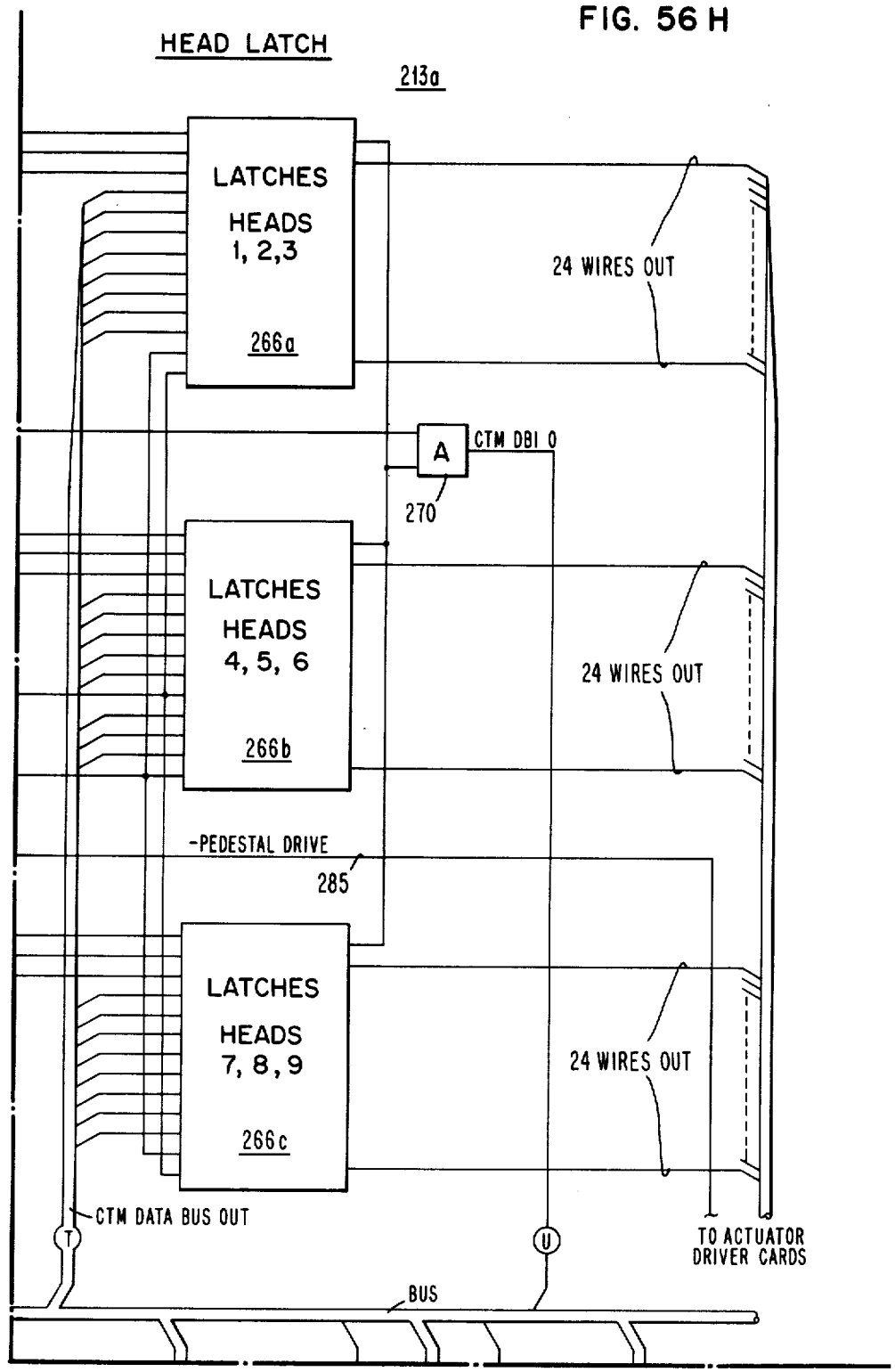
Figure 56:
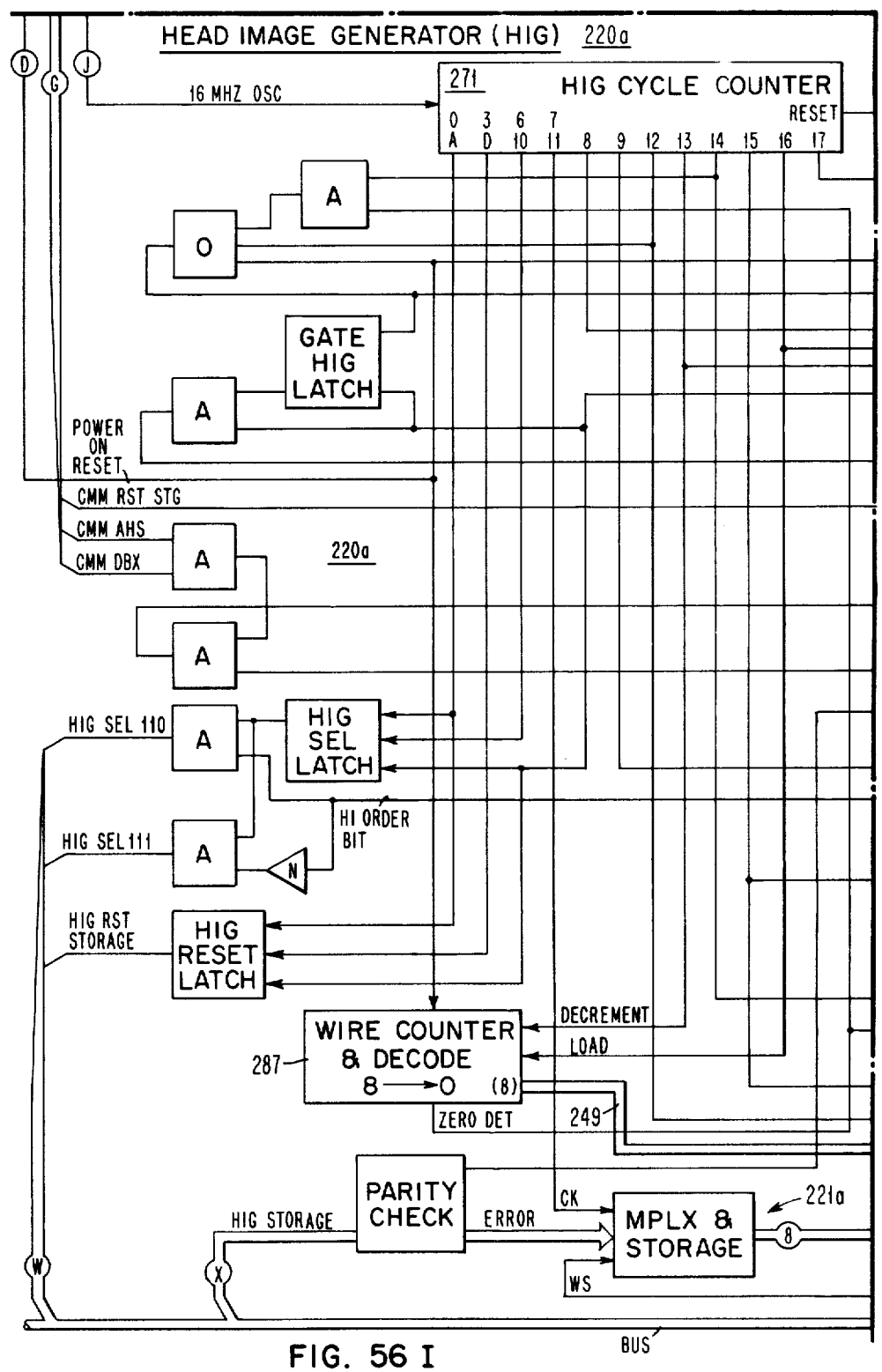
Figure 56:
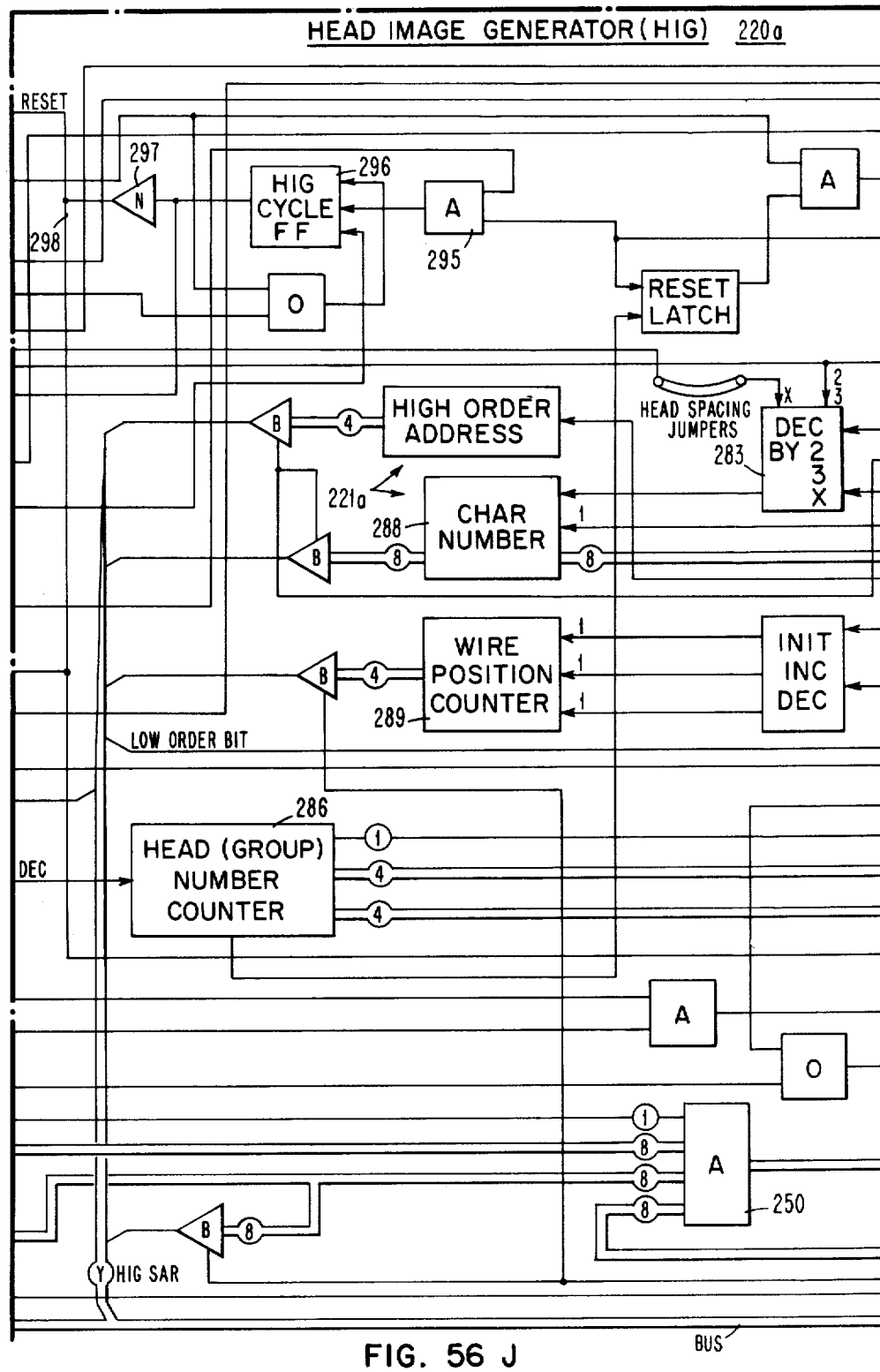
Figure 56:
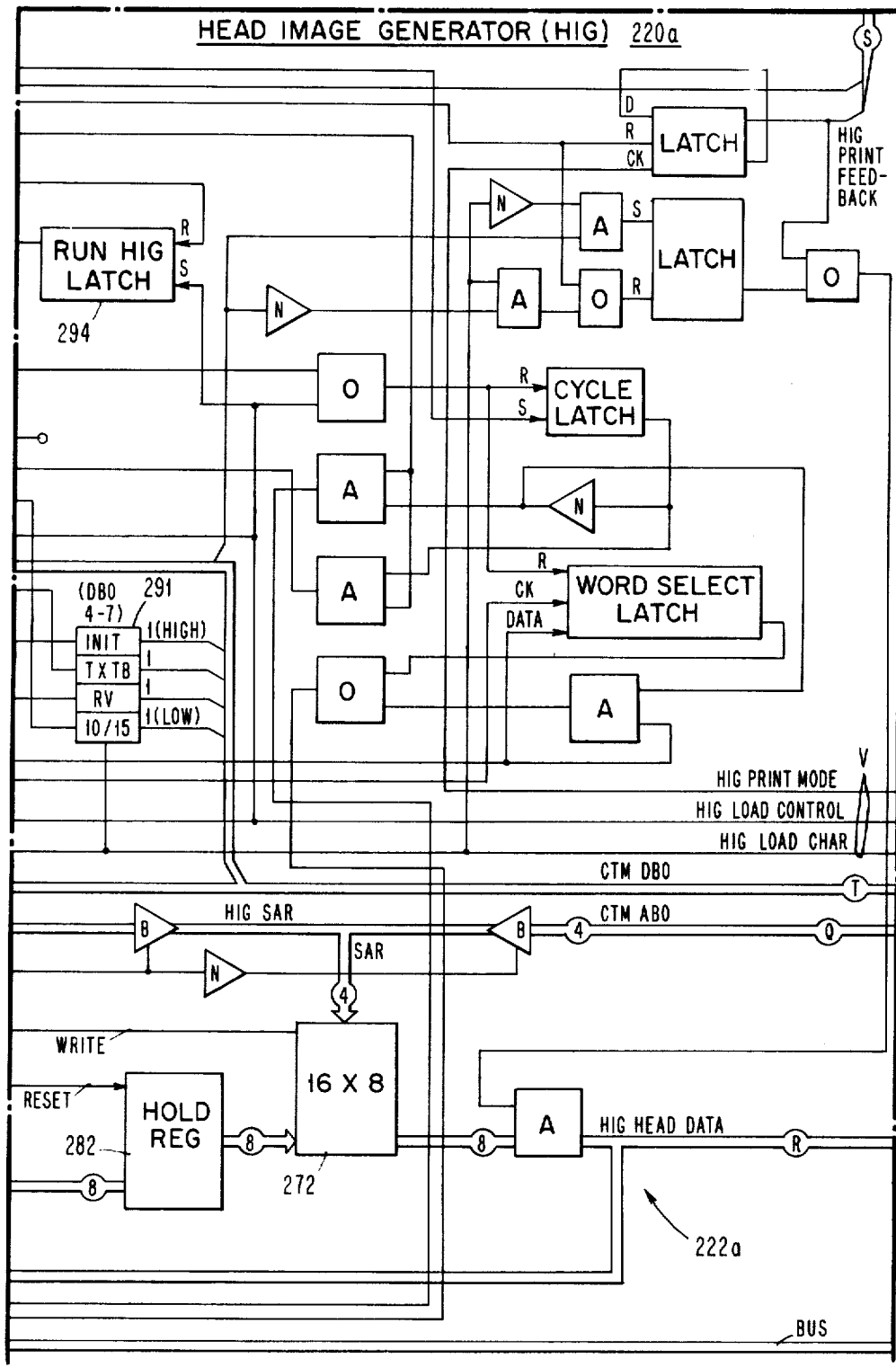
Figure 56:
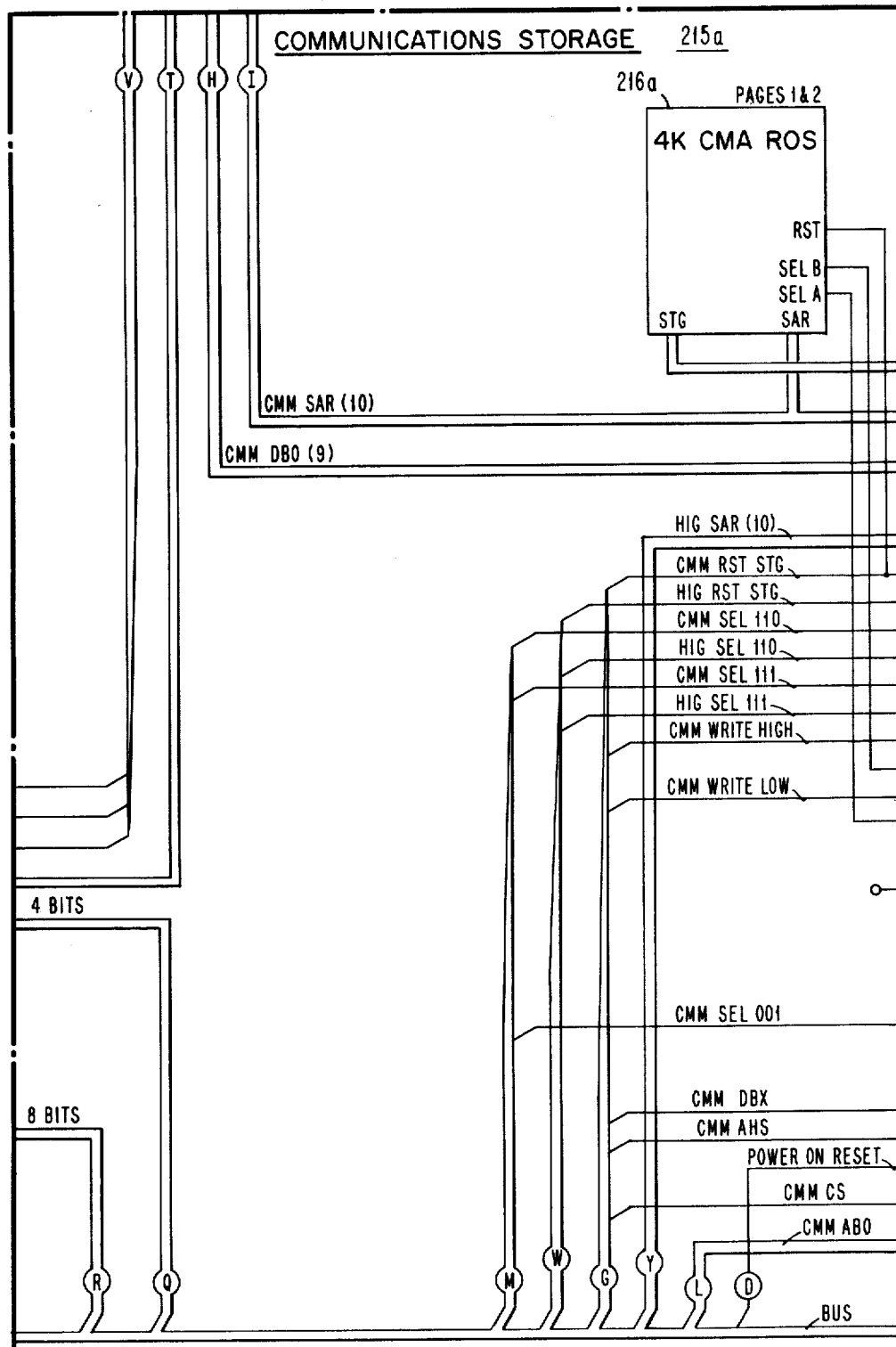

The Control Adapter Data Bus In (DBI), cable U, is a cable on which information is given to the Control Adapter by various cards such as the Control and Sense card (FIG. 56P) and the Head Latch Card (FIG. 56H). Also, devices on the Control Adapter card use it. The Control Adapter Address Bus Out (ABO), cable Q, carries the device address which the Control Adapter is presently working with.

Also present on the Control Adapter Card are various control signals on cable V that are routed to devices such as the Head Image Generator to tell the Head Image Generator which character it should start looking for in the Text Buffer or for loading control lines into the Head Image Generator for the ten or fifteen characters per inch or the head direction. Other signals going to the Head Latch card enable it to perform operations at the specific times it is supposed to. The CMM Select Storage, cable G, is a gating signal that is specifically used after the Control Adapter has received a Hardware Reset on cable D from the Communications Adapter and after activation of the Address Decode 228b by signals on cable L. The signal releases the Hardware Reset to the Control Adapter thus allowing it to start executing instructions at Address 0. Control Strobe coming from the Communications Adapter, cable G, is a gating signal that controls when data is written into the Command Register 226a and Command Data Register 226b and also controls which register is chosen depending upon the state of the Address Bus Out, cable L.

Head Latch

The function of Head Latch 213a, FIGS. 56G and 56H, is to interface between the Control Adapter 211a and the Actuator Driver cards. It contains three modules 266a–266c that contain registers in the form of latches. Control Adapter 211a receives the head data information from the Head Image Generator 220a, FIGS. 56I–56K, and passes it directly to the Head Latch card 213a into the individual latches by cable 267.

The Address Bus Out, cable Q, coming into the Head Latch card, FIG. 56G, comes from the Control Adapter card. This is the address information to control which head is getting which head register within the head latch modules, FIG. 56H, which are provided information off of the Data Bus Out, cable T, coming from the Control Adapter also. There can be up to eight heads; so the procedure starts with head 1. Head 1 address is supplied to the head latch decode block 268 and head 1 wire data is provided on the Data Bus Out cable T. Data Bus Out Bit 0 is the information for wire 1; Data Bus Out Bit 1 is the information for wire 2 within the head selected on the Address Bus cable Q. A gating pulse called Control Strobe coming from the Control Adapter, cable P, tells the Head Latch modules when to latch the data information. Outputs go directly to the Actuator Driver cards and on command from Control Adapter 211a, the Head Latch card decodes the command by way of Decode block 268 and Latch Wire Fire block 249, Fig. 56G to fire the actuators or not fire them so that the dots are printed in the proper character positions. There is, in addition, a Pedestal Drive signal on line 285 and Latch Pedestal block 259, Fig. 56G that is used to start all actuators at the same time.

For diagnostics, there is a feedback by way of cable U from the output of all of these latches controlled by blocks 269 and 270 so that all latches can be reset. This one feedback will tell if any latches are still on. From there, one latch is turned on at a time in this feedback check to be sure that one latch does come on.

Head Image Generator

The Head Image Generator 220a, FIGS. 56I–56K, has many sub-blocks within it. Its major function is to take unslanted character information and slant it and distribute it across all heads to be able to print it in the slanted head and image format. It consists of a master HIG cycle counter 271, FIG. 56I, and it also has some internal registers and counters that keep control of which character it is dealing with and at what time and at what location in the printline it is generating the information for. HIG 220a accesses the Communications Memories (217a and 217b) twice for each single memory cycle that the Communications Adapter 202a will take. Thus, storage access is interleaved with the Communications Adapter. The HIG can only access this memory when the Communications Adapter is not going to access it. It makes these decisions through logic on the Communications Interface, and the timing is controlled by the HIG cycle counter. Basically, the HIG pulls out information from the text buffer in Memories 217a or 217b first to find out what character it needs to look up the information, and then it will obtain information from the wire images in 217a or 217b. It takes this information, selects the one wire, or one bit worth of information, that it needs to load for a particular wire within a particular head and stores this in a small scratch pad Memory 272, FIG. 56K. Memory 272 is later read by Control Adapter 211a and outputted by Cable T to the Head Latches, FIG. 56H, for the wire actuators to be fired. There are two text buffers within Memories 217a and 217b on the Communications Storage card 215a. One buffer can be filled up with a print line from the Communications Adapter 202a and the Head Image Generator 220a can then start pulling characters from that one text buffer while the Communications Adapter stores characters in the other text buffer. Normally, this will alternate back and forth. While the Head Image Generator is reading from one text buffer, the Communications Adapter card is writing into the other text buffer. The Head Image Generator is informed by the Communications Adapter which text buffer to work on to build the slanted information and also what character density the printer is currently printing in, that is, ten characters per inch or fifteen characters per inch. Both the text buffer information and the characters-per-inch information is sent by the Control Adapter 211a to the Head Image Generator. One other piece of information that is necessary for the Head Image Generator is the number of heads or actually the character spacing between heads for each printer configuration. These are Head Spacing jumpers that are on the card that are pre-wired. They are in the "X" control line to block 283, FIG. 56J. Once these jumpers have been selected, then the Head Image Generator will always build character information, that is, slanted information, for the pre-wired number of heads and the particular distance between the heads. The HIG Head Data, cable R, carries slanted wire information coming from the Head Image Generator to the Control Adapter card. The HIG cable S contains two lines coming from the Head Image Generator which are the HIG Error and HIG Print Feedback.

Communications Storage

Figure 56M:
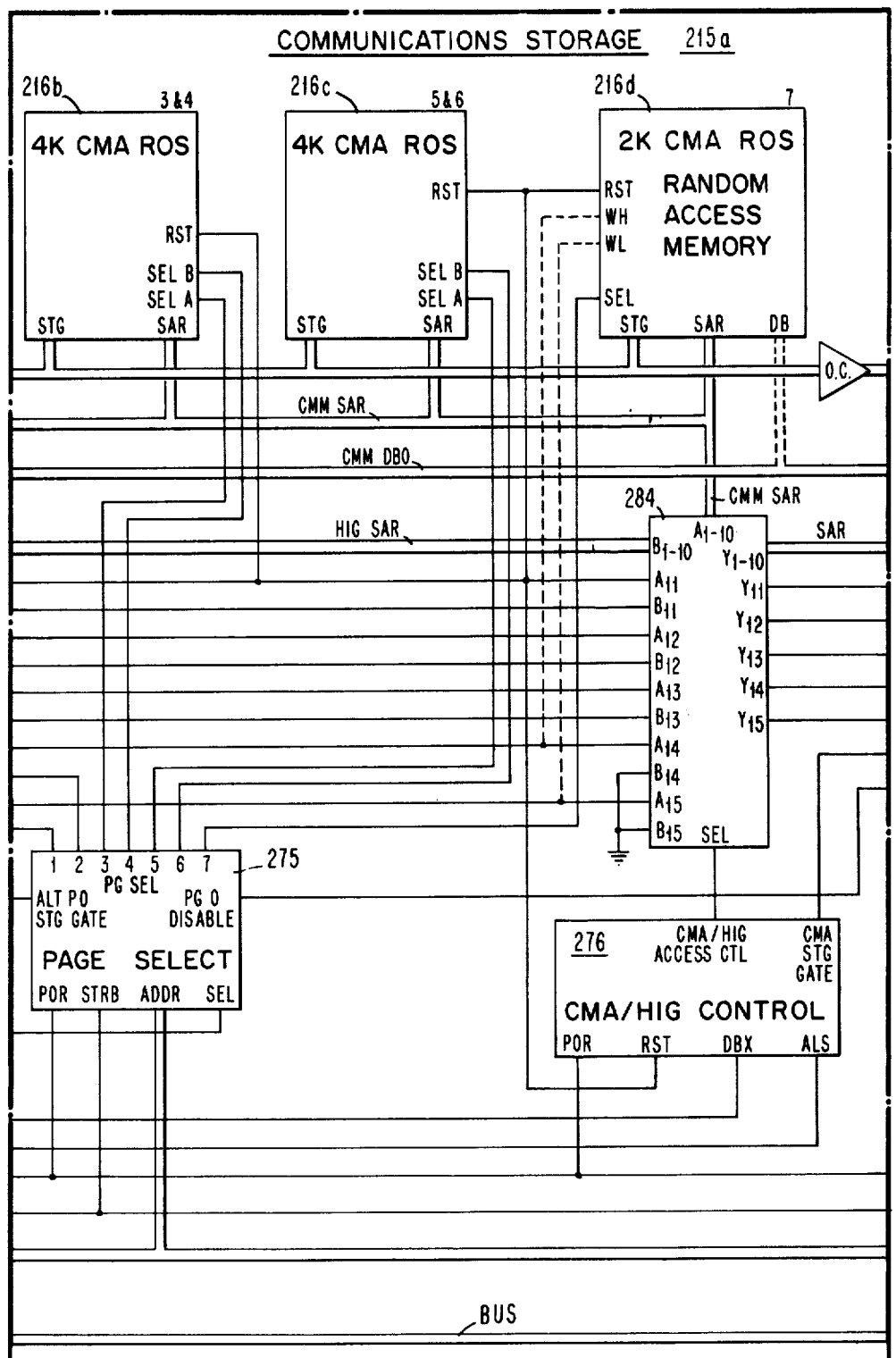
Figure 56N:
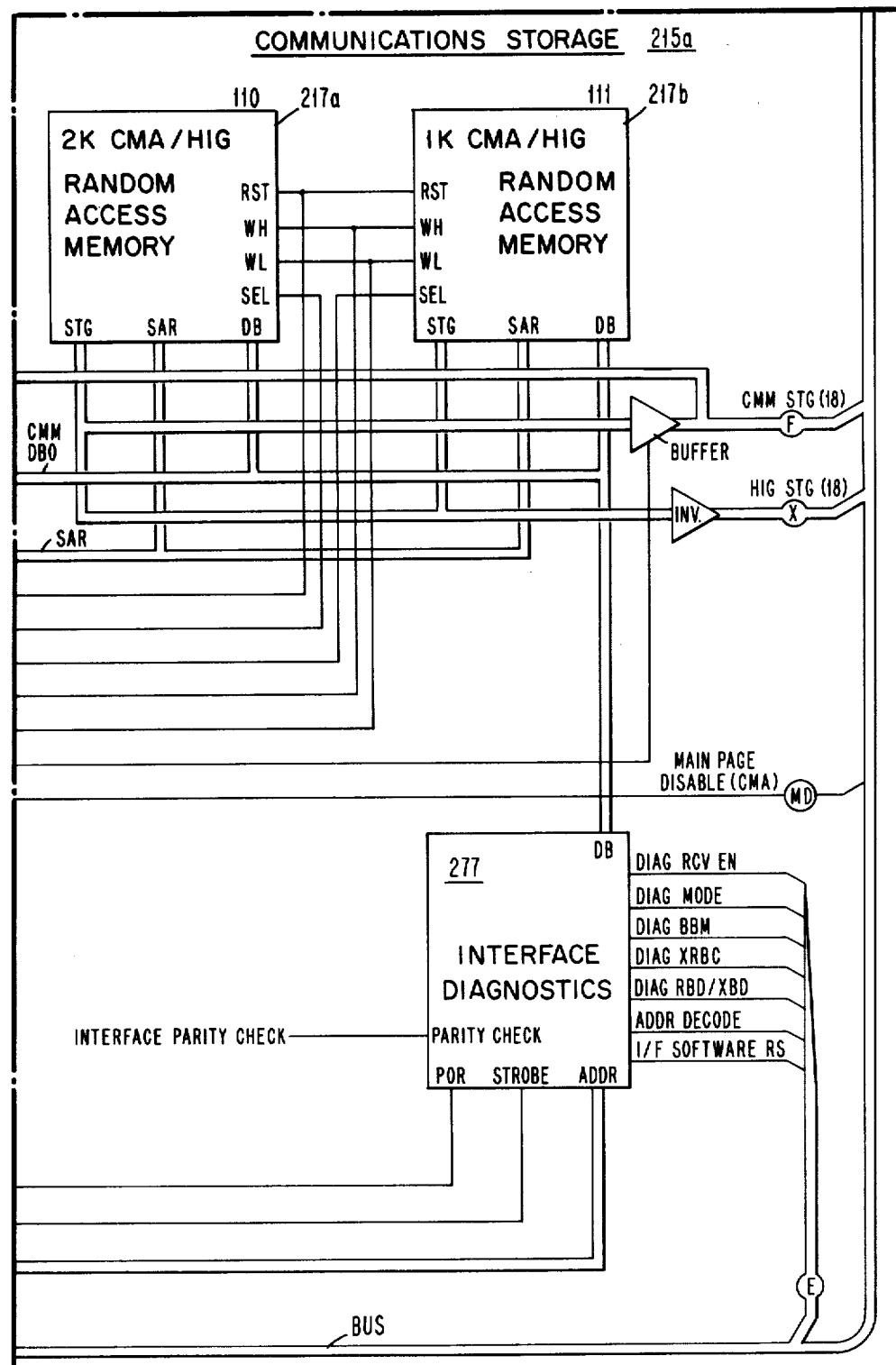
Figure 56:
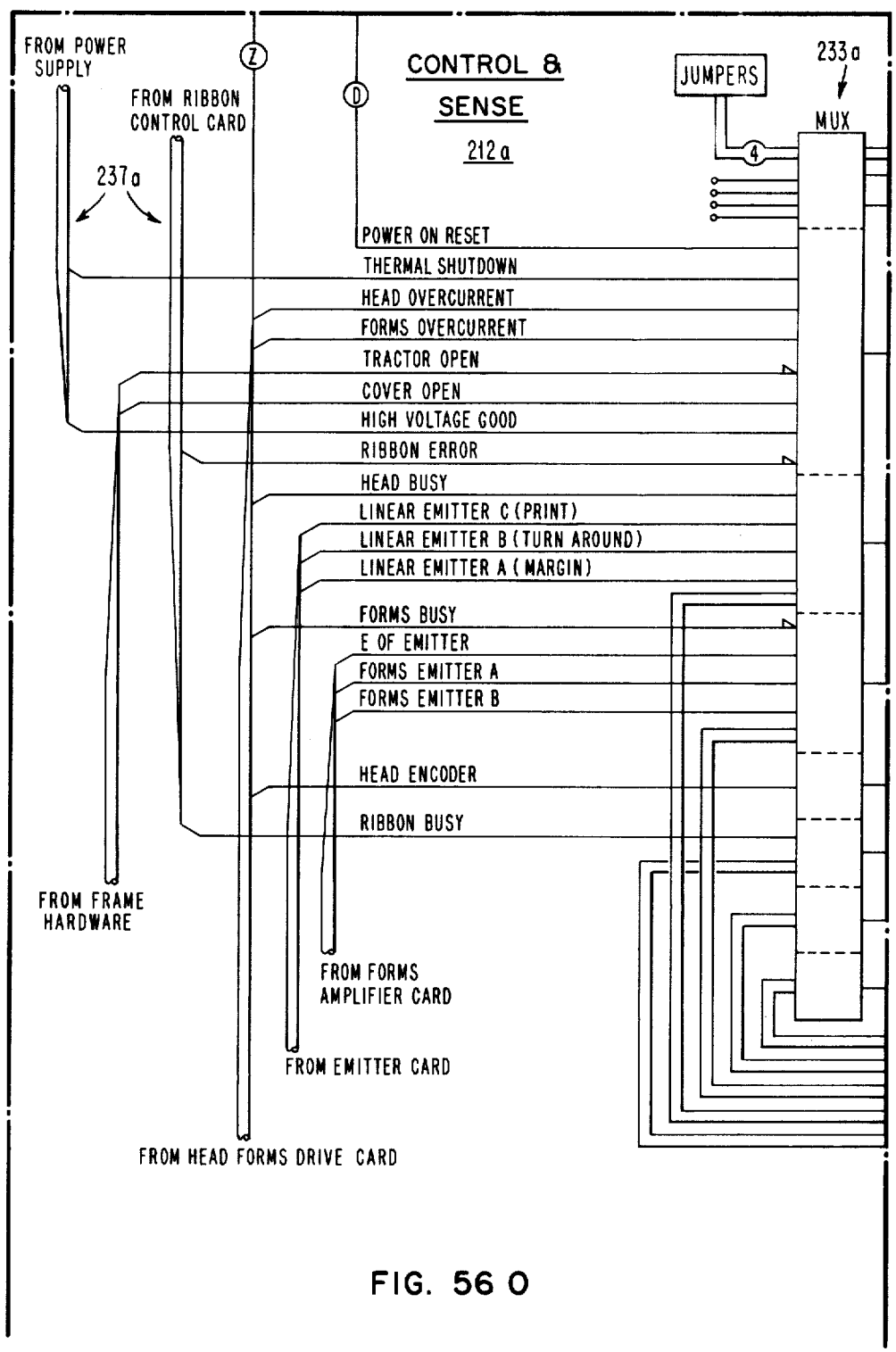
Figure 56:
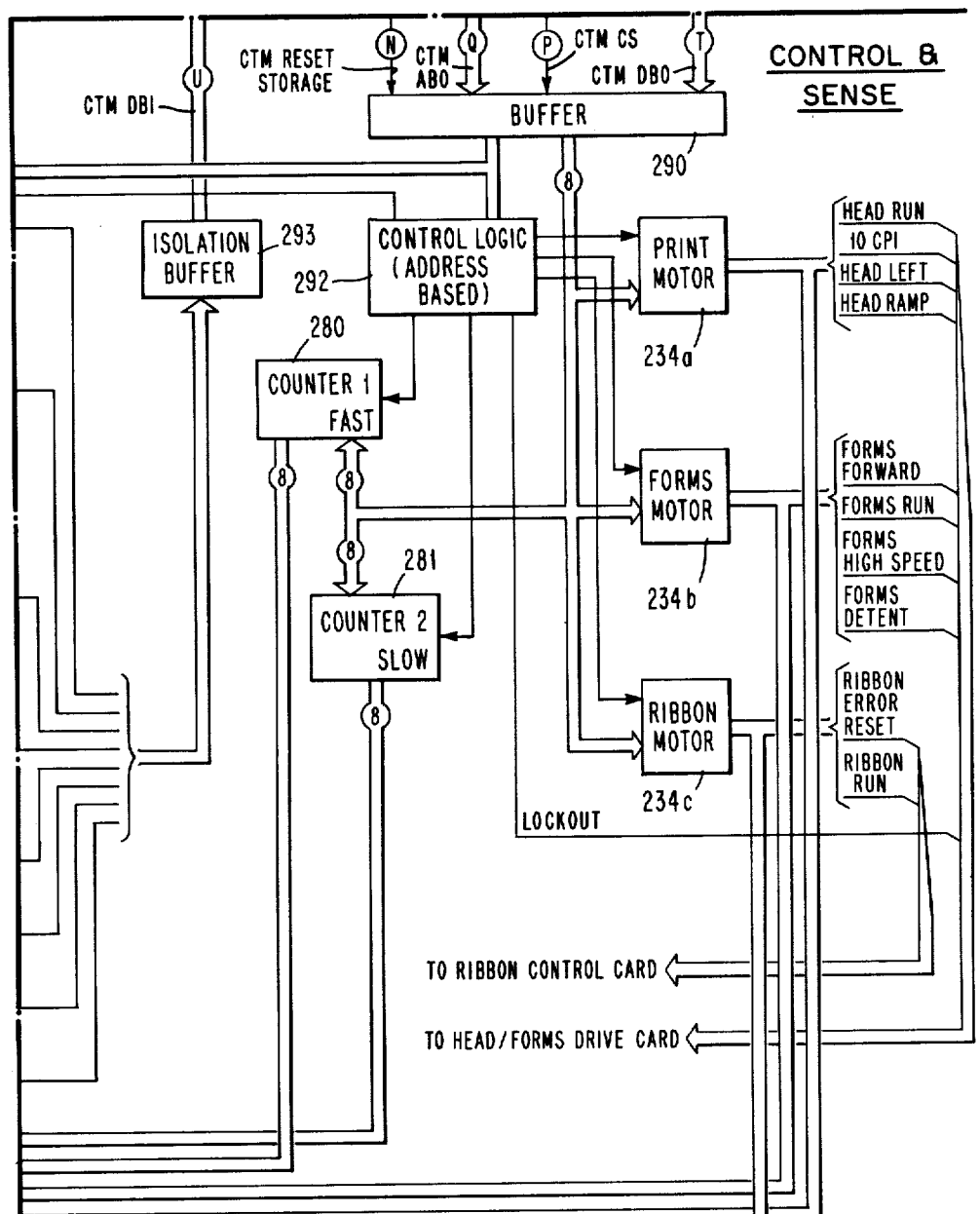
Figure 58:
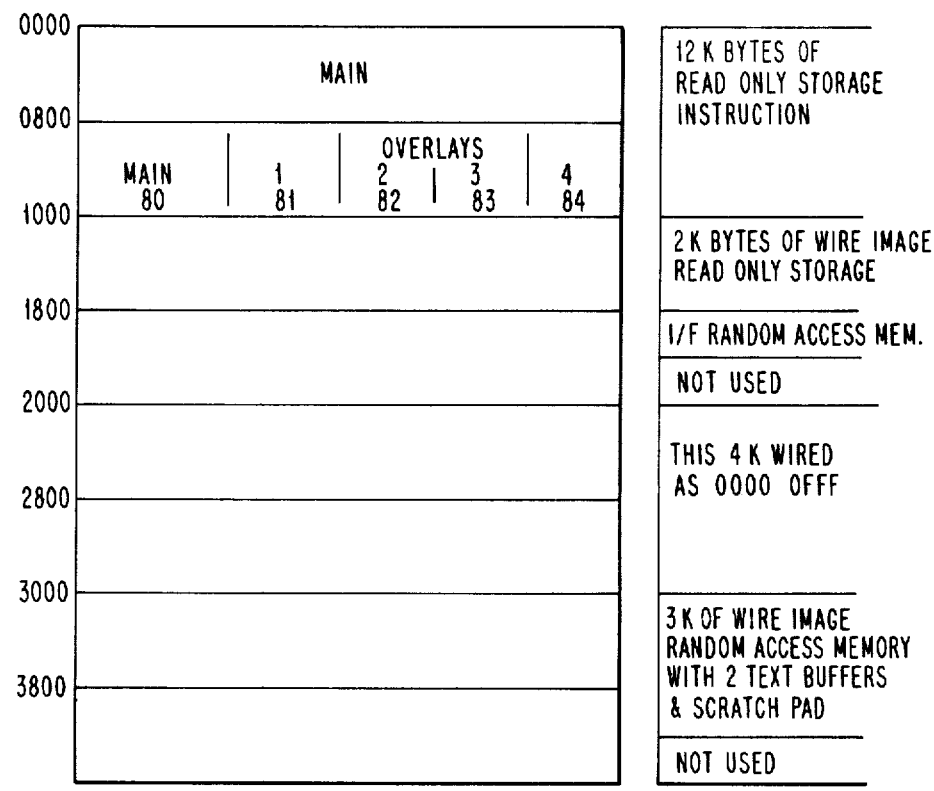
FIG. 58 illustrates assignment of storage locations in the Communications Storage unit.

The Communications Storage 215a, FIGS. 56L–56N, mainly consists of program storage in Read Only Storage (ROS) modules (216a–216d) and some Random Access Memory (217a, 217b) for scratch pad type information and control signals interfacing the Communications Adapter 202a with the Head Image Generator 220a. The layout of these modules is shown in FIG. 58. Modules 216a–216d have 14K bytes of storage. Memories 217a and 217b have 3K bytes of storage. Page select logic 275, FIG. 56M, can select any unit of 2K bytes out of the 14K bytes to be used at any one time, that is, not all of memory is available constantly; the memory is paged.

The way the memory pages are selected is on an Address Bus Out (ABO) type configuration; that is, the first page of ROS has a particular address value assigned to it and when that address is present from the Communications Adapter card and the Communications Adapter card Control Strobe becomes active, it will select the particular page that is assigned that address number. The Communications Adapter 202a keeps track of which page it is in, and advises when another page of memory is needed. The highest 2K bytes in ROS 216d store all font images that are available for use by the printer.

The Communications Adapter (CMA) HIG Control block 276, FIG. 56M, allows the HIG to access the wire image memories 217a and 217b that contain the unslanted character information and also the text buffers which have the characters to be printed. This is done by Select block 284, FIG. 56M, which selects the HIG storage address lines in this case and which otherwise selects the Communications Adapter Storage Address lines. It allows the HIG to select Memories 217a, 217b as needed without interfering with the Communications Adapter. The Communications Adapter can write or read from these memories at any time it is necessary, and the HIG is interleaved within these accesses with the Communications Adapter.

Interface Diagnostic block 277 allows the Communications Adapter to run diagnostics on-line or off-line, by way of cable E, FIGS. 56N and 56A, any mode that it wishes, referring against the Communications Interface diagnostics, block 265, to determine if there are any problems.

Storage, cable X, carries data going to the Head Image Generator. This is the output from the wire image and ext buffer memories 217a and 217b transferred to the Head Image Generator when the Head Image Generator requests information for its wire image operation. Input from the Head Image Generator to the Communications Storage card is by way of the HIG SAR cable Y, FIGS. 56L and 56M, which are the Address Lines for Memory when HIG has access, and the HIG Select Storage lines, cable W, which informs the Communications Storage which of the two memories 217a or 217b the Head Image Generator needs to access.

Control and Sense

The major function of Control and Sense 212a, FIGS. 56O and 56P, is to interface between the Control Adapter 211a and printer electronics listed in FIG. 56O. It performs control and sense functions in that it can read status information from the printer, from the power supply, from the mechanics (such as the covers)

and also electrical information (such as linear emitters and forms emitters and busy signals or ribbon error). Such signals are fed through the Control and Sense card back to the Control Adapter card through the Multiplexer 233a. Control and Sense also handles command information from the Control Adapter going out to the electromechanical parts of the printer. These include commands telling the head to move, at what direction and what speed; telling the forms to move, at what direction and what speed; and also telling the ribbon to run or to reset an error condition. Within Control and Sense there are two interval timers 280 and 281. Timer 280 steps and counts on a three microsecond clock speed, for example, that is, at three microsecond intervals. It can be located from the Control Adapter, and it can be read by the Control Adapter. This is to aid in the Control Adapter's realtime functions, such as error detection of emitters (are they too soon or too late or are they just at the right time). It also aids in scheduling functions before it has to perform another function. The second counter 281 is a slower counter. It steps and counts at a millisecond rate, for example. It is for other functions such as timing the head off of the ramp.

Signals emanating from the Control and Sense card, FIGS. 56O and 56P, go to a number of different circuits for controlling the print heads, forms, and ribbon. See Fig. 56P especially. For the print head there exists signals to tell the electronics to initiate head run, the character per inch speed to run the head, in which direction, or if it is going onto the ramp. Signals are provided to control the forms to run, whether forms should be in high speed and in which direction they should move. As to the ribbon control circuits, there exist basically just two signals. One advises the ribbon to run, the other to reset an error if the ribbon circuits reported one. Signals coming into and terminating at the Control and Sense card, FIG. 56O, come from various sources. For example, the Frame Hardware provides signals to indicate Tractor Open or Cover Open. The print emitter circuits present signals from the print head emitters. From the Head and Forms Drive circuits come feedback information on the head drive phases advising that the head is busy, Head Busy. Forms Busy advises that forms are in movement and Forms and Head Overcurrent occurs if mechanical binding or some failure has occurred. The overcurrent status is reported back to the Control Adapter. From the forms emitter circuits are presented to forms emitters A and B signals and an End of Forms (EOF) emitter which advises that the printer needs more paper. From the Ribbon Control card is reported Ribbon Error and/or Ribbon Busy if the ribbon is currently running. On the Control and Sense card, the Data Bus Out contains individual bits of information that are latched up and that go out to the electronics. As an example, for a particular Address Bus Out (ABO) address on cable Q indicating Print Motor 234a the corresponding data on cable T is entered in Buffer 290 to indicate head run information, character density information, head direction, or head ramp. Four fits of data are set in buffer 290. The Control Logic 292 recognizes the occurrence of a Control Strobe Signal, cable P and controls the Print Motor block 234a to latch the information when it is all present. The same applies to the Forms Motor block 234b which has a different ABO address. The Control Logic operates in a similar way for blocks 234b and 234c.

Information coming back from the electronics cards is grouped according to an address on the ABO lines again. The Control Adapter presents a particular address on cable Q. This gates the information from either the Emitter card or the Head Forms Drive card or the Forms Amplifier card through Multiplexer 233a—whichever device is specifically selected by the address on the Address Bus Out lines. This information is transferred through the Isolation Buffer 293 to the Control Adapter Data Bus In cable U so that the Control Adapter can read the status. The Address Bus Out lines, in this case, are not gated by any special signal, but become effective as soon as they are activated.

FIG. 58 shows the layout of the Read Only Storage (ROS) and Random Access Memory locations in the Communications Adapter.

On the left part addresses are shown as they would apply in the machine. These are four-digit hexadecimal (Base 16) addresses. The microprocessor uses the three low order digits. The first addresses are 0000 to 0800 which would indicate a 2K or 2048-byte segment of memory. This is executable code containing the main program entry point. From 0800 to 1000, there are multiple segments of code by the same address called "overlays". Each overlay is accessed by an OUT command with a number associated with it. There are five separate overlays that can be accessed within the addresses 0800 to 1000; the first overlay being the main overlay of 80; the second one, overlay 81; the third one, 82; the fourth one, 83; and the fifth one, 84. Only one of these overlays may be accessed at a specific time until another OUT command selects another overlay.

The addresses 1000 to 1800 are basically still addresses 000 to 800, but serve as data memory versus executable memory. This is where the 2K (2048) bytes of wire image ROS are placed. This is the compressed images used for printing and is where all 16 fonts, or representative images, are stored in the compressed mode to be uncompressed later into Random Access Memory. From 1800 to 1BFF is where the Interface Random Access Memory Buffers are located, Buffer 1 being at 1800, Buffer 2 at 1900. Each buffer is 256 bytes long. No memory is located in locations 1C00 to 3000. A select byte called the X-byte, if off, will select locations 0000 to 2000, and if on, will select locations 2000 to 4000. There are data bytes and instruction bytes in the machine, with the X-byte affecting both data and instructions. With this capability, the Interface Buffer is selected with the X-byte off; the Text Buffer is selected with the X-byte on. By internal wiring, any access to any memory in locations 2000 to 3000 will access locations 0000 to 1000. This prevents having to duplicate code when the X-byte changes. Otherwise, it would be necessary to have another Read Only Storage with exactly the same code in both places. By wiring one ROS as if it were in both places, the microprocessor executes this code independently of the X-byte.

Starting at 3000, there are 3K (3072) bytes of Random Access Memory in which the wire images are built from the 2K bytes of wire image ROS located at 1000. The addresses from 3000 to 38FF are the addresses used for all wire images. In effect, the subsystem is using three digits, which would be 000 to 8FF in this wire image random access memory. All images are stored as 9 slices. By using the first of the three digits to indicate the slice, the next two digits represent the EBCDIC or Extended Binary Coded Decimal Interchange Code value of the characters as sent over by the host or other source. For example, if the first slice of the letter "C" is required, which is an EBCDIC C3, then the subsystem looks in location 0C3 for the first slice of the image, 1C3 for the second slice of the image, etc. for the letter "C".

From 3C00 to 3FFF, no memory is used. This is basically the layout of memory, both Random Access and Read Only Memory for the Communications microprocessor.

DETAILED OPERATION OF HEAD IMAGE GENERATOR

The Head Image Generator functions to generate wire images at high speeds for the printer previously described having the slanted serrated wire arrangement. A printer of this nature typically will have anywhere from two to eight print heads, each with a plurality of print wires, such as eight in number. Reference is again made to FIG. 35 which depicts generally the relationship of the Head Image Generator 220 with respect to the two microprocessors 200 and 210 as well as a Random Access Memory 217. Memory 217 in a representative system is 3K bytes in size.

The Head Image Generator 220 interfaces with the two microprocessors and receives all its control data for initializing and loading the necessary information in order to start the cycles to create unique wire images for the slanted print wire head configuration.

In order to grasp the nature of the Head Image Generator (HIG) function, it is important to understand the transition from the traditional concept of matrix printing to the slanted group configuration. Conventionally, the print head is moved one step at a time horizontally across the character matrix with the option of firing all wires within each vertical slice of that character's image. Therefore, in order to print the character H (FIG. 33A), the head carrier sweeps along the print line and leaves 7 dots on slices 2 and 8 and 1 dot on slices 4 and 6. Other characters such as those in FIG. 30 are handled in a similar fashion.

To describe the same character with the slanted group, there is a much wider sweep across the character. Instead of having all the wires within each character slice, each wire is two characters apart, as illustrated in FIG. 37. Therefore, the printer fires only one wire at a time within any given character.

To implement this function and considering FIGS. 56A-56P, but especially considering FIGS. 56I-56K, the Head Image Generator goes through two storage access cycles to generate each individual dot or option. In order to keep track of the different characters on a given line, wire matrix positions and number of groups, the Head Image Generator uses a diversity of counters. The final slanted wire image data corresponding to one machine wire fire is stored in the small memory 217a and 217b, FIG. 56N, and finally addressed by Control microprocessor 210a, FIG. 56E, to later command the firing of the wires.

HIG INITIALIZATION

First, the Communications microprocessor 200a loads the information into text buffers contained within the 3K memory area, FIGS. 56N and 58. Control microprocessor 210a has the task of loading the Head Image Generator with two bytes of information provided on the CTM Data Bus Out cable group T, FIGS. 56F, 56J and 56K. The first byte goes to register 291, FIG. 56K and counter 286, FIG. 56J, and contains information as to character density, head direction, and the number of groups found in that machine. The second byte loads the Head Image Generator with the rightmost character to be printed, which always corresponds to wire 8 of the rightmost group (the Head Image Generator works from right to left). The loading of these characters is controlled by load control and load character signals in the cable group V, FIGS. 56F, 56K and 56J.

A signal on the Head Image Generator Load Control line, cable group V, FIG. 56K, resets cycle Latch 332 and Word Select Latch 338 through OR circuit 331 and also sets the Run HIG Latch 294 and in turn through AND circuit 295 in FIG. 56J sets HIG Cycle Flip Flop 296 which by way of the NAND circuit 297 and line 298 resets the HIG cycle counter 271, FIG. 56I in readiness for a complete HIG operating cycle. Also, Gate HIG Latch 321 is set on. The output of Run HIG Latch 294 is further supplied to Reset Latch 340, FIG 56J, for later reset of Latch 294 at output 17 time of HIG Cycle Counter 271. After these two bytes are loaded, the HIG waits for the Communications microprocessor 200a to allow it to start the memory cycles under control of Cycle counter 271, FIG. 56I and CMA/HIG Control 276, FIG. 56M.

The operating cycles of the Head Image Generator and the cycle counter are as follows:

| OPERATING CYCLES HIG CYCLE COUNTER | |
|---|---|
| Cycle | Action |
| 0 or A | Both of these pulses turn "on" HIG Reset Latch 325 and HIG Select (SEL) Latch 326 to initiate the HIG memory cycles and enable access of the 3K Random Access Memory. |
| 3 or D | Both pulses turn off HIG Reset Latch 325. |
| 6 or 10 | Pulses turn off HIG Select Latch 326. |
| 7 or 11 | Pulses gate valid data to Multiplex and Storage block 221a in conjunction with Parity Check block 330 for use by HIG 220a in generating proper wire images. |
| 8 | Pulse sets the cycle Latch 332, Fig. 56K to start second memory cycle. |
| 9 | Pulse gates wire image address to bus by way of Word Select Latch 338, Fig. 56K. |
| 12 | Pulse gates the masked bit from Gate 250, Fig. 56J to the Hold Register 282, Fig 56K and also resets Gate HIG Latch 321 through OR circuit 320. |
| 13 | This pulse gates Text Address to bus by setting the HIG back to Memory cycle 1 (resets Cycle Latch 332), decrements Wire Counter and Decode block 287 by one, and decrements character counter 288 by 2, for 10 CPI and 3 for 15 CPI by way of block 283. |
| 14 | Pulse gates Hold register 282 to buffer 272 or branch to start (0). Also, HIG Cycle Flip-Flop 296 and Gate HIG Latch 321 are reset using AND circuit 344. |
| 15 | Pulse decrements Head (Group) counter 286 by "1" and resets Hold Register 282. |
| 16 | Pulse loads "8" in wire counter (line 346), decrements Character number counter 288 by X (depending on group spacing and character density). |
| 17 | Assuming Head (Group) counter equals zero, the pulse increments wire position counter 289 if groups are moving to the right and decrements the counter if movement is to the left. Also resets the rest of the logic. |

MEMORY CYCLES

The Head Image Generator cycles memories 217a, 217b using an oscillator pulse, cable J, FIG. 56I, and control lines from the Communications microprocessor 200a, FIG. 56C, and decides whether or not a particular wire is fired for a given print option. In a first cycle, it fetches the EBCDIC value of the character in which the wire is positioned, FIG. 61. This address is created from the character number on the print line as stored in counter 288, FIG. 56J.

In the second cycle, the Head Image Generator finds the corresponding wire image slice for that character. A vertical slice now has only one possible wire. Using a masking technique, one of the eight possible wires is selected and stored in the Hold Register 282, FIG. 56K, and transferred subsequently to the small stack 272, FIG. 56K.

The masking technique involves the decode portion of the wire counter and decode block 287, FIG. 56I, which supplies outputs on cable 249 to activate one of eight AND Circuits in block 250 which in turn controls entry of the data representing each of eight wires in sequence and only one at a time into the Hold Register 282. The memory access cycles repeat until all wires in all of the groups are loaded in stack 272, FIG. 56K. Some clock pulses during these cycles are used for loading, incrementing, setting or resetting the logic in FIGS. 56I-56K which constitutes the Head Image Generator.

HIG COUNTERS

From FIG. 37 it can be seen that to describe any of the print wires in the print head, such as print head 2, four pieces of information are needed. Referring to FIGS. 56I and 56J, the Head Image Generator needs to know which group it is working with, Head or group counter 286; which wire within the group, wire counter portion of wire counter and decode block 287, FIG. 56I; to which character that wire is pointing to on the print line, character counter 288, FIG. 56J; and finally in which slice of that character is the wire positioned, wire position counter 289, which is initialized (INIT), incremented (INC) and decremented (DEC) by block 347, FIG. 56J.

All counters, except the wire position counter, are loaded by Control microprocessor 210a for every machine print option. The Head (group) counter 286 is loaded with the total number of print head groups and decremented by one after the wire counter decrements, from wire 8 down to wire 1 and gets ready to start on wire 8 of the adjacent print head (group). At the same time that the wire counter is decremented, the character counter is also decremented. As illustrated in FIG. 37, the distance between the wires is two characters, so every time the Head Image Generator moves from one wire to the next wire, the character counter is decremented by two. Also from FIG. 37, the space between wire 8 of one print head (group) and wire 1 of its adjacent group is four characters, so the character counter must be decremented by four between groups. Both decrements to the character counter are dependent on character density and group spacing. These are hardware programmable by use of the Head Spacing Jumper and block 283, FIG. 56J, and output 16 of the HIG cycle counter 271 as well as output 13 which controls decrementing of two (2) or three (3) characters and all other selected combinations of group spacings for the printer, depending on how many print heads it has.

Decrementing the counters in the manner described enables the Head Image Generator in stack 272, FIG. 56K, to obtain the information from wire to wire and from group to group until all wires are optioned, masked and stored for one machine print option.

CONVERSION FROM DATA TABLE TO A WIRE IMAGE AS PRINTED

FIG. 61 is a chart that indicates the conversion from the data tables, as compressed in the Read Only Storage 216d, to a wire image as developed by the Head Image Generator from memories 217a or 217b. FIGS. 60 and 61 show the Capital Letter "A" and the slices needed to develop its image. In FIG. 61, the "A" is outlined by the wire fires represented by "1's". Separate tables referred to as Table 1 and Table 2 indicate how the data looks in the compressed Read Only Storage. Table 1 indicates which bytes are used from Table 2 to create the image. Each byte represents seven bits, and if a bit is on in Table 1 in those seven bits, it represents picking up the next byte in Table 2 to create a slice of an image. If the bit in Table 1 is not on, then that next slice is filled in with zeros or a blank, and Table 2 is not used to gain any data until the next bit from Table 1 is encountered that is on. Then, this next byte will be obtained from Table 2 to create a subsequent slice. In the example, Table 1 has an "FE" which has the bit pattern of 11 11 11 10. It is assumed that the pointer in Table 2 is at the point where the first character is located which is 1E 20 48 80 48 20 1E. These seven bytes represent what is used to create the letter "A". The 1E is the first actual slice position used. It is on because the "FE" in Table 1 and actually represents the second slice for the character "A". The first and ninth slices have already been blanked due to the Random Access Memory being wiped out or cleared at initialization time. So, slice 2—represented by 1E going from top to bottom in the slice is a 00011110. This would cause wire 1, the top wire to be off; the next wire below it will be off; the third wire down will be off; the fourth, fifth, sixth and seventh wires down will fire which will cause the vertical line of the left side of the capital letter "A". The next byte for slice 3, Table 2, is a twenty (20) which creates a dot for the third wire down with the rest of the wires not firing for the third slice. The fourth slice, represented by a forty-eight (48) will cause the second wire down and the fifth wire down to fire. The eighty (80) which is the next slice will cause only the top wire to fire. The scan is now halfway through the "A". The rest of the "A" is repeated since it is a symmetrical letter. The sixth, seventh and eighth slice for the letter "A" are obtained. Now, the Head Image Generator takes this data, slants it and provides the necessary wire image information to the control microprocessor so that the print wires will fire at the proper time when they are in the proper place for the desired character.

Figure 62:
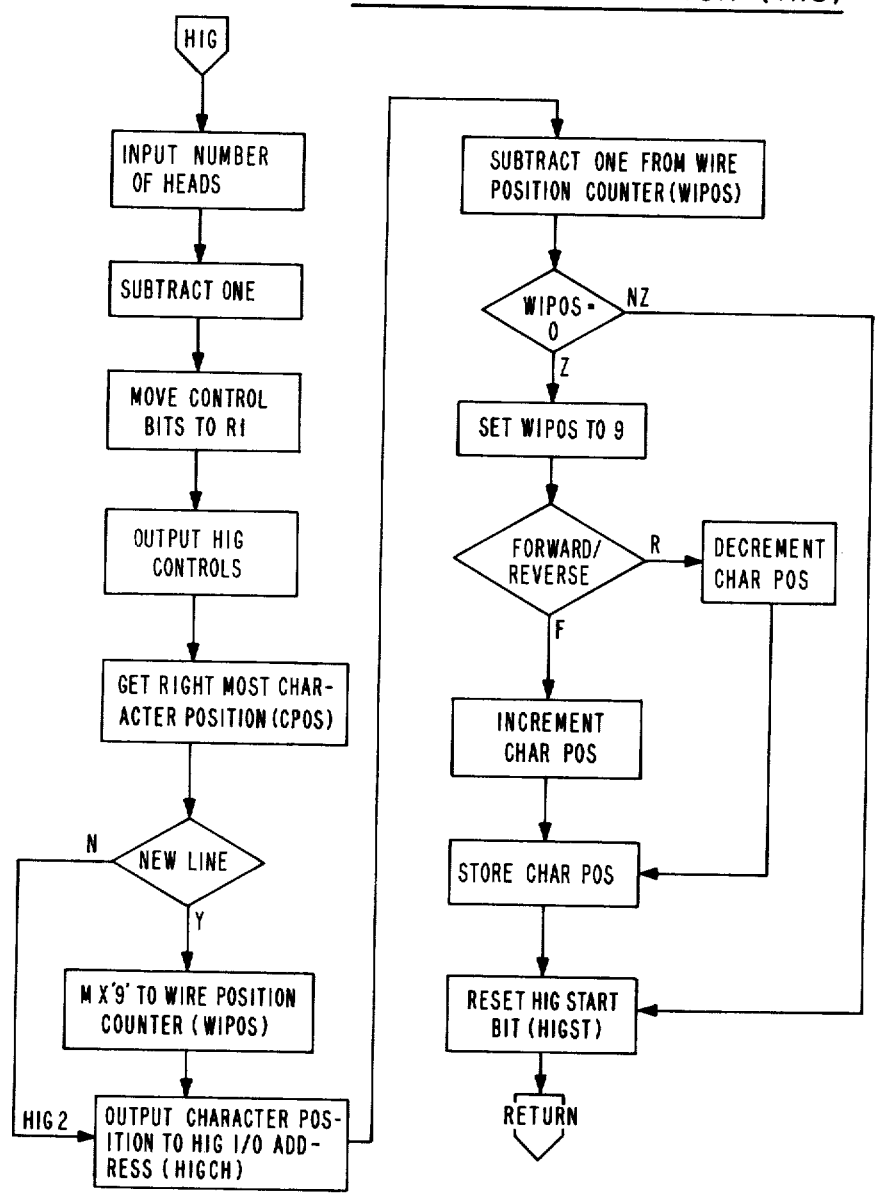
FIG. 62 is a flow chart representing the operation of the head image generator in conjunction with a control microprocessor.

FIG. 62 illustrates the Head Image Generator Routine involving both the control microprocessor 210a, FIG. 56E, and the Head Image Generator, FIGS. 56I, 56J and 56K. The entry point is labeled HIG. The routine inputs the number of heads (groups), which is anywhere from two to eight, to the attachment on the printer, and subtracts one from the headcount. The Control Bits are moved to Register 1 in the control microprocessor 210a, FIG. 56E. The Control bits indicate the head speed, direction and selected text buffer in the Communications Storage (random access memory 217b) to be used to generate the next line of print. The headcount plus the Control Bits are then output from the control microprocessor to the Head Image Generator hardware, FIGS. 56I-56K. The program then gets the rightmost character position (this is the character position corresponding to the rightmost wire of the rightmost actuator group) and determines if a new line of print is about to begin. If "Yes", the wire position counter 289, FIG. 56J, is initialized to nine; if not, that step is bypassed and the character position is outputted to the Head Image Generator counter 288, FIG. 56J. The wire position counter is then decremented by one and a check made to see if it has reached zero. If it has reached zero, then the wire position counter is reset to a nine (9) and the forward/reverse bit is checked. Then the character position is either incremented or decremented depending on whether the head is moving left or right. The new character position is stored, the HIG Start Bit is reset, and the routine returns to the calling program.

OPERATION CODES

A number of operation codes are utilized by the microprocessors. These are listed below.

| ALU OP CODES | | | |
|---|---|---|---|
| MODE | | VALUE | |
| REG TO REG | | 0_ | |
| DAR TO DAR | | 1_ | |
| REG TO DAR | | 2_ | |
| DAR TO REG | | 3_ | |
| MSK TO REG | | 4_ | |
| MSK TO DAR | | 5_ | |
| Function OP Codes | | | |
| Add | A | _0_ | |
| Add Carry | AC | _1_ | |
| Move | M | _2_ | |
| Clear (0) | CLR | _2_ | |
| Subtract/Borrow | SB | _3_ | |
| Subtract | S | _4_ | |
| Compare | C | _5_ | |
| Subtract Summary | SS | _6_ | |
| Compare Summary | CS | _7_ | |
| And | N | _8_ | |
| Set Bit Off | SBF | _8_ | |
| Test | T | _9_ | |
| And Summary | NS | _A_ | |
| Test Summary | TS | _B_ | |
| Or | O | _C_ | |
| Set Bit On | SBN | _C_ | |
| Shift Right | SR | _D_ | |
| Exclusive Or | X | _E_ | |
| Shift Right Circular | SRC | _F_ | |
| Conditional Branches | | | |
| Branch Not Carry, Branch High | BNC,BH | | C_ODD |
| Branch Carry, Branch Less Than Or Equal | BC,BLE | | D_EVEN |
| Branch Not Zero, Branch Not Equal, Branch True | BNZ,BNE,BT | | E_ODD |
| Branch Zero, Branch Equal, Branch False | BZ,BE,BF | | F_EVEN |
| Unconditional Branches | | | |
| Branch and Wait | BAW | | C_EVEN |
| Branch | B | | D_ODD |
| Branch and Link | BAL | | E_EVEN |
| Branch Via Link | RTN | | F001 |
| Return and Link | RAL | | F201 |
| Branch Via DAR | BVD | | F301 |
| Select Data Address Registers (DAR's) and Storage (STG) | | | |
| Select Memory Data Low | SDL | | FC01 |
| Select Memory Data High | SDH | | FE01 |
| Select Memory Inst Low | SIL | | F481 |
| Select Memory Inst High | SIH | | F489 |
| Select Data Bit X Off | SXF | | F441 |
| Select Data Bit X On | SXN | | F445 |
| Select Main DARS | SMD | | F501 |
| Select Aux DARS | SAD | | F701 |
| Input/Output, Load/Store Ops | | | |
| Input From Device | | IN | 68_ |
| Sense Device | | SNS | 69_ |
| Output To Device | | OUT | 78_ |
| Direct Input and Output | | DIO | 7A_ |
| Load Registers | | LDR | 89XY |
| Load Registers and DAR + 1 | | LDRP | 8BXY |
| Load DAR | | LDD | 84XY |
| Load DAR and DAR + 1 | | LDDP | 86XY |
| Load Memory Indexed | | LDI | 8A0_ |
| Memory to I/O Device | | MIO | 8C_ |
| Memory to I/O Device and DAR + 1 | | MIOP | 8E_ |
| Load Link Register | | LDL | 8000 E |
| Load Link Register and DAR + 1 | | LDLP | 8200 E |
| Load Absolute Address | | LDA | 9_ |
| Store Registers | | ST | A9XY |
| Store Registers and DAR + 1 | | STRP | ABXY |
| Store DAR | | STD | A4XY |
| Store DAR and DAR + 1 | | STDP | A6XY |
| I/O Data To Memory | | IOM | AC_ |
| I/O Data To Memory and DAR + 1 | | IOMP | AE_ |
| Store Memory Indexed | | STI | AA0_ |
| Store Link High Order (Even Byte) | | SLH | A000 |
| Store Link High Order and DAR + 1 | | SLHP | A200 |
| Store Link Low Order (Odd Byte) | | SLL | A100 |
| Store Link Low Order and DAR + 1 | | SLLP | A300 |
| Store In Absolute Address | | STA | B_ |

MICROPROCESSOR REGISTERS

Figure 63:
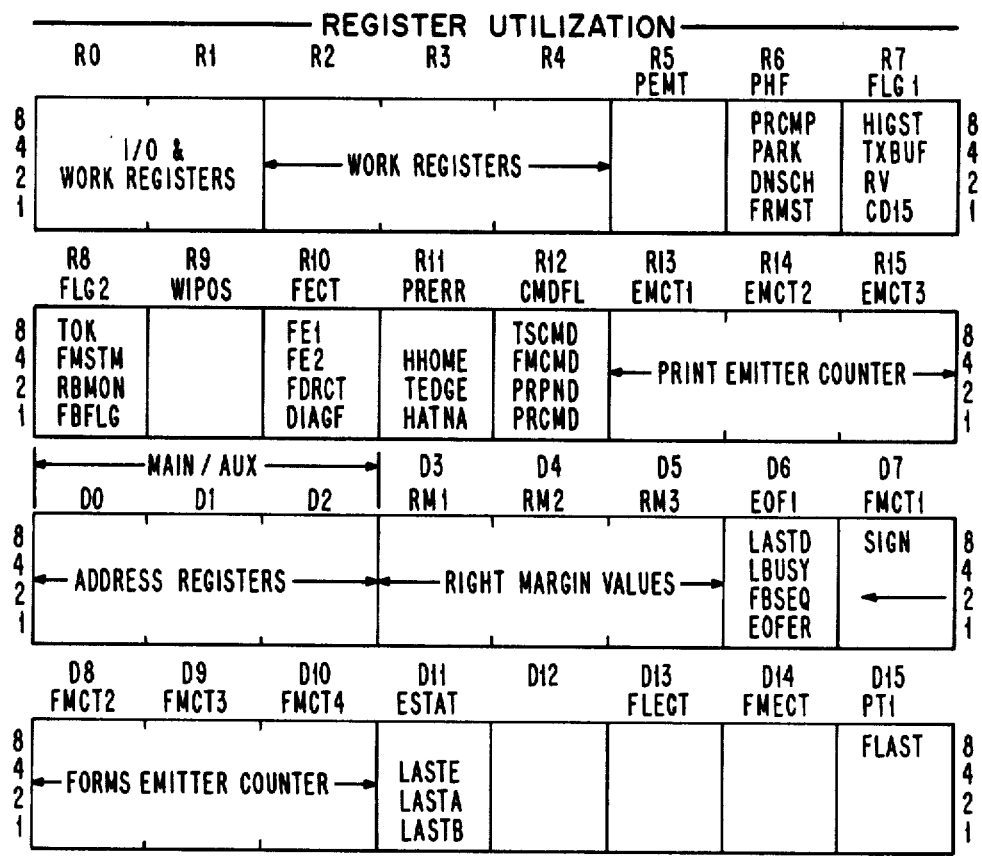
FIG. 63 illustrates layout of various internal registers in the control microprocessor.

Each of the microprocessors 200 (200a) and 210 (210a) has a number of internal registers that are used for various purposes such as work registers. The register layout for the Control microprocessor 210 (210a) is shown in FIG. 63.

As a convenience, the register assignments are listed below.

| Communications Microprocessor Registers | | | |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Country Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0 = 1, 1 = 2) |
| RAMP | EQU | X'1' | Rest for Ramp Indicator |
| LSCON | EQU | D11 | Last Console Setting /F = In Load Mode |
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |

-continued

| | | | |
|---|---|---|---|
| D2LD | EQU | X'4' | Mask To Test for 2nd Data Load |
| D3LD | EQU | X'C' | Mask To Test for 2nd Data Load |
| RESN1 | EQU | X'1' | Mask To Test for 1st Resend |
| RESN2 | EQU | X'2' | Mask To Test for 2nd Resend |
| RESND | EQU | X'3' | Mask To Test for Either Resend |
| NOLD | EQU | X'F' | Mask To Test for No Command |
| MVADJ | EQU | D15 | Adjustment Control Byte |
| RLRD1 | EQU | X'9' | Roll and Ready Indicator Together |
| ROLLD | EQU | X'8' | Roll Display Indicator |
| CHGD | EQU | X'4' | Change To Next Sequence Indicator |
| ADJP1 | EQU | X'2' | Change Density Mask |
| RDY1 | EQU | X'1' | Software Ready Indicator |
| RAMIN | EQU | X'OFFB' | End of Random Access Memory in ROS Slot |

Control Microprocessor Registers

| | | | |
|---|---|---|---|
| IO0 | EQU | R0 | Input/Output Register |
| IO1 | EQU | R1 | Input/Output Register |
| | | R2 | Work Register |
| | | R3 | Work Register |
| | | R4 | Work Register |
| PEMT | EQU | R5 | Indicates Previous Emitters |
| PHF | EQU | R6 | Print Head Flags |
| FRMST | EQU | X'1' | Forms Start Flag |
| DNSCH | EQU | X'2' | Density Change Flag |
| PARK | EQU | X'4' | Ramp Command Flag |
| PRCMP | EQU | X'8' | Printing is Complete |
| FLG1 | EQU | R7 | Indicator Flags |
| CD15 | EQU | X'1' | Character Density Equals 15 CPI |
| RV | EQU | X'2' | Print Head is Going Left (Reverse) |
| TXBUF | EQU | X'4' | Head Image Generator Is to Use Text Buffer 2 |
| HIGST | EQU | X'8' | Head Image Generator Is to Start Print Lines |
| FLG2 | EQU | R8 | Ribbon Flags |
| FBFLG | EQU | X'1' | Wire Feedback Flag |
| RBMON | EQU | X'2' | Ribbon Motor Is On |
| FMSTM | EQU | X'4' | Forms Time Flag |
| TOK | EQU | X'8' | Turn Around Is OK |
| WIPOS | EQU | R9 | Wire Position Counter |
| FECT | EQU | R10 | False Emitter Counter |
| DIAGF | EQU | X'1' | Diagnostic Flag |
| FDRCT | EQU | X'2' | Direction of Forms Movement |
| FE2 | EQU | X'4' | False Emitter 2 |
| FE1 | EQU | X'8' | False Emitter 1 |
| PRERR | EQU | R11 | Printer Error Flags |
| | EQU | X'8' | Not Used |
| HHOME | EQU | X'4' | Head Home Flag |
| TEDGE | EQU | X'2' | Turnaround Edge Flag |
| HATNA | EQU | X'1' | Head Stopped At Turnaround Flag |
| CMDFL | EQU | R12 | Command Flags |
| PRCMD | EQU | X'1' | Print Command Flag |
| PRPND | EQU | X'2' | Print Command Is Pending |
| FMCMD | EQU | X'4' | Forms Command Flag |
| TSCMD | EQU | X'8' | Test Command Flag |
| EMCT1 | EQU | R13 | Emitter Counters - Used To Determine Head Position by the Number of Emitters From Left Margin |
| EMCT2 | EQU | R14 | |
| EMCT3 | EQU | R15 | |
| MAIN/AUX | EQU | D0,D0 Aux | Address Registers |
| MAIN/AUX | EQU | D1,D1 Aux | Address Registers |
| MAIN/AUX | EQU | D2,D2 Aux | Address Registers |
| RM1 | EQU | D3 | Indicates Right Margin When the Emitter Counter Attains This Value |
| RM2 | EQU | D4 | |
| RM3 | EQU | D5 | |

End of Forms Indicators

| | | | |
|---|---|---|---|
| EOFI | EQU | D6 | End of Forms Indicators |
| LASTD | EQU | X'8' | Last Forms Direction, 1 = Forward; 0 = Reverse |
| LBUSY | EQU | X'4' | Busy History Indicator |

-continued

| | | | |
|---|---|---|---|
| FBSEQ | EQU | X'2' | Busy Sequence Flag |
| EOFER | EQU | X'1' | End of Forms Detected Indicator |
| FMCT1 | EQU | D7 | 16 Bit Forms AB Emitter Counter |
| FMCT2 | EQU | D8 | |
| FMCT3 | EQU | D9 | |
| FMCT4 | EQU | D10 | |
| SIGN | EQU | X'8' | Counter Sign Bit |

Emitter Status Register

| | | | |
|---|---|---|---|
| ESTAT | EQU | D11 | |
| LASTE | EQU | X'4' | Last End-of-Forms Emitter Value |
| LASTA | EQU | X'2' | Last Forms A Emitter Value |
| LASTB | EQU | X'1' | Last Forms B Emitter Value |
| | EQU | D12 | |
| FLECT | EQU | D13 | Forms Lost Emitter Counter |
| FMECT | EQU | D14 | Forms Missing Emitter Counter |
| PT1 | EQU | D15 | Program Timer 1/Forms Command Count |
| FLAST | EQU | X'8' | 8 or More Forms Commands Flag |

EQUATES—CONTROL MICROPROCESSOR

The following equivalent expressions, that is, "equates" are used in connection with Control microprocessor program listings. These are used by an Assembler to fill in a number for the English-type expression.

| Name | Definition |
|---|---|
| CPOS | Input the rightmost character position |
| DTNT | Forms Detent Speed |
| FEA | Forms Emitter A |
| FEB | Forms Emitter B |
| FWD | Forms Direction |
| HIGCH | HIG-Rightmost Wire Position (Output) |
| HIGCN | HIG Control Output |
| HIGST | Head Image Generator is to Start |
| MARGN | (In R0) Margin Emitter |
| NOHDS | Number of Print Actuator Groups |
| PREM | (In R0) Print Emitter |
| RUN | Forms Run |
| RV | Printhead is Going Left (Reverse) |
| TRNAR | (In R0) Turn Around Emitter |

LABELS—CONTROL MICROPROCESSOR

The following labels are used by the Communications microprocessor. These serve, for example, as pointers for addressing or for branching purposes.

LABEL

HIG01
HIG02
HIG03
MCNTL

PROGRAM LISTINGS

Program listings (source statements) that relate to the flow charts and routines described herein are presented below:

HEAD IMAGE GENERATOR ROUTINE

This routine is entered once per print cycle. The routine outputs to the head image generator a control byte that consists of the following:

Number of print actuator groups in the configuration character density, 10/15 CPI actuator movement, reverse/not reverse text buffer ½.

In a second byte it outputs the rightmost character position for the rightmost wire on the rightmost actuator group.

| Label | Operation | Arguments | Comments |
|---|---|---|---|
| HIG | | * | Head Image Generator |
| | IN | NOHDS | Input The Number of Actuator Groups |
| | S | X'1',R0 | Adjust It For The H.I.G. |
| | M | FLG1,R1 | Move The Control Bits to R1 |
| | OUT | HIGCN | Output To The Head Image Generator |
| | IN | CPOS | Input The Rightmost Character POS |
| | OUT | HIGCH | Output To The Head Image Generator |
| | S | X'1',WIPOS | Decrement The Wire Position |
| | BZ | HIG01 | Is It Zero |
| | STA | X'FFF' | Delay |
| | STA | X'FFF' | Delay |
| | M | R1,R1 | Delay |
| | B | HIG03 | |
| HIG01 | M | X'9',WIPOS | Preset Wire Position |
| | T | RV,FLG1 | Are The Actuators Moving Left |
| | BT | HIG02 | Yes, Go Decrement The Char. Position |
| | A | X'1',R1 | Increment The Character Position |
| | AC | X'0',R0 | |
| | B | HIG03 | |
| HIG02 | S | X'1',R1 | Decrement The Character Position |
| | SB | X'0',R0 | |
| | M | R1,R1 | Delay |
| HIG03 | OUT | CPOS | Return Character Position |
| | SBF | HIGST,FLG1 | Turn Off Head Image Generator Start |
| | RTN | | Return To Caller |
| | RTMC1 | | Insert Right Margin Macro |

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

We claim:

1. In a printer subsystem interconnected with a host system that provides lines of data representative of character information to be printed, said data being arranged in character codes representative of a selected dot matrix format, comprising:

a printer unit in said subsystem, said printer unit incorporating a plurality of print wires and a corresponding plurality of print wire actuators respectively coupled to said print wires, said actuators being selectively operable to reciprocate said print wires to print character dots on a document at a print line during printing operations;

means mounting said print wires and said actuators along said print line in a slanted serrated wire image pattern, said print wires being arranged in print head groups, the last wire in one group being displaced from the first wire in a succeeding group by a predetermined displacement factor that is a multiple of character spacing distance along said print line, and the individual print wires being positioned in accordance with a predetermined character displacement factor such as two character locations apart from one another;

print drive means for moving said print wires and said actuators along said print line to print characters on said document during printing operations, the arrangement being such that characters are formed on said document by actuating said print wires to respectively print sets of dots during driving movement of said print wires by said print drive means, each individual dot in a particular set serving as one dot position of an individual respectively different character along said print line and complete characters being formed by selectively actuating said print wires to produce successive sets of dots along said print line during driving movement of said print wires;

a print head image generator associated with said printer unit, said image generator being operable concurrently with driving movement of said print wires by said print drive means along said print line to convert said selected dot matrix format of the character information to be printed to the slanted serrated wire image pattern utilized by said printer unit, said image generator utilizing image slices of said information and a masking technique to develop the wire image pattern;

printer control means for supplying said converted signals to operate said print wires during printing operations;

a microprocessor unit incorporated in said printer control means for controlling operations of said head image generator and for supplying said converted signals to operate said print wires;

storage means comprising a random access memory, said storage means further comprising at least one text buffer for storing information pertaining to characters provided by said host system to be printed by said printer unit and said storage means further comprising means for storing wire images for use by said head image generator to develop slanted serrated wire images; and selection means controlled by said microprocessor unit and operable on an interleaved cyclical basis during actual printing of information to enable said host system to access said storage means during host access cycles to store character information therein and to concurrently enable said head image generator to access said wire images and said character information in said storage means during head image generator access cycles for conversion operations.

2. The subsystem of claim 1, further comprising:

initialization means operated by said printer control means to initialize said head image generator prior to each of its operating cycles with information required by said head image generator in converting from the conventional image format to a nonconventional format.

3. The subsystem of claim 2, further comprising:

register means in said printer control means for retaining initialization means required by said head image generator including as examples the print head group, the wire selected, and the character that wire is pointing to on the print line.

4. The subsystem of claim 3, further comprising:

means in said head image generator for operating on character image slices in developing the converted wire images; and additional register means in said printer control means for storing a slice designation for use by said head image generator during its operations.

5. The subsystem of claim 4, further comprising:

counter means in said head image generator for retaining information provided in said registers during initialization and for utilizing said register information during wire image conversion operations;

means for stepping a wire counter retaining the selected wire to encompass an entire group of print wires in one of said print head groups;

means to step a character position counter in said head image generator upon each stepping operation of said selected wire counter; and means to step the head group counter upon completion of an entire group of wire locations in said wire counter.

6. The subsystem of claim 1, further comprising:

an additional microprocessor in said printer control means for communicating with said host system and responsive to data signals from said host system to enter character information in said storage means representative of characters to be printed by said printer unit; and priority means associated with said storage selection means for enabling the interleaved accessing of said storage means by said additional microprocessor and said head image generator on an alternate basis during operaion of said subsystem.

7. The subsystem of claim 6, further comprising:

means operable in conjunction with said head image generator to provide individual portions of character images designated slices, said head image generator operating only on a single slice for any particular character during any of its conversion cycles.

8. A data conversion arrangement for a printer,, comprising:

a source of data representative of character information to be printed, said data being arranged in character codes representative of a selected dot matrix format;

a printer unit, said printer unit incorporating print means to print characters on a document at a print line during printing operations;

print drive means for moving said print means along a print line to print characters on said document during printing operations;

a print head image generator associated with said printer unit, said image generator being operable concurrently with driving movement of said print means along said print line to convert said data to a wire image pattern in said printer unit, said image generator utilizing image slices of said data and a masking technique to develop the wire image pattern;

printer control means for supplying said converted signals to operate said print means furing printing operations;

a microprocessor unit incorporated in said printer control means for controlling operations of said head image generator and for supplying said converted signals to operate said print wires;

storage means comprising at least one text buffer for storing information pertaining to characters provided by said source to be printed by said printer unit and said storage means further comprising means for storing wire images for use by said head image generator to develop wire image patterns; and selection means controlled by said microprocessor unit and operable on an interleaved cyclical basis during actual printing of information to enable said source to access said storage means during source access cycles to store character information therein and to concurrently enable said head image generator to access said wire images and said character information in said storage means during head image generator access cycles for conversion of said information.

9. The subsystem of claim 8, further comprising:

initialization means operated by said printer control means to initialize said head image generator prior to each of its operating cycles with information required by said head image generator in converting from the conventional image format to a nonconventional format.

* * * * *

UNITED STATES PATENT AND TRADEMARK OFFICE
CERTIFICATE OF CORRECTION

PATENT NO. : 4,279,199  
DATED : July 21, 1981  
INVENTOR(S) : Abelardo D. Blanco et al Page 1 of 5

It is certified that error appears in the above—identified patent and that said Letters Patent is hereby corrected as shown below:

In the specification, Column 6, line 64, "77" should read --7--.
In Column 8, line 52, "portion 682" should read --portion 68a--.
In Column 9, line 9, "printing" should read --print--.
In Column 9, line 10, "31 actuator block 77 assembly 7" should read --31, actuator block assembly 7--.
In Column 29, line 38, "firsst" should read --first--.
In Column 32, line 25, "that is" should read --that it is--.
In Column 38, line 27, "211a" and "210a" should read --201a-- and --211a--, respectively.
In Column 43, line 50, after "emitter" insert --signal--.
In Column 43, line 60 "fits" should read --bits--.

In the drawings, Sheet 3, Fig. 5, the round knob should be designated by referenced numeral 65.

On Sheet 4, Fig. 8, threaded knob 66 should have a notch 66a and a flanged portion 66b, notch 66a being engageable by a portion 68a of fork 68, that part of Fig. 8 to appear as follows (shown about twice actual size of patent drawing).

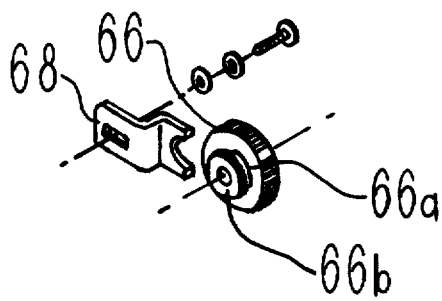

UNITED STATES PATENT AND TRADEMARK OFFICE
CERTIFICATE OF CORRECTION

PATENT NO. : 4,279,199
DATED : July 21, 1981
INVENTOR(S) : Abelardo D. Blanco et al It is certified that error appears in the above—identified patent and that said Letters Patent is hereby corrected as shown below:

On Sheet 4, Fig. 8, reference numeral 77 should be 7.
On Sheet 5, Fig. 10, a lead line should be added from reference numeral 44 as follows:

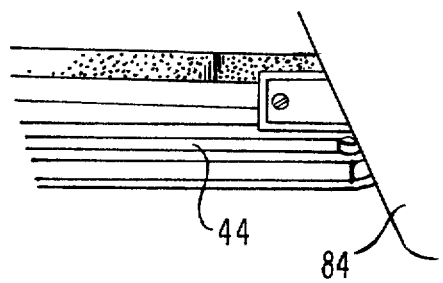

On Sheet 7, Fig. 14, reference numeral 77 should be 7.
On Sheet 21, in Fig. 51B, several blocks should be designated by reference numerals as follows: CTA DECODE block 268 and HEAD LATCH BLOCK 266.
On Sheet 22, in Fig. 53, various blocks should be designated by reference numerals as follows: INTERFACE STORAGE block 204; INTERFACE CONTROL block 203; HIG CONTROL block 221; HEAD DATA block 222; COMMUNICATIONS ADAPTER (CMA) dashed block 202; CMA STORAGE block 205; COMMUNICATIONS STORAGE dashed block 215; CTA STORAGE block 232; STATUS REGISTER block 225 COMMAND REGISTER block 226; CMA/CTA DECODE block 228; INPUT/OUTPUT STACK BLOCK 227; CMA DECODE block 208; MODE/OP PANEL SENSE block 206; MODE/OP PANEL OUTPUT block 207; SWITCHES DISPLAY block 26; DECODE block 233; PRINTER CONTROL block 234; PRINTER SENSE block 237; dashed block enclosing blocks 233, 234 and 237 should be designated 212; MOTORS PRINT HEAD FORMS RIBBON block 235; EMITTERS PRINT FORMS RIBBON block 236; CTA DECODE block 268; HEAD LATCH block 266; dashed block enclosing blocks 266 and 268 should be designated 213; HEAD ACTUATORS block 35.

UNITED STATES PATENT AND TRADEMARK OFFICE
CERTIFICATE OF CORRECTION

PATENT NO. : 4,279,199

DATED : July 21, 1981

INVENTOR(S) : Abelardo D. Blanco et al

It is certified that error appears in the above—identified patent and that said Letters Patent is hereby corrected as shown below:

On Sheet 30, Fig. 56F, the HEAD DATA block should be designated by reference numeral 222a.

On Sheet 31, Fig. 56G, several blocks should be designated by reference numerals as follows: LATCH WIRE FIRE block 249 and LATCH PEDESTAL block 259.

On Sheet 32, Fig. 56H, rightmost bus having three sets of "24 WIRES OUT" interconnected therewith and "TO ACTUATOR DRIVER CARDS" at lowermost extremity should be designated by reference numeral 267.

On Sheet 33, Fig. 56I, the upper left portion including the "GATE HIG LATCH" should have reference numerals 320, 321 and 344 added and circuit corrections made as follows:

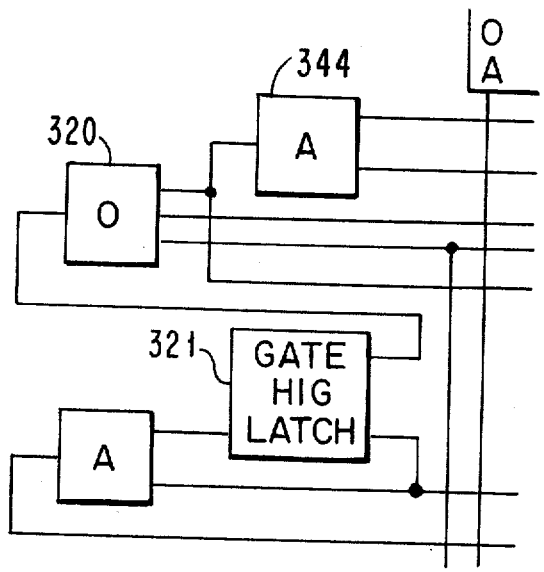

UNITED STATES PATENT AND TRADEMARK OFFICE
CERTIFICATE OF CORRECTION

PATENT NO. : 4,279,199

DATED : July 21, 1981

INVENTOR(S) : Abelardo D. Blanco et al

It is certified that error appears in the above—identified patent and that said Letters Patent is hereby corrected as shown below:

In addition, on Sheet 33, Fig. 56I, several items should be designated by reference numerals as follows: HIG SEL LATCH 326; HIG RESET LATCH 325, PARITY CHECK 330; LOAD line feeding into right side of block 287 should be designated with reference numeral 346.

On Sheet 34, Fig. 56J, RESET LATCH block should be designated by reference numeral 340 and the INIT INC DEC block should be designated by reference numeral 347.

On Sheet 35, Fig. 56K, CYCLE LATCH block should be designated by reference numeral 332; the WORD SELECT LATCH block should be designated by reference numeral 338; the "O" block (Or block) directly to the left of CYCLE LATCH 332 providing input on the "R" lines to blocks 332 and 338 should be designated by reference numeral 331; and the lowermost portion of Fig. 56K including the HIG HEAD DATA bus and reference numeral 222a should appear as follows:

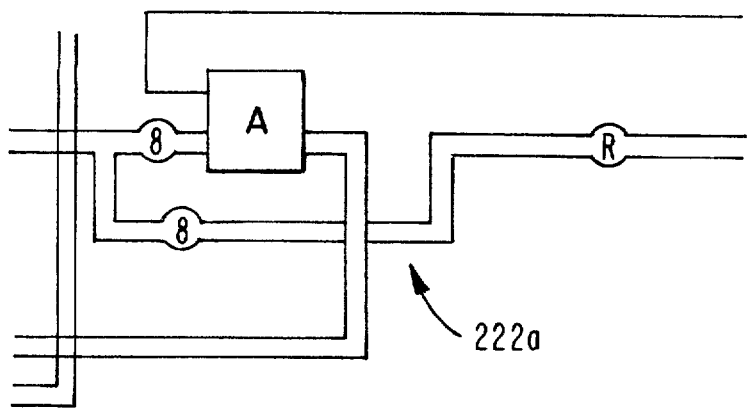

UNITED STATES PATENT OFFICE
CERTIFICATE OF CORRECTION

PATENT NO. : 4,279,199

DATED : July 21, 1981

INVENTOR(S) : Abelardo D. Blanco et al

Page 5 of 5

It is certified that error appears in the above-identified patent and that said Letters Patent are hereby corrected as shown below:

On Sheet 39, Fig. 56O, upper left, "FROM RIBBON CONTROL CARD" should read --FROM RIBBON CONTROL CIRCUITS--; in the center, the "E OF EMITTER" line should read --EOF EMITTER--. In the lower portion "FROM FORMS AMPLIFIER CARD" should read --FROM FORMS EMITTER CIRCUITS--, "FROM EMITTER CARD" should read --FROM PRINT EMITTER CIRCUITS--, and "FROM HEAD FORMS DRIVE CARD" should read --FROM HEAD/FORMS DRIVE CIRCUITS--.

On Sheet 40, Fig. 56P, "TO HEAD/FORMS DRIVE CARD" should read --TO HEAD/FORMS DRIVE CIRCUITS--.

Signed and Sealed this

Thirty-first Day of August 1982

[SEAL]

Attest:

Attesting Officer

GERALD J. MOSSINGHOFF

Commissioner of Patents and Trademarks